United States Patent
Takahashi et al.

(10) Patent No.: US 12,341,981 B2
(45) Date of Patent: Jun. 24, 2025

(54) INFORMATION PROCESSING DEVICE AND METHOD

(71) Applicant: Sony Group Corporation, Tokyo (JP)

(72) Inventors: Ryohei Takahashi, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/040,820

(22) PCT Filed: Sep. 6, 2021

(86) PCT No.: PCT/JP2021/032594
§ 371 (c)(1),
(2) Date: Feb. 7, 2023

(87) PCT Pub. No.: WO2022/054744
PCT Pub. Date: Mar. 17, 2022

(65) Prior Publication Data
US 2023/0291918 A1    Sep. 14, 2023

Related U.S. Application Data

(60) Provisional application No. 63/075,361, filed on Sep. 8, 2020.

(51) Int. Cl.
*H04N 19/30* (2014.01)
*H04N 19/174* (2014.01)
(Continued)

(52) U.S. Cl.
CPC .......... *H04N 19/30* (2014.11); *H04N 19/174* (2014.11); *H04N 19/187* (2014.11); *H04N 19/70* (2014.11)

(58) Field of Classification Search
CPC .... H04N 19/30; H04N 19/174; H04N 19/187; H04N 19/70; H04N 19/597; H04N 21/23; G06T 9/00
See application file for complete search history.

(56) References Cited

U.S. PATENT DOCUMENTS

2021/0029187 A1    1/2021  Oh
2021/0329298 A1 * 10/2021  Ramasubramonian ................. H04N 19/174
(Continued)

FOREIGN PATENT DOCUMENTS

| WO | 2020/008106 A1 | 1/2020 |
| WO | 2020/241723 A1 | 12/2020 |
| WO | 2021/049333 A1 | 3/2021 |

OTHER PUBLICATIONS

International Search Report and Written Opinion mailed on Nov. 30, 2021, received for PCT Application PCT/JP2021/032594, filed on Sep. 6, 2021, 9 pages including English Translation.
(Continued)

*Primary Examiner* — Nasim N Nirjhar
(74) *Attorney, Agent, or Firm* — XSENSUS LLP

(57) ABSTRACT

The present disclosure relates to an information processing device and method capable of inhibiting an increase in a load on reproduction processing.

Scalable decoding information is generated on the basis of a depth of a slice in the G-PCC content and a dependency relation between slices and is stored in the metadata area of the content file that stores the G-PCC content. Further, on the basis of the scalable decoding information stored in the metadata area of the content file, any slice of the G-PCC content is extracted from the content file and is decoded. The
(Continued)

present disclosure can be applied to, for example, an information processing device, an information processing method, or the like.

12 Claims, 31 Drawing Sheets

(51) Int. Cl.
  *H04N 19/187* (2014.01)
  *H04N 19/70* (2014.01)

(56) References Cited

U.S. PATENT DOCUMENTS

2022/0366611 A1* 11/2022 Bai .................. H04N 21/85406
2023/0360273 A1* 11/2023 Oh ........................ H04N 19/96

OTHER PUBLICATIONS

"G-PCC Future Enhancements", ISO/IEC JTC 1/SC 29/WG 11, N19328, Jun. 26, 2020, pp. 1-133.
"Information technology—Coding of audio-visual objects—Part 12 : ISO base media file format", ISO/IEC 14496-12, Dec. 15, 2015, 388 pages.
"Information technology—Coding of audio-visual objects—Part 15: Carriage of network abstraction layer (NAL) unit structured video in the ISO base media file format", ISO/IEC JTC 1/SC 29, ISO/IEC FDIS 14496-15:2014(E), Jan. 13, 2014, pp. 1-172.
Flynn et al., "G-PCC: A hierarchical geometry slice structure", Apple Inc., ISO/IEC JCTC1/SC29/WG11 MPEG/ m54677, Apr. 2020, pp. 1-9.
Oh et al., "Text of ISO/IEC CD 23090-18 Carriage of Geometry-based Point Cloud Compression Data", ISO/IEC JTC 1/SC 29/WG 11, N19442, Jul. 30, 2020, pp. 1-24.

* cited by examiner

FIG. 5

| | |
|---|---|
| 1 | SCALABLE DECODING INFORMATION OF G-PCC CONTENT THAT HAS SLICE CONFIGURATION STORED IN METADATA AREA OF CONTENT FILE IS TRANSMITTED |
| 1-1 | SCALABLE DECODING INFORMATION INCLUDES SLICE CONFIGURATION INFORMATION FOR EACH SAMPLE |
| 1-1-1 | SLICE CONFIGURATION INFORMATION IS STORED IN codec specific parameters OF SubSampleInformationBox IN METADATA AREA |
| 1-1-2 | SLICE CONFIGURATION INFORMATION INCLUDES SLICE DEPENDENCY RELATION INFORMATION |
| 1-1-2-1 | SLICE DEPENDENCY RELATION INFORMATION IS STORED IN codec specific parameters OF SubSampleInformationBox IN METADATA AREA |
| 1-1-2-2 | SLICE DEPENDENCY RELATION INFORMATION INCLUDES REFERENCE SOURCE GEOMETRY SLICE IDENTIFICATION INFORMATION AND REFERENCE DESTINATION GEOMETRY SLICE IDENTIFICATION INFORMATION |
| 1-1-2-2-1 | IN CASE OF INDEPENDENT GEOMETRY SLICE, REFERENCE SOURCE GEOMETRY SLICE IDENTIFICATION INFORMATION AND REFERENCE DESTINATION GEOMETRY SLICE IDENTIFICATION INFORMATION ARE THE SAME |
| 1-1-2-2-2 | REFERENCE SOURCE GEOMETRY SLICE IDENTIFICATION INFORMATION AND REFERENCE DESTINATION GEOMETRY SLICE IDENTIFICATION INFORMATION ARE STORED IN codec specific parameters OF SubSampleInformationBox IN METADATA AREA |
| 1-1-2-3 | SLICE DEPENDENCY INFORMATION INCLUDES ATTRIBUTE GEOMETRY SLICE IDENTIFICATION INFORMATION |
| 1-1-2-3-1 | ATTRIBUTE GEOMETRY SLICE IDENTIFICATION INFORMATION IS STORED IN codec specific parameters OF SubSampleInformationBox OF METADATA AREA |
| 1-1-2-4 | SLICE DEPENDENCY RELATION INFORMATION INCLUDES NON-SCALABLE ENCODING ATTRIBUTE GEOMETRY SLICE IDENTIFICATION INFORMATION |
| 1-1-2-4-1 | NON-SCALABLE ENCODING ATTRIBUTE GEOMETRY SLICE IDENTIFICATION INFORMATION INCLUDES IDENTIFICATION INFORMATION OF GEOMETRY SLICE OR GEOMETRY SLICE GROUP THAT HAS LARGEST DEPTH AMONG GEOMETRY SLICES OR GEOMETRY SLICE GROUPS REFERRED TO BY ATTRIBUTE SLICE OR ATTRIBUTE SLICE GROUP |
| 1-1-2-4-2 | NON-SCALABLE ENCODING ATTRIBUTE GEOMETRY SLICE IDENTIFICATION INFORMATION IS STORED IN codec specific parameters OF SubSampleInformationBox OF METADATA AREA |
| 1-1-2-4-3 | SLICE DEPENDENCY RELATION INFORMATION INCLUDES NON-SCALABLE ENCODING FLAG |
| 1-1-2-4-3-1 | NON-SCALABLE ENCODING FLAG IS STORED IN codec specific parameters OF SubSampleInformationBox IN METADATA AREA |
| 1-1-2-5 | PAYLOAD TYPE OF INDEPENDENT GEOMETRY SLICE AND PAYLOAD TYPE OF DEPENDENT GEOMETRY SLICE ARE SET TO DIFFERENT VALUES |

FIG. 6

| | |
|---|---|
| 1-1-3 | SLICE CONFIGURATION INFORMATION INCLUDES GEOMETRY SLICE DEPTH INFORMATION |
| 1-1-3-1 | GEOMETRY SLICE DEPTH INFORMATION INCLUDES MINIMUM DEPTH INFORMATION |
| 1-1-3-2 | GEOMETRY SLICE DEPTH INFORMATION INCLUDES MAXIMUM DEPTH INFORMATION |
| 1-1-3-3 | GEOMETRY SLICE DEPTH INFORMATION IS STORED IN codec specific parameters OF SubSampleInformationBox IN METADATA AREA |
| 1-1-3-3-1 | flags OF SubSampleInformationBox OF codec specific parameters THAT STORES GEOMETRY SLICE DEPTH INFORMATION AND flags OF SubSampleInformationBox OF codec specific parameters THAT STORES SLICE DEPENDENCY RELATION INFORMATION ARE SET TO DIFFERENT VALUES |
| 1-2 | SCALABLE DECODING INFORMATION INCLUDES TRACK CONFIGURATION INFORMATION |
| 1-2-1 | TRACK CONFIGURATION INFORMATION INCLUDES TRACK DEPTH INFORMATION |
| 1-2-1-1 | TRACK DEPTH INFORMATION INCLUDES TRACK MINIMUM DEPTH INFORMATION |
| 1-2-1-2 | TRACK DEPTH INFORMATION INCLUDES TRACK MAXIMUM DEPTH INFORMATION |
| 1-2-1-3 | TRACK DEPTH INFORMATION INCLUDES MATCHING FLAG |
| 1-2-1-4 | TRACK DEPTH INFORMATION IS STORED IN DepthInfoBox OF SampleEntry OF METADATA AREA |
| 1-2-2 | TRACK CONFIGURATION INFORMATION INCLUDES TRACK DEPENDENCY RELATION INFORMATION |
| 1-2-2-1 | TRACK DEPENDENCY RELATION INFORMATION INCLUDES DEPENDENT INFORMATION INDICATING ANOTHER TRACK INCLUDING SLICE NECESSARY FOR DECODING DEPENDENT SLICE INCLUDED IN TRACK CORRESPONDING TO INFORMATION |
| 1-2-2-1-1 | DEPENDENT INFORMATION INDICATES ALL OTHER TRACKS INCLUDING SLICE NECESSARY FOR DECODING DEPENDENT SLICE INCLUDED IN TRACK CORRESPONDING TO INFORMATION |
| 1-2-2-1-2 | DEPENDENT INFORMATION INDICATES ANOTHER TRACK INCLUDING SLICE REFERRED TO FROM DEPENDENT SLICE INCLUDED IN TRACK CORRESPONDING TO INFORMATION |
| 1-2-2-2 | TRACK DEPENDENCY RELATION INFORMATION INCLUDES INDEPENDENT INFORMATION INDICATING ANOTHER TRACK INCLUDING DEPENDENT SLICE FOR WHICH INDEPENDENT SLICE INCLUDED IN TRACK CORRESPONDING TO INFORMATION IN DECODING IS NECESSARY |
| 1-2-2-2-1 | INDEPENDENT INFORMATION INDICATES ALL OTHER TRACKS INCLUDING DEPENDENT SLICE FOR WHICH INDEPENDENT SLICE INCLUDED IN TRACK CORRESPONDING TO INFORMATION IN DECODING IS NECESSARY |
| 1-2-2-3 | TRACK DEPENDENCY RELATION INFORMATION IS STORED AS track reference IN METADATA AREA |

FIG. 8

```
aligned(8) class SubSampleInformationBox extends FullBox('subs', version, flags) {
    unsigned int(32) entry_count;                                                    } 131
    int i,j;
    for (i=0; i < entry_count; i++) {
        unsigned int(32) sample_delta; // TARGET sample
        unsigned int(16) subsample_count; // NUMBER OF subsamples
        if (subsample_count > 0) {
            for (j=0; j < subsample_count; j++) {
                if(version == 1)
                {
                    unsigned int(32) subsample_size; // SIZE OF subsample
                }
                else
                {
                    unsigned int(16) subsample_size; // SIZE OF subsample
                }
                unsigned int(8) subsample_priority;
                unsigned int(8) discardable;
                unsigned int(32) codec_specific_parameters; // INFORMATION OF subsamples DETERMINED FOR EACH ENCODING CODEC
            }
        }
    }
}
```
                                                                                                                                                           132

FIG. 9

```
if (flags == 0) {
    unsigned int(8)    payloadType;
    if (PayloadType == 4) { // attribute payload
        unsigned int(6)    attrIdx;
        bit(18)    reserved = 0;
    }
    else if (PayloadType == 2) { // geometry payload    ~133
        unsigned int(12) geom_slice_id;
        unsigned int(12) ref_geom_slice_id;
    }
    else
        bit(24)    reserved = 0;
} else if (flags == 1) {
    unsigned int(1)    tile_data;
    bit(7)    reserved = 0;
    if (tile_data)
        unsigned int(24)    tile_id;
    else
        bit(24)    reserved = 0;
}
```

FIG. 10

```
if (flags == 0) {
   unsigned int(8)    payloadType;
   if (PayloadType == 4) { // attribute payload
      unsigned int(6) attrIdx;
      unsigned int(12) ref_attr_geom_slice_id;
      bit(6)          reserved = 0;           ⎱ 134
   }
   else if (PayloadType == 2) { // geometry payload
      unsigned int(12) geom_slice_id;
      unsigned int(12) ref_geom_slice_id;
   }
   else
      bit(24)         reserved = 0;
} else if (flags == 1) {
   unsigned int(1)    tile_data;
   bit(7)             reserved = 0;
   if (tile_data)
      unsigned int(24)  tile_id;
   else
      bit(24)          reserved = 0;
}
```

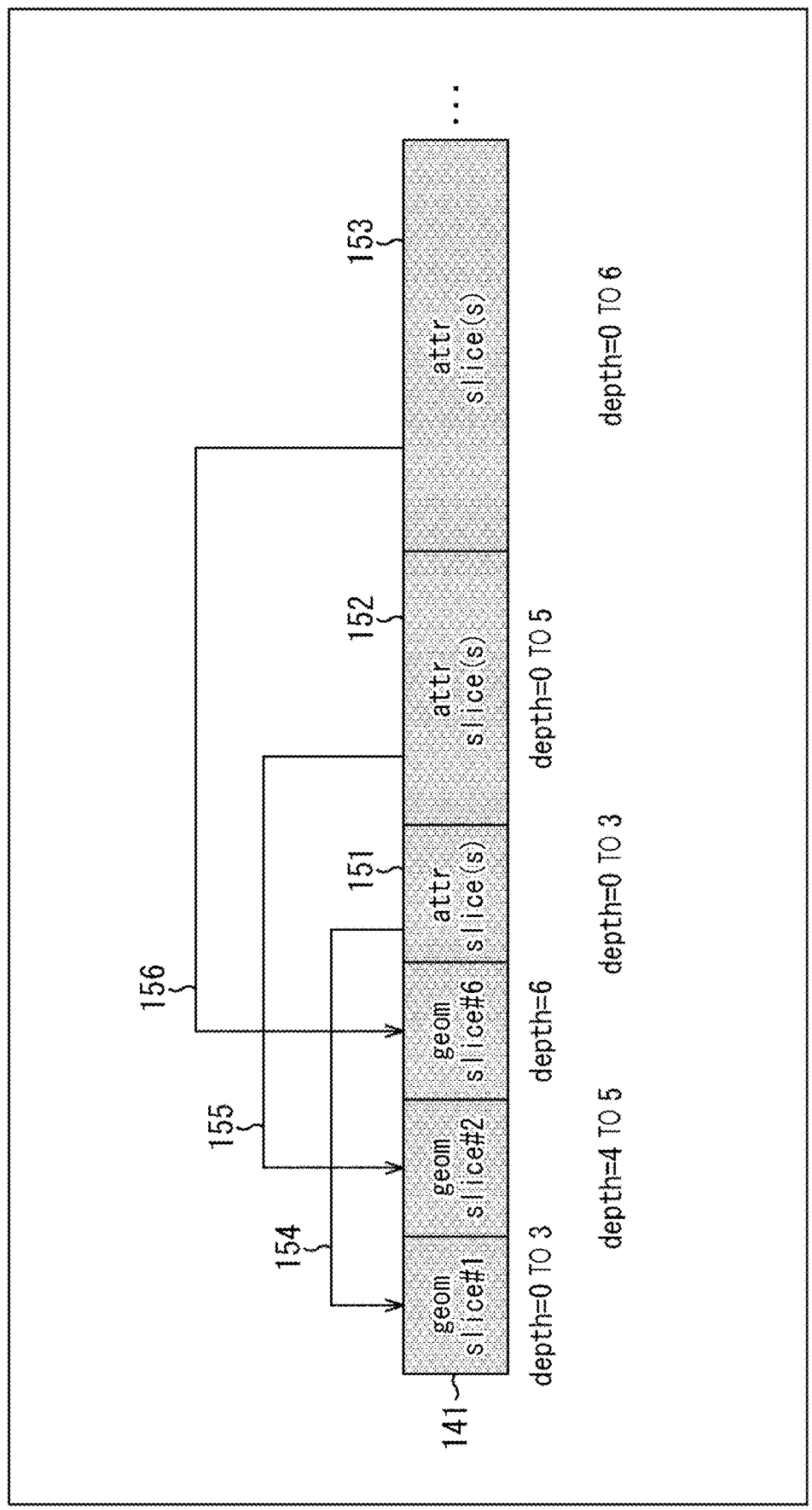

FIG. 12

```
if (flags == 0) {
    unsigned int(8)    payloadType;
    if (PayloadType == 4) { // attribute payload          ~161
        unsigned int(6)  attrIdx;
        unsigned int(1)  non_scalable_flag;
        unsigned int(12) ref_attr_geom_slice_id;
        bit(5)           reserved = 0;
    }
    else if (PayloadType == 2) { // geometry payload
        unsigned int(12) geom_slice_id;
        unsigned int(12) ref_geom_slice_id;
    }
    else
        bit(24)          reserved = 0;
} else if (flags == 1) {
    unsigned int(1)  tile_data;
    bit(7)           reserved = 0;
    if (tile_data) {
        unsigned int(24) tile_id;
    }
    else
        bit(24)          reserved = 0;
}
```

FIG. 13

```
if (flags == 0) {
    unsigned int(8)    payloadType;
    if (PayloadType == 4) { // attribute payload
        unsigned int(6)    attrIdx;
        bit(18)    reserved = 0;
    }
    else if (PayloadType == 2) { // independent geometry slice
        unsigned int(12) geom_slice_id;
        bit(12) reserved=0;
    }
    else if (PayloadType == 9) { // dependent geometry slice
        unsigned int(12) geom_slice_id;
        unsigned int(12) ref_geom_slice_id;
    }
    else
        bit(24)    reserved = 0;
} else if (flags == 1) {
    unsigned int(1)    tile_data;
    bit(7)    reserved = 0;
    if (tile_data)
        unsigned int(24)    tile_id;
    else
        bit(24)    reserved = 0;
}
```

```
if (flags == 0) {
...
} else if (flags == 1) {
...
} else if (flags == 2) {
    unsigned int(16) min_depth;
    unsigned int(16) max_depth;
}
```
171

FIG. 16

```
aligned(8) class DepthInfoBox extends FullBox('depi', version, flags) {
    unsigned int(1) fixed_depth;
    bit(7) reserved = 0;
    unsigned int(16) track_min_depth;
    unsigned int(16) track_max_depth;
}
```

FIG. 24

| 2 | ADAPTATION SET CONFIGURATION INFORMATION WHICH IS BASED ON DEPTH OF EACH SLICE OF G-PCC CONTENT HAVING SLICE CONFIGURATION AND DEPENDENCY RELATION BETWEEN SLICES STORED IN CONTROL FILE IS TRANSMITTED |
|---|---|
| 2-1 | ADAPTATION SET CONFIGURATION INFORMATION INCLUDES ADAPTATION SET DEPTH INFORMATION |
| 2-1-1 | ADAPTATION SET DEPTH INFORMATION INCLUDES ADAPTATION SET MINIMUM DEPTH INFORMATION |
| 2-1-2 | ADAPTATION SET DEPTH INFORMATION INCLUDES ADAPTATION SET MAXIMUM DEPTH INFORMATION |
| 2-1-3 | ADAPTATION SET DEPTH INFORMATION INCLUDES MATCHING FLAG |
| 2-2 | ADAPTATION SET CONFIGURATION INFORMATION INCLUDES REPRESENTATION DEPENDENCY INFORMATION |
| 2-2-1 | REPRESENTATION DEPENDENCY RELATION INFORMATION INCLUDES DEPENDENT INFORMATION INDICATING ANOTHER REPRESENTATION NECESSARY FOR DECODING REPRESENTATION CORRESPONDING TO INFORMATION |
| 2-2-1-1 | DEPENDENT INFORMATION INDICATES ALL OTHER REPRESENTATIONS NECESSARY FOR DECODING REPRESENTATION CORRESPONDING THE INFORMATION |
| 2-2-1-2 | DEPENDENT INFORMATION INDICATES ANOTHER REPRESENTATION TO BE REFERRED FROM REPRESENTATION CORRESPONDING TO INFORMATION |
| 2-2-2 | REPRESENTATION DEPENDENCY RELATION INFORMATION INCLUDES INDEPENDENT INFORMATION INDICATING ANOTHER REPRESENTATION FOR WHICH REPRESENTATION CORRESPONDING TO INFORMATION IS NECESSARY IN DECODING |
| 2-2-2-1 | INDEPENDENT INFORMATION INDICATES ALL OTHER REPRESENTATIONS IN WHICH REPRESENTATION CORRESPONDING TO INFORMATION IS NECESSARY IN DECODING |
| 2-2-3 | REPRESENTATION TRACK DEPENDENCY RELATION INFORMATION IS STORED IN AS Representation@associationId |

FIG. 25

| Attributes | Use | Data type | Description |
|---|---|---|---|
| @fixedDepth | M | xs:int | 0: MINIMUM OR MAXIMUM DEPTH VALUES OF EACH SAMPLE CHANGES WITHIN RANGE FROM minDepth TO maxDepth<br>1: MINIMUM AND MAXIMUM DEPTH VALUES OF EACH SAMPLE ARE NORMALLY EQUAL TO minDepth AND maxDepth, RESPECTIVELY<br>IN CASE WHERE ONE DEPTH IS INCLUDED, fixedDepth=1 IS SET |
| @minDepth | M | xs:int | MINIMUM DEPTH VALUE IN ADAPTATION SET<br>IN CASE WHERE ONE DEPTH IS INCLUDED, minDepth=maxDepth IS SET |
| @maxDepth | M | xs:int | MAXIMUM DEPTH VALUE IN ADAPTATION SET<br>IN CASE WHERE ONE DEPTH IS INCLUDED, minDepth=maxDepth IS SET |

Legend:
For attributes: M=Mandatory, O=Optional, OD=Optional with Default Value, CM=Conditionally Mandatory.
For elements: <minOccurs>..<maxOccurs> (N=unbounded)

Elements are bold; attributes are non-bold and preceded with an @.

FIG. 26

```xml
<?xml version="1.0" encoding="UTF-8"?>
<MPD>
<Period>
<!? depth="0~3" -->
<AdaptationSet id="1" codecs="gpc1">
<EssentialProperty schemeIdUri=" urn:mpeg:dash:preselection:2016" />
<EssentialProperty schemeIdUri=" urn:mpeg:mpegigpcc:2020:component">
<gpcc:component component_type="geom" />
<gpcc:component component_type="attr" attribute_type="0" />
</EssentialProperty>
<EssentialProperty schemeIdUri=" urn:mpeg:mpegigpcc:2020:depth" fixedDepth="1" minDepth="0" maxDepth="3" />     } 521
<Representation id="rep1-1">...</Representation>
</AdaptationSet>
<!? depth="4~5" -->
<AdaptationSet id="2" codecs="igp1">
<EssentialProperty schemeIdUri=" urn:mpeg:dash:preselection:2016" />
<EssentialProperty schemeIdUri=" urn:mpeg:mpegigpcc:2020:component">
<gpcc:component component_type="geom" />
<gpcc:component component_type="attr" attribute_type="0" />
</EssentialProperty>
<EssentialProperty schemeIdUri=" urn:mpeg:mpegigpcc:2020:depth" fixedDepth="1" minDepth="4" maxDepth="5" />     } 522
<Representation id="rep2-1" associationId="rep1-1" associationType="dep.d">...</Representation>
</AdaptationSet>
<!? depth="6" -->
<AdaptationSet id="3" codecs="igp1">
<EssentialProperty schemeIdUri=" urn:mpeg:dash:preselection:2016" />
<EssentialProperty schemeIdUri=" urn:mpeg:mpegigpcc:2020:component">
<gpcc:component component_type="geom" />
<gpcc:component component_type="attr" attribute_type="0" />
</EssentialProperty>
<EssentialProperty schemeIdUri=" urn:mpeg:mpegigpcc:2020:depth" fixedDepth="1" minDepth="6" maxDepth="6" />     } 523
<Representation id="rep3-1" associationId="rep1-1 rep2-1" associationType="depd depd">...</Representation>
</AdaptationSet>
</Period>
</MPD>
```

520

INFORMATION PROCESSING DEVICE AND METHOD

CROSS-REFERENCE TO RELATED APPLICATIONS

The present application is based on PCT filing PCT/JP2021/032594, filed Sep. 6, 2021, which claims priority to U.S. Provisional Patent Application 63/075,361, filed Sep. 8, 2020, the entire contents of each are incorporated herein by reference.

TECHNICAL FIELD

The present disclosure relates to an information processing device and method, and more particularly, to an information processing device and method capable of suppressing an increase in a load on a reproduction process.

BACKGROUND ART

In the related art, various methods such as high efficiency video coding (HEVC) have been proposed as moving image encoding technologies. As a technology for transmitting a moving image encoded in this way, there is International Organization for Standardization Base Media File Format (ISOBMFF) which is a file container specification of an international standard technology of moving image compression "Moving Picture Experts Group-4 (MPEG-4)" (for example, see Non Patent Document 1).

Further, for example, in an encoding technology such as HEVC, encoded data is hierarchized in accordance with, for example, a resolution and the like to be able to correspond to scalable decoding. Further, a file format in which encoded data is divided into tracks and stored on a layer basis, and only encoded data of a desired layer can be selectively transmitted has been proposed (for example, see Non Patent Document 2).

Incidentally, as a method of encoding a point cloud that expresses a three-dimensional object as a set of points, an encoding technology called geometry-based point cloud compression (G-PCC) in which data of a point cloud is divided into geometry indicating positional information of points and attribute indicating attribute information of points for encoding is being standardized in MPEG-I Part 9 (ISO/IEC 23090-9) (see, for example, Non Patent Document 3). In this G-PCC, it has been proposed to form an independently decodable slice structure (see Non Patent Document 4).

Further, as a technology for transmitting G-PCC content obtained by encoding a point cloud by applying the G-PCC, it has been proposed to store the G-PCC content in the above-described ISOBMFF (for example, see Non Patent Document 5).

CITATION LIST

Non Patent Document

Non Patent Document 1: "Information technology—Coding of audio-visual objects—Part 12: ISO base media file format", ISO/IEC 14496-12, 2015-02-20

Non Patent Document 2: "Information technology—Coding of audio-visual objects—Part 15: Carriage of network abstraction layer (NAL) unit structured video in the ISO base media file format", ISO/IEC FDIS 14496-15: 2014(E), 2014-01-13

Non Patent Document 3: "G-PCC Future Enhancements", ISO/IEC JTC 1/SC 29/WG 11 N19328, 2020-6-26

Non Patent Document 4: David Flynn, Khaled Mammou, "G-PCC: A hierarchical geometry slice structure", ISO/IEC JCTC1/SC29/WG11 MPEG/m54677, April 2020, Online Non Patent Document 5: Sejin Oh, Ryohei Takahashi, Youngkwon Lim, "Text of ISO/IEC CD 23090-18 Carriage of Geometry-based Point Cloud Compression Data", ISO/IEC JTC 1/SC 29/WG 11 N19442, 2020-07-30

SUMMARY OF THE INVENTION

Problems to be Solved by the Invention

However, the method described in Non Patent Document 5 does not correspond to the slice structure described in Non Patent Document 4. Therefore, in order to decode some of the slices of the G-PCC content, the entire G-PCC content is required to be transmitted and parsed (analyzed), and thus there is a possibility of an increase in a load on a reproduction process.

The present disclosure has been made in view of such circumstances and an objective of the present invention is to inhibit an increase in a load on a reproduction process.

Solutions to Problems

An information processing device according to an aspect of the present technology is an information processing device including: a scalable decoding information generation unit configured to generate scalable decoding information regarding scalable decoding of geometry-based point cloud compression (G-PCC) content on the basis of depth information indicating a quality hierarchy level of each slice in G-PCC content including first and second slices and a dependency relation between the first and second slices in the G-PCC content; and a content file generation unit configured to generate a content file that stores the G-PCC content and to store the scalable decoding information in a metadata area of the content file.

An information processing method according to another aspect of the present technology is an information processing method including: generating scalable decoding information regarding scalable decoding of geometry-based point cloud compression (G-PCC) content on the basis of depth information indicating a quality hierarchy level of each slice in G-PCC content including first and second slices and a dependency relation between the first and second slices in the G-PCC content; and generating a content file that stores the G-PCC content and storing the scalable decoding information in a metadata area of the content file.

An information processing device according to still another aspect of the present technology is an information processing device including: an extraction unit configured to extract an arbitrary slice of geometry-based point cloud compression (G-PCC) content from a content file on the basis of scalable decoding information stored in a metadata area of the content file that stores G-PCC content including first and second slices; and a decoding unit configured to decode the slice of the G-PCC content extracted by the extraction unit. The scalable decoding information is information regarding scalable decoding of the G-PCC content and is information generated on the basis of depth information indicating a quality hierarchy level of the slice in the G-PCC content and a dependency relation between the first and second slices in the G-PCC content.

An information processing method according to still another aspect of the present technology is an information processing method including: extracting an arbitrary slice of geometry-based point cloud compression (G-PCC) content from a content file on the basis of scalable decoding information stored in a metadata area of the content file that stores G-PCC content including first and second slices; and decoding the extracted slice of the G-PCC content. The scalable decoding information is information regarding scalable decoding of the G-PCC content and is information generated on the basis of depth information indicating a quality hierarchy level of the slice in the G-PCC content and a dependency relation between the first and second slices in the G-PCC content.

In the information processing device and the method according to an aspect of the present technology, scalable decoding information regarding scalable decoding of geometry-based point cloud compression (G-PCC) content is generated on the basis of depth information indicating a quality hierarchy level of each slice in G-PCC content including first and second slices and a dependency relation between the first and second slices in the G-PCC content; a content file that stores the G-PCC content is generated, and the scalable decoding information is stored in a metadata area of the content file.

In an information processing device and method according to another aspect of the present technology, an arbitrary slice of geometry-based point cloud compression (G-PCC) content is extracted from a content file on the basis of scalable decoding information stored in a metadata area of the content file that stores G-PCC content including first and second slices; and the extracted slice of the G-PCC content is decoded.

BRIEF DESCRIPTION OF DRAWINGS

FIG. 5 is a diagram illustrating a method of transmitting G-PCC content.
FIG. 6 is a diagram illustrating a method of transmitting G-PCC content.
FIG. 8 is a diagram illustrating an example of a subsample information box.
FIG. 9 is a diagram illustrating slice dependency relation information.
FIG. 10 is a diagram illustrating attribute geometry slice identification information.
FIG. 11 is a diagram illustrating an attribute slice to which non-scalable encoding is applied.
FIG. 12 is a diagram illustrating non-scalable encoding attribute geometry slice identification information.
FIG. 13 is a diagram illustrating slice dependency relation information.
FIG. 14 is a diagram illustrating geometry slice depth information.
FIG. 16 is a diagram illustrating track depth information.
FIG. 24 is a diagram illustrating a control file of G-PCC content.
FIG. 25 is a diagram illustrating adaptation set configuration information.
FIG. 26 is a diagram illustrating a description example of an MPD.

MODE FOR CARRYING OUT THE INVENTION

Hereinafter, modes for carrying out the present disclosure (hereinafter referred to as embodiments) will be described. Note that the description will be made in the following order.
1. Transmission of G-PCC content with slice structure
2. Transmission of scalable decoding information by content file
3. First embodiment (file generation device and reproduction device)
4. Transmission of scalable decoding information by control file
5. Second embodiment (file generation device and reproduction device)
6. Supplements 1. Transmission of G-PCC Content with Slice Structure <Documents Supporting Technical Contents and Technical Terms>

The scope disclosed in the present technology includes not only the contents described in the embodiments but also the contents described in the following non patent documents and the like known at the time of filing, the contents of other documents referred to in the following Non Patent documents, and the like.
Non Patent Document 1: (described above)
Non Patent Document 2: (described above)
Non Patent Document 3: (described above)
Non Patent Document 4: (described above)
Non Patent Document 5: (described above)
Non Patent Document 6: https://www.matroska.org/index.html That is, the contents described in the above-described non patent documents, the contents of other documents referred to in the above-described non-patent documents, and the like are also grounds for determining the support requirement.

<Hevc>

In the related art, various methods such as high efficiency video coding (HEVC) have been proposed as moving image encoding technologies. As a technology for transmitting a moving image encoded in this way, for example, there is International Organization for Standardization Base Media File Format (ISOBMFF) which is a file container specification of the international standard technology of moving image compression "Moving Picture Experts Group-4 (MPEG-4)" as described in Non Patent Document 1.

Further, for example, in an encoding technology such as HEVC, encoded data is hierarchized in accordance with, for example, a resolution and the like to be able to correspond to scalable decoding. Then, for example, as described in Non Patent Document 2, a file format (L-HEVC file format) in which encoded data is divided into tracks and stored on a layer basis and only encoded data of a desired layer can be selectively transmitted has been proposed.

Figure 1:
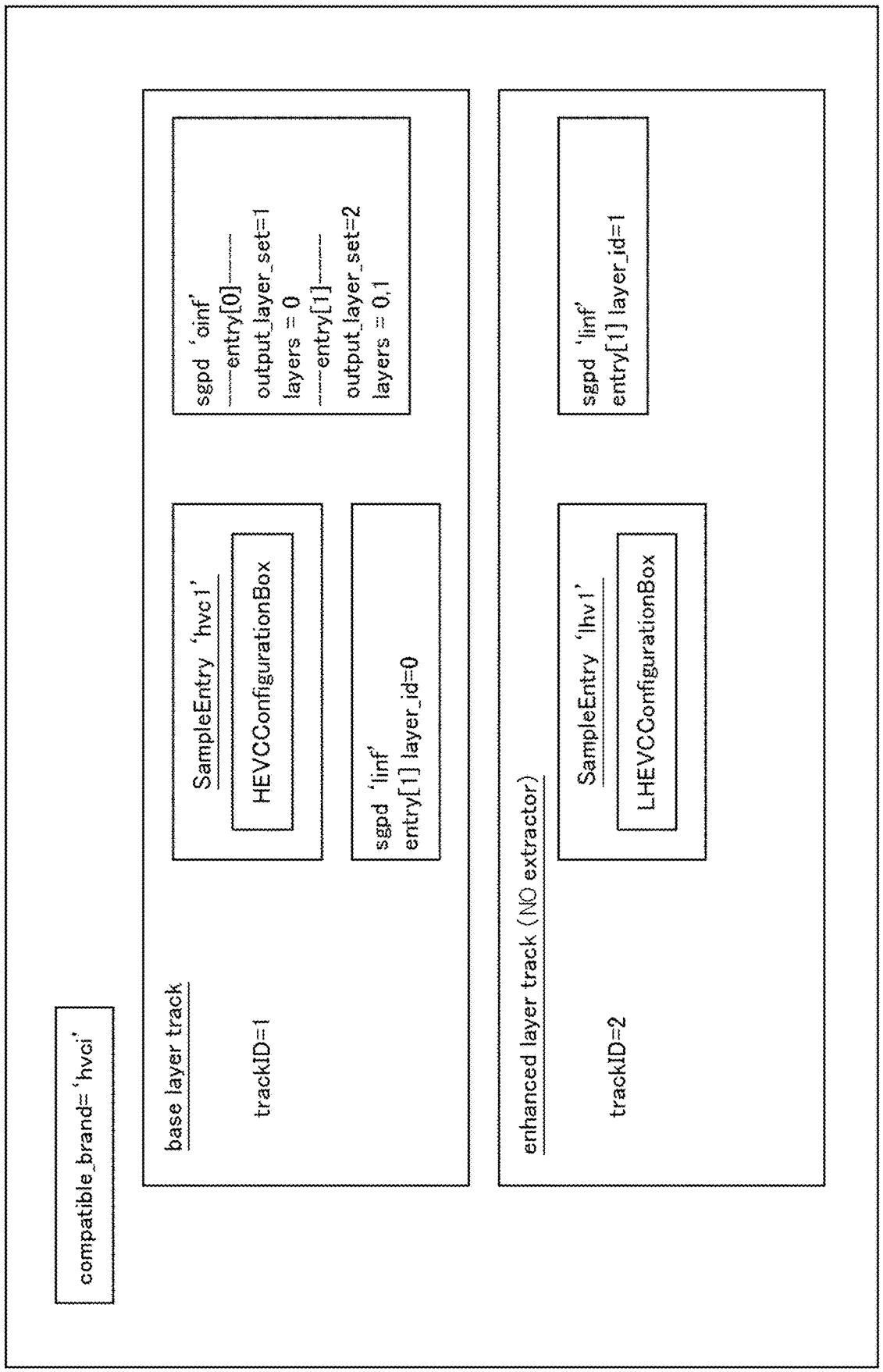
FIG. 1 is a diagram illustrating an L-HEVC file format.

In the L-HEVC file format, a bitstream of a moving image has a hierarchical structure, and a single or a plurality of layers can be stored in individual tracks of ISOBMFF. As illustrated in FIG. 1, in ISOBMFF, information regarding a layer included in each sample is stored in a sample group (Layer Information sample group). In L-HEVC in which encoding is performed such that a bitstream has a hierarchical structure, since inter prediction is applied, the hierarchical structure does not change frequently. Therefore, it is preferable to store the information regarding the layer in the sample group. This sample group can also be used as information for track selection.

<Point Cloud>

Incidentally, as 3D data representing a three-dimensional object (also referred to as a 3D object), there is a point cloud representing the 3D object as a set of points.

For example, in the case of a point cloud, a 3D object that is a three-dimensional structure is expressed as a set of a large number of points. A point cloud includes positional information (also referred to as geometry) and attribute information (also referred to as attribute) of each point. The attribute can include any information. For example, color information, reflectivity information, normal line information, and the like of each point may be included in the attribute. As described above, the point cloud has a relatively simple data structure, and can express a three-dimensional shape of the 3D object with sufficient accuracy by using a sufficiently large number of points.

<Overview of G-PCC>

Non Patent Document 3 discloses an encoding technology called Geometry-based Point Cloud Compression (G-PCC) for encoding this point cloud separately into geometry and attribute. The G-PCC is being standardized in MPEG-I Part 9 (ISO/IEC 23090-9).

Figure 2:
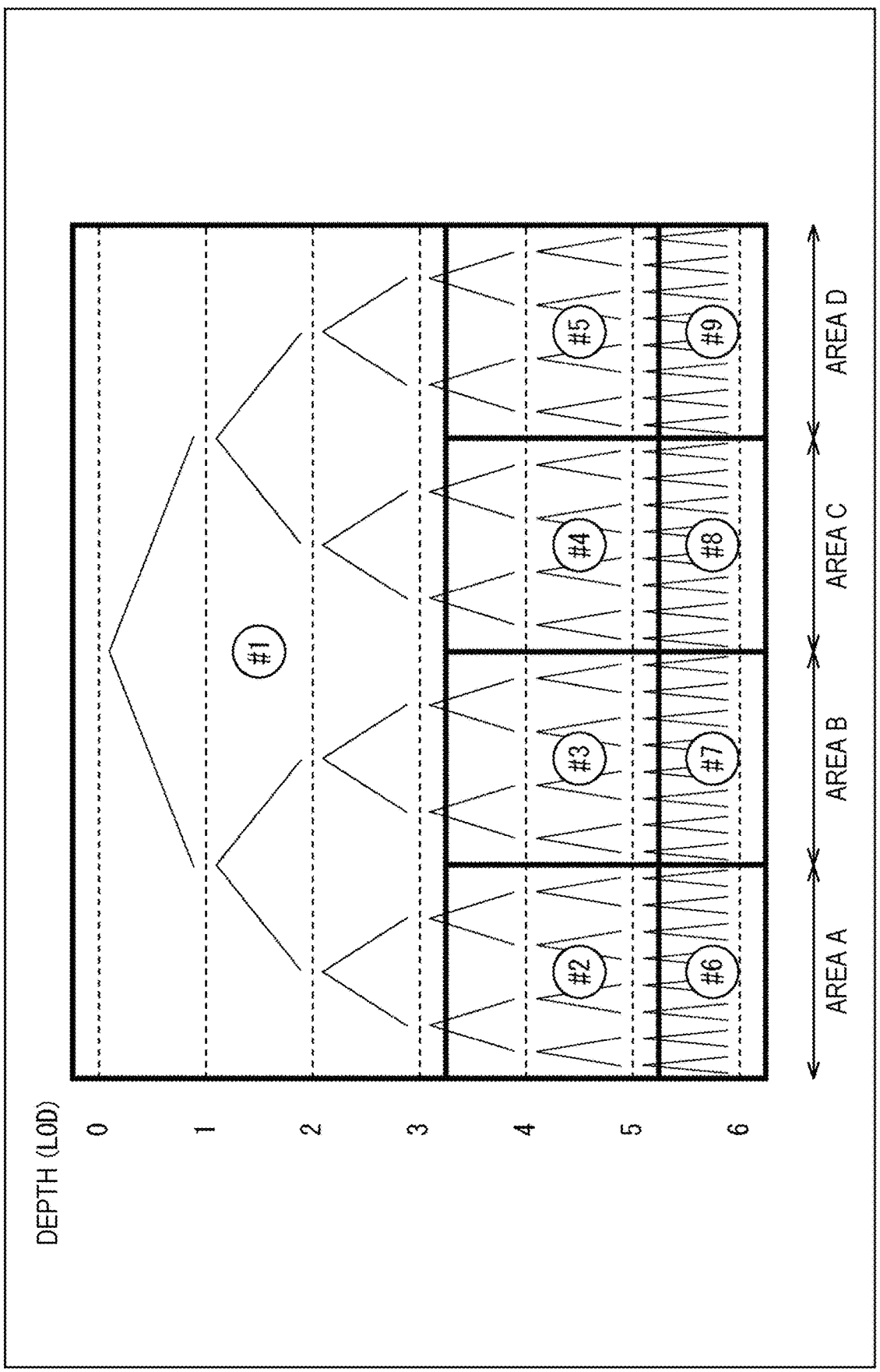
FIG. 2 is a diagram illustrating a slice structure of geometry.

The tree structure encoding as illustrated in FIG. 2 is applied to geometry encoding. In tree structure encoding, geometry is first turned into a tree structure. The three-dimensional space is recursively divided, and the geometry is quantized in the divided areas of each stage, and thus a tree structure of the geometry as illustrated in FIG. 2 is formed. In the case of FIG. 2, a tree structure hierarchized into Depth 0 to Depth 6 (also referred to as LOD) illustrated in the vertical direction in the drawing is formed.

As the number of divisions increases, the number of divided areas increases and each divided area becomes smaller. Therefore, the 3D object is represented by a larger number of points with higher-precision geometry. That is, as the depth becomes deeper (as the depth becomes lower), a resolution of the point cloud becomes higher. Then, the geometry of each layer is encoded according to the tree structure. For example, a difference between the geometry of each layer and the geometry of the layer higher by one level than a layer to which the geometry belongs is calculated. The difference is encoded. Each layer may be independently encoded. However, by encoding the difference in this way, it is possible to improve encoding efficiency.

The difference from the upper layer is encoded. Therefore, in order to obtain the geometry of a desired depth, the depth and the encoded data of the upper layer than the depth may be decoded. For example, in the case of FIG. 2, the geometry with a resolution of Depth 2 is obtained by decoding the encoded data of Depth 0 to Depth 2. In other words, decoding of Depth 3 to Depth 6 is unnecessary. A decoding method capable of restoring (generating) information regarding a desired layer only by decoding a part of encoded data in this way is referred to as scalable decoding. That is, by forming the tree structure and performing the encoding, as described above, the geometry can be subjected to scalable decoding with the resolution.

For example, in a case where the encoded data does not correspond to the scalable decoding, it is necessary to decode all the encoded data to restore the geometry with a resolution of the lowest layer (that is, a highest resolution), and then generate a desired resolution which is a resolution lower than that resolution. Conversely, when the encoded data corresponds to the scalable decoding, the desired resolution can be restored by decoding only a part of necessary encoded data as described above. That is, it is possible to suppress an increase in a load on a reproduction process.

Note that, in FIG. 2, a binary tree is illustrated as an example of the tree structure of this geometry, but any tree structure can be applied. For example, the tree may be an octree or a kd tree.

The encoded data (bitstream) generated by encoding the geometry as described above is also referred to as a geometry bitstream.

Further, in compression of attribute, a method such as Predicting Weight Lifting, Region Adaptive Hierarchical Transform (RAHT) or Fix Weight Lifting is applied. The encoded data (bitstream) generated by encoding the attribute is also referred to as an attribute bitstream.

Further, a bitstream in which the geometry bitstream and the attribute bitstream are combined into one stream is also referred to as a G-PCC bitstream or G-PCC content.

<Slice>

In Non Patent Document 4, it has been proposed to form a slice structure in a bitstream in the G-PCC. The slice is a basis for dividing the data of the geometry and the attribute. In the present specification, a slice of geometry is also referred to as a geometry slice. Further, the slice of the attribute is also referred to as an attribute slice.

The slices are partitioned on a depth basis in the tree structure of the geometry. That is, the slice includes data of a single depth or a plurality of consecutive depths. For example, in FIG. 2, a data area partitioned in a thick line frame indicates a slice. Numbers surrounded by circles in the drawing indicate identification information of each slice. For example, data of Depth 0 to Depth 3 forms slice #1. Further, the slices can also be partitioned in accordance with positions (areas) in a three-dimensional space. For example, in FIG. 2, the data of Depth 4 and Depth 5 is partitioned in the areas A to D, and four slices of slice #2, slice #3, slice #4, and slice #5 are formed. Similarly, the data at Depth 6 is partitioned in the areas A to D, and four slices of slice #6, slice #7, slice #8, and slice #9 are formed.

The data of the geometry or the attribute is encoded for each slice. That is, the geometry bitstream and the attribute bitstream can be decoded for each slice. However, since the geometry encodes a difference from the upper layer, as described above, there are two types of slices: an independent slice that can be independently decoded and a dependent slice that requires another slice in decoding.

For example, in the case of the tree structure of FIG. 2, the geometry of slice #1 may be decoded in order to obtain the geometry of slice #1 (for example, geometry of Depth 3) by decoding. On the other hand, in order to obtain the geometry of slice #2 by decoding (for example, the geometry of the area A of Depth 4), it is necessary to decode the geometry of slice #1 and the geometry of slice #2. Similarly, in decoding of the slices #3 to #5, decoding of slice #1 is also necessary. Further, in decoding of slice #6, decoding of slice #1 and slice #2 is necessary. In decoding of slice #7, decoding of slice #1 and slice #3 is necessary In decoding of slice #8, decoding of slice #1 and slice #4 is necessary. In decoding of slice #9, decoding of slice #1 and slice #5 is necessary.

That is, slice #1 is an independent slice, and slice #2 to slice #9 are dependent slices.

Figure 3:
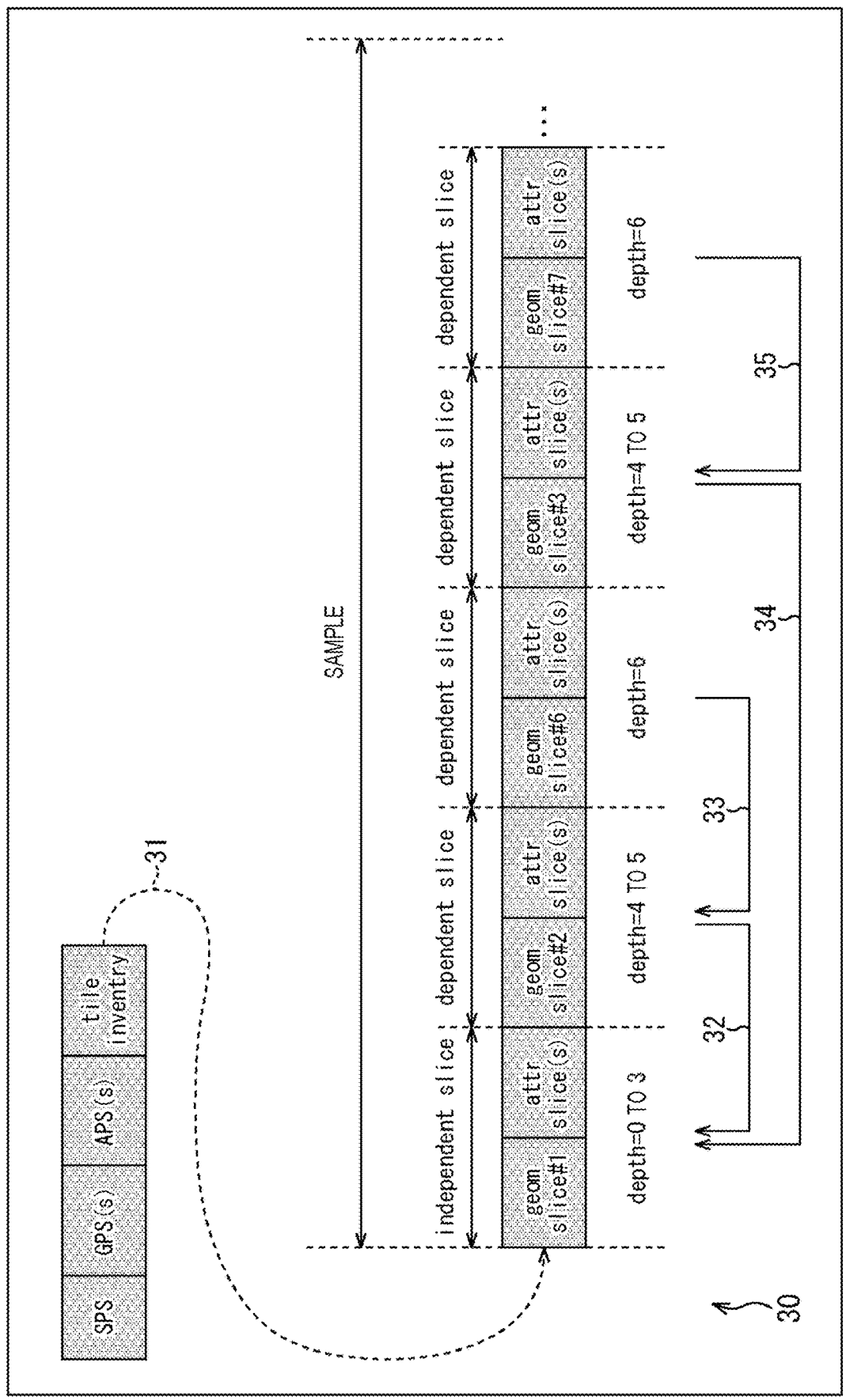
FIG. 3 is a diagram illustrating a structure of a bitstream.

FIG. 3 is a diagram illustrating a main configuration example of a bitstream that has such a slice structure. A bitstream 30 indicated in gray in FIG. 3 is a bitstream of a point cloud in which the geometry is processed to have the tree structure and the slice structure and is encoded, as in FIG. 2. FIG. 3 illustrates a part of the bitstream.

As illustrated in FIG. 3, the bitstream 30 includes a sequence parameter set (SPS), a geometry parameter set (GPS), an attribute parameter set (APS), and a tile inventory. The sequence parameter set is a parameter set related to the entire sequence. The geometry parameter set is a parameter set related to geometry. The geometry parameter set may be different on a geometry slice basis. The attribute parameter set is a parameter set related to the attribute. The attribute parameter set may be different on the attribute slice basis. Tile inventory stores positional information of the tiles. The number of tiles and positional information of the tiles are variable for each frame.

As indicated by a dotted arrow 31, subsequently to the data, a bitstream of a point cloud is arranged for each sample. The sample is a point cloud at a certain time and corresponds to a frame of a moving image. In each sample, the bitstream is arranged for each slice. In each slice, the geometry bitstream and the attribute bitstream are arranged in this order.

In FIG. 3, each square indicates a data unit. A data unit of "geom_slice #1" is a data unit that stores a geometry bitstream of slice #1. A data unit of "attr slice (s)" subsequent to this data unit is a data unit that stores the attribute bitstream of slice #1. The same slice_identification information (slice_id) is allocated to the data unit of the geometry and the attribute included in the same slice. Note that the attribute can be divided into slices for each parameter, and a plurality of attribute slices can be stored in one data unit. That is, these data units are data units corresponding to slice #1 which is an independent slice, and store data of Depth 0 to Depth 3 of the tree structure in FIG. 2.

In the present specification, a data unit that stores a bitstream of geometry is also referred to as a geometry data unit. Further, a data unit that stores a bitstream of an attribute is also referred to as an attribute data unit.

The data unit of "geom_slice #2" is a geometry data unit that stores the geometry bitstream of slice #2. The data unit of "attr slice (s)" subsequent to this geometry data unit is the attribute data unit that stores the attribute bitstream of slice #2. That is, these data units are data units corresponding to slice #2 which is the dependent slice and store data of the area A of the depth 4 and the depth 5 of the tree structure of FIG. 2. Slice #2 is dependent on slice #1, as indicated by an arrow 32.

The data unit of "geom_slice #6" is a geometry data unit that stores the geometry bitstream of slice #6. The data unit of "attr slice (s)" subsequent to this geometry data unit is the attribute data unit that stores the attribute bitstream of slice #6. That is, these data units are data units corresponding to slice #6 which is the dependent slice, and store data of the area A of Depth 6 of the tree structure of FIG. 2. Slice #6 is directly dependent on slice #2, as indicated by arrow 33. In other words, slice #6 is also indirectly dependent on slice #1.

The data unit of "geom_slice #3" is a geometry data unit that stores the geometry bitstream of slice #3. A data unit of "attr slice (s)" subsequent to this geometry data unit is a data unit that stores the attribute bitstream of slice #3. That is, these data units are data units corresponding to slice #3 which is the dependent slice, and store data of the area B of Depth 4 and Depth 5 of the tree structure of FIG. 2. Slice #3 is dependent on slice #1, as indicated by an arrow 34.

The data unit of "geom_slice #7" is a geometry data unit that stores the geometry bitstream of slice #7. A data unit of "attr slice (s)" following this geometry data unit is a data unit that stores the attribute bitstream of slice #7. That is, these data units are data units corresponding to slice #7 which is the dependent slice, and store data of the area B of the depth 6 of the tree structure of FIG. 2. Slice #7 is directly dependent on slice #3, as indicated by arrow 35. In other words, slice #7 is also indirectly dependent on slice #1.

Although not illustrated, data units (a geometry data unit and an attribute data unit) respectively corresponding to slice #4, slice #8, slice #5, and slice #9 are arranged in a similar manner. Note that the slice and the tile are associated with each other with tile identification information (tile id) stored in the geometry data unit.

In a case where such a slice structure is not formed in the bitstream, in order to perform scalable decoding, a decoder is required to parse (analyze) the bitstream and ascertain which depth of data corresponds to which portion of the bitstream. On the other hand, by forming the bitstream with the slice structure, as described above, the decoder can easily select data to be decoded on the slice basis.

For example, in a case where the data of slice #1 is obtained in the tree structure of FIG. 2, the decoder may decode the bitstream stored in the data unit corresponding to slice #1 of FIG. 3. Further, in a case where the data of slice #2 is obtained, the decoder may decode the bitstream stored in the data unit corresponding to slice #1 and the bitstream stored in the data unit corresponding to slice #2. In the case where the data of slice #6 is obtained, the decoder may decode the bitstream stored in the data unit corresponding to slice #1, the bitstream stored in the data unit corresponding to slice #2, and the bitstream stored in the data unit corresponding to slice #6.

Similarly, in a case where the data of slice #3 is obtained, the decoder may decode a bitstream stored in a data unit corresponding to slice #1 and a bitstream stored in a data unit corresponding to slice #3. In a case where the data of slice #7 is obtained, the decoder may decode the bitstream stored in the data unit corresponding to slice #1, the bitstream stored in the data unit corresponding to slice #3, and the bitstream stored in the data unit corresponding to slice #7.

In a case where the data of slice #4 is obtained, the decoder may decode the bitstream stored in the data unit corresponding to slice #1 and the bitstream stored in the data unit corresponding to slice #4. In a case where the data of slice #8 is obtained, the decoder may decode the bitstream stored in the data unit corresponding to slice #1, the bitstream stored in the data unit corresponding to slice #4, and the bitstream stored in the data unit corresponding to slice #8.

In a case where the data of slice #5 is obtained, the decoder may decode the bitstream stored in the data unit corresponding to slice #1 and the bitstream stored in the data unit corresponding to slice #5. In a case where the data of slice #9 is obtained, the decoder may decode the bitstream stored in the data unit corresponding to slice #1, the bitstream stored in the data unit corresponding to slice #5, and the bitstream stored in the data unit corresponding to slice #9.

Therefore, the decoder can perform the scalable decoding more easily.

Note that, in the present specification, the independent slice of the geometry is also referred to as an independent geometry slice. The dependent slice of the geometry is also referred to as dependent geometry slices. Further, the independent slice of the attribute is also referred to as an independent attribute slice. The dependent slice of the attribute is also referred to as a dependent attribute slice.

<Storing of G-PCC Content in ISOBMFF>

Non Patent Document 5 discloses a method of storing G-PCC content in ISOBMFF for the purpose of improving the efficiency of a reproduction process and network distribution of the G-PCC content (G-PCC bitstream) from a local storage. This method is being standardized in MPEG-I Part 18 (ISO/IEC 23090-18).

Figure 4:
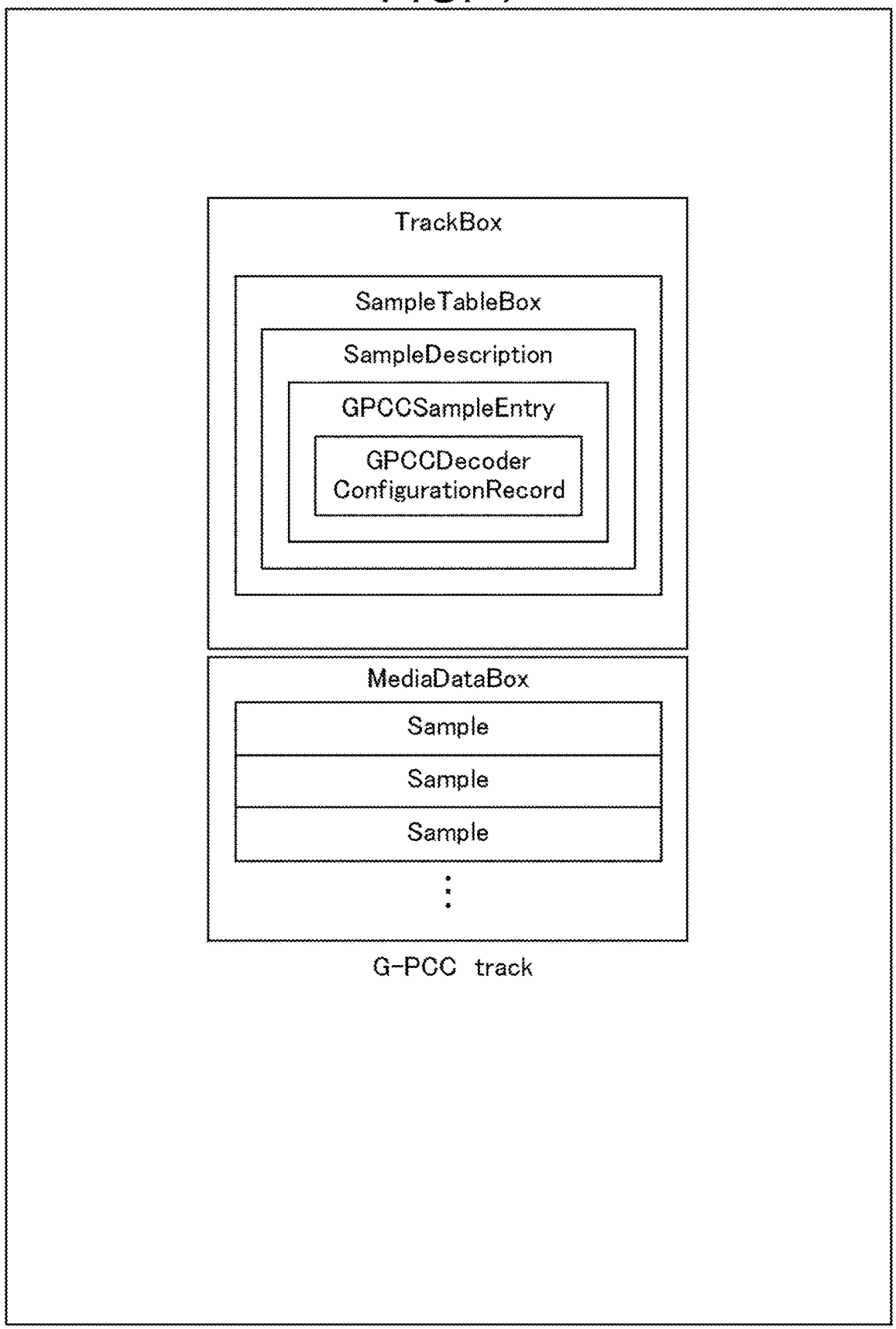
FIG. 4 is a diagram illustrating a structure of a content file.

FIG. 4 is a diagram illustrating an example of a file structure in that case. In the present specification, the G-PCC content stored in ISOBMFF is also referred to as a content file.

The sequence parameter set is stored in GPCCDecoderConfigurationRecord in the metadata area of the content file. The GPCCDecoderConfigurationRecord may further include a geometry parameter set, an attribute parameter set, and a tile inventory depending on a sample entry type.

A sample of a media data box (Media) includes a geometry slice and an attribute slice corresponding to one point cloud frame. Further, it may include a geometry parameter set, an attribute parameter set, and a tile inventory in accordance with a sample entry type.

<Storing of G-PCC Content that has Slice Structure in ISOBMFF>

For example, as in an L-HEVC file format described in Non Patent Document 2, when a bitstream can be divided into tracks on the slice basis and can be stored, so-called progressive download decoding such as transmission and decoding of only a portion corresponding to a reproduction target depth at the time of distribution of the G-PCC content is enabled. Accordingly, it is possible to inhibit an increase in an amount of data transmission and an amount of data to be decoded. For example, it is possible to inhibit an increase in display delay in delivery of a large-scale point cloud or the like.

However, in Non Patent Document 5, it is not disclosed that G-PCC content that has such a slice structure is stored in ISOBMFF. Therefore, even in a case where some of the slices of G-PCC content is decoded, the entire G-PCC content has to be transmitted, and thus there is a possibility of an increase in an amount of data to be transmitted.

Further, even when a bitstream is divided using tracks, there is information necessary for scalable decoding, such as which depth of data being included in which track, only in the bitstream. Therefore, the decoder is required to parse a bitstream. Furthermore, since intra encoding is applied to G-PCC, a case where the hierarchical structure of the depth changes for each sample (frame) can generally occur. Therefore, in order to obtain information necessary for scalable decoding, the decoder is required to parse the entire bitstream. In this way, there is a possibility of an increase in a load of the reproduction process.

2. Transmission of Scalable Decoding Information by Content File

Accordingly, as illustrated in the top row of a table illustrated in FIG. 5, the scalable decoding information of the G-PCC content that has the slice structure stored in a metadata area of a content file is transmitted (Method 1). Note that, in the present specification, the scalable decoding information is information regarding scalable decoding of the G-PCC content that has a slice structure (used for scalable decoding information). Further, the scalable decoding information is set on the basis of the depth of each slice of the G-PCC content that has a slice structure and a dependency relation between the slices.

For example, an information processing device includes: a scalable decoding information generation unit that generates scalable decoding information regarding scalable decoding of the G-PCC content on the basis of depth information indicating a quality hierarchy level of geometry included in each slice in the G-PCC content including first and second slices and a dependency relation between the first and second slices in the G-PCC content; and a content file generation unit that generates a content file in which the G-PCC content is stored and stores the scalable decoding information in a metadata area of the content file.

For example, according to an information processing method, on the basis of the depth information indicating a quality hierarchy level of geometry included in each slice in the G-PCC content including first and second slices and a dependency relation between the first and second slices in the G-PCC content, scalable decoding information regarding scalable decoding of the G-PCC content is generated, a content file that stores the G-PCC content is generated, and the scalable decoding information is stored in a metadata area of the content file.

Further, for example, the information processing device includes an extraction unit that extracts any slice of the G-PCC content from the content file that stores the G-PCC content including the first and second slices on the basis of the scalable decoding information stored in the metadata area of the content file, and a decoding unit that decodes the slice of the G-PCC content extracted by the extraction unit. Note that the scalable decoding information is information regarding scalable decoding of the G-PCC content and is information generated on the basis of the depth information indicating the quality hierarchy level of the geometry included in the slice in the G-PCC content and the dependency relation between the first and second slices in the G-PCC content.

For example, according to an information processing method, on the basis of scalable decoding information stored in the metadata area of the content file in which the G-PCC content including the first and second slices are stored, any slice of the G-PCC content is extracted from the content file, and the extracted slice of the G-PCC content is decoded.

Note that the scalable decoding information is information regarding scalable decoding of the G-PCC content and is information generated on the basis of the depth information indicating the quality hierarchy level of the geometry included in the slice in the G-PCC content and the dependency relation between the first and second slices in the G-PCC content.

In this way, the decoder can extract and decode a slice necessary for reproducing the point cloud of a desired depth or area on the basis of the scalable decoding information in the metadata area of the content file and can generate presentation information. Accordingly, unnecessary processes (transmission of unnecessary information, parsing of a bitstream, and the like) of the decoder can be reduced. Consequently, an increase in a load on the reproduction process can be suppressed.

As a use case of the G-PCC content, large-scale point cloud data such as map data of a point cloud and a virtual asset (a real movie set is converted into digital data) in movie production is encoded. Such a large-scale point cloud has a very large data amount as a whole, and it is not realistic to reproduce the entire point cloud from the viewpoint of a processing load, a processing delay, and the like. Therefore, it is preferable to perform the scalable decoding in which only a part of data is reproduced by limiting an area to be reproduced or reducing a resolution.

In a case where a G-PCC file is stored in a content file and is transmitted, only necessary information can be transmitted or only necessary information can be decoded more easily by storing scalable decoding information in a metadata area of the content file and supporting the scalable decoding, as described above. As described above, as the data increase, the increase in the load of the reproduction process can be further inhibited, and thus a greater effect can be obtained.

In the content file, there are a structure in which the geometry and the attribute are stored in one track (also referred to as a single track encapsulation structure.) and a structure in which the geometry and the attribute are stored in different tracks (also referred to as multi-track encapsulation structure). In the following description, an example of a single track will be used, but the present technology can be applied to the case of multi-track like the case of single track. Note that, even in the case of a single track, the number of tracks may be plural (there may be a plurality of tracks including the geometry and attribute).

Further, in the following description, as described with reference to FIGS. 3 and 4, the SPS, the GPS, the APS, and the tile inventory are assumed to be stored in GPCCDecoderConfigurationRecord, and only a geometry slice and an attribute slice are stored in a sample. However, some or all of the SPS, the GPS, the APS, and the tile inventory may be stored in the sample.

<2-1. Slice Configuration Information for Each Sample>

As illustrated in the second row from the top of the table illustrated in FIG. 5, the scalable decoding information may include slice configuration information for each sample (Method 1-1). The slice configuration information is information regarding a configuration of a slice in the sample. That is, the decoder can obtain the configuration information of the slice of each sample from the metadata area of the content file. Therefore, the decoder can ascertain the configuration of the slice of each sample without parsing the bitstream (that is, more easily).

For example, as illustrated in the third row from the top of the table illustrated in FIG. 5, the slice configuration information may be stored in codec specific parameters of the SubSampleInformationBox in the metadata area of the content file (Method 1-1-1). For example, the content file generation unit of the encoder may set subsamples for each slice and store the slice configuration information in the codec specific parameters of a subsample information box in the metadata area of the content file. Further, the extraction unit of the decoder may extract any slice of the G-PCC content from the content file on the basis of the slice configuration information stored in the codec specific parameters of the subsample information box in the metadata area of the content file of the subsample set for each slice.

Since intra coding is applied to the G-PCC, a case where the hierarchical structure of the depth changes for each sample (frame) can generally occur. Therefore, when the slice configuration information is stored in a sample group as in the L-HEVC file format, it is necessary to associate the slice configuration information with a sample group that has different information for each sample. Therefore, there is a possibility of an increase in the file size unnecessarily by an amount of grouping information. Further, in order to ascertain the configuration of the slice of a desired sample, the decoder is required to check all the sample groups. Therefore, there is a possibility of an increase in a load on the reproduction process.

As described above, by setting subsamples for each slice and storing the slice configuration information in the codec specific parameters of the subsample information box in the metadata area of the content file, it is possible to inhibit an increase in a file size. Further, since the decoder only needs to confirm the codec specific parameters of the desired subsample information box, it is possible to confirm the slice configuration information more easily. That is, it is possible to suppress an increase in a load on a reproduction process.

<2-1-1. Slice Dependency Relation Information>

For example, as illustrated in the fourth row from the top of the table illustrated in FIG. 5, the slice configuration information may include slice dependency relation information (Method 1-1-2). In the present specification, the slice dependency relation information is information indicating a dependency relation between slices or slice groups. For example, the slice dependency relation information indicates a dependency relation between the first and second slices included in the G-PCC content. Further, in the present specification, a slice group is a plurality of slices corresponding to the same depth.

Figure 7:
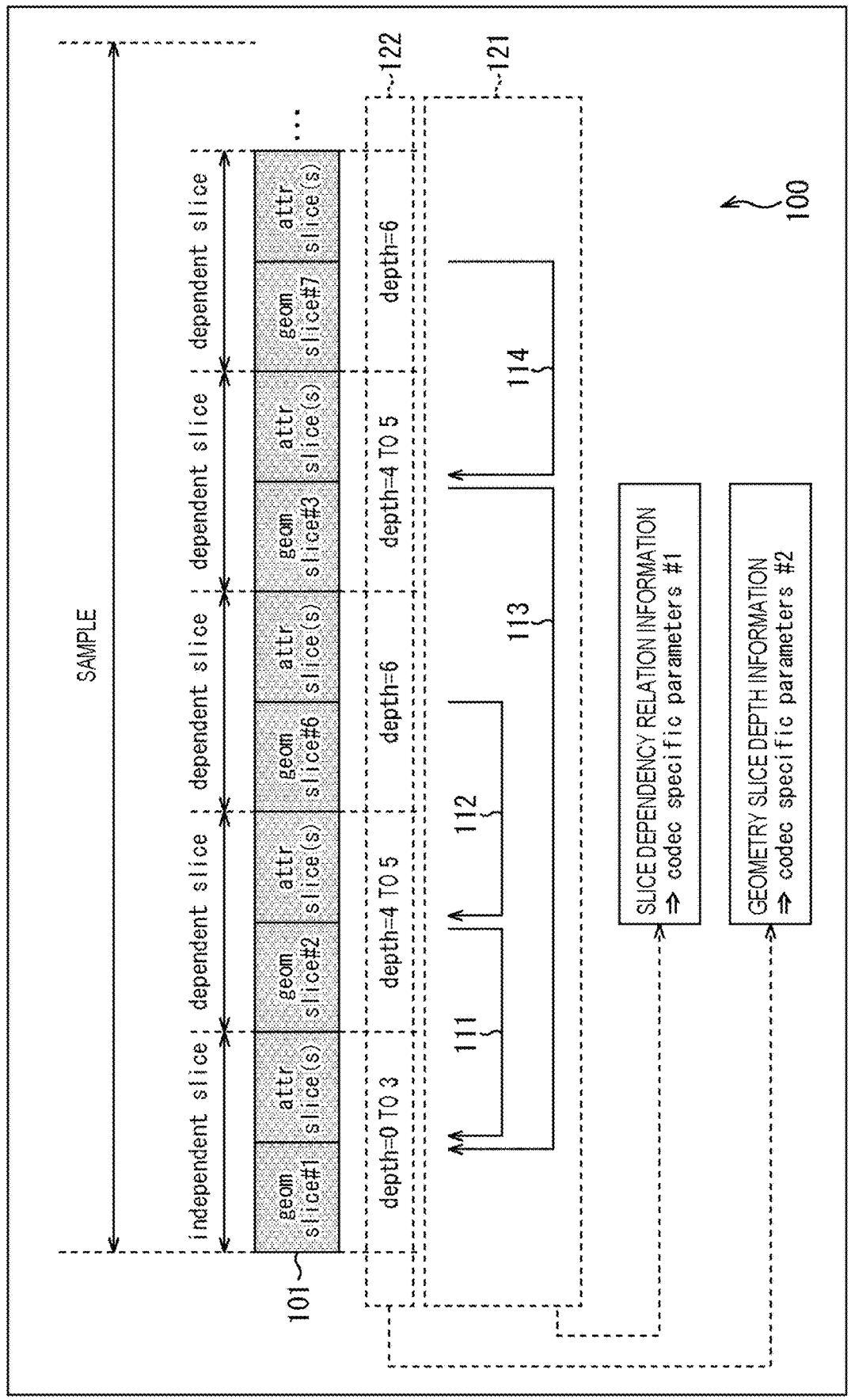
FIG. 7 is a diagram illustrating slice configuration information.

For example, a bitstream 100 illustrated in FIG. 7 indicates a part of G-PCC content similar to the bitstream 30 of FIG. 3. A bitstream 101 indicated in gray indicates a partial configuration in the sample of the bitstream 100. As indicated by arrows 111 to 114, each data unit of the bitstream 101 has a dependency relation between slices similar to the case of FIG. 3.

For example, a geometry data unit of "geom_slice #2" and an attribute data unit of "attr slice(s)" subsequent thereto are data units corresponding to slice #2 and are dependent on a data unit of slice #1 (a geometry data unit of "geom_slice #1" and an attribute data unit of "attr slice (s)" subsequent thereto), as indicated by arrow 111. That is, slice #2 is dependent on slice #1.

Further, a geometry data unit of "geom_slice #6" and an attribute data unit of "attr slice(s)" subsequent thereto are data units corresponding to slice #6, and are directly dependent on a data unit of slice #2 (a geometry data unit of "geom_slice #2" and an attribute data unit of "attr slice(s)" subsequent thereto), as indicated by an arrow 112. That is, slice #6 is directly dependent on slice #2. In other words, slice #6 is also indirectly dependent on slice #1.

Further, a geometry data unit of "geom_slice #3" and an attribute data unit of "attr slice(s)" subsequent thereto are data units corresponding to slice #3 and are dependent on a data unit of slice #1 (a geometry data unit of "geom_slice #1" and an attribute data unit of "attr slice(s)" subsequent thereto), as indicated by an arrow 113. That is, slice #3 is dependent on slice #1.

Further, a geometry data unit of "geom_slice #7" and an attribute data unit of "attr slice(s)" subsequent thereto are data units corresponding to slice #7, and are directly dependent on a data unit of slice #3 (a geometry data unit of "geom_slice #3" and an attribute data unit of "attr slice(s)" subsequent thereto), as indicated by an arrow 114. That is, slice #7 is directly dependent on slice #3. In other words, slice #7 is also indirectly dependent on slice #1.

That is, information indicated by the arrows (for example, the arrows 111 to 114) between slices surrounded by a dotted line frame 121 is the slice dependency relation information. The slice dependency relation information is stored in the metadata area of the content file. In this way, the decoder can obtain the slice dependency relation information from the metadata area of the content file. Therefore, the decoder can ascertain the slice dependency relation information without parsing the bitstream (that is, more easily).

For example, as illustrated in the fifth row from the top of the table illustrated in FIG. 5, the slice dependency relation information may be stored in the codec specific parameters of the subsample information box in the metadata area of the content file (Method 1-1-2-1). For example, the content file generation unit of the encoder may set subsamples for each slice and store the slice dependency relation information in the codec specific parameters of the subsample information box in the metadata area of the content file. Further, the extraction unit of the decoder may extract any slice of the G-PCC content from the content file on the basis of the slice dependency relation information stored in the codec specific parameters of the subsample information box in the metadata area of the content file of the subsample set for each slice.

Since intra coding is applied to the G-PCC, a case where the hierarchical structure of the depth changes for each sample (frame) can generally occur. Therefore, when the slice dependency relation information is stored in the sample group as in the L-HEVC file format, it is necessary to associate the slice dependency relation information with the sample group that has different information for each sample. Therefore, there is a possibility of a file size being unnecessarily increased by the grouping information. Further, in order to ascertain the configuration of the slice of a desired sample, the decoder is required to check all the sample groups. Therefore, there is a possibility of an increase in a load on the reproduction process.

As described above, by setting subsamples for each slice and storing the slice dependency relation information in the codec specific parameters of the subsample information box in the metadata area of the content file, it is possible to inhibit an increase in the file size. Further, since the decoder only needs to confirm the codec specific parameters of the desired subsample information box, it is possible to confirm the slice dependency relation more easily. That is, it is possible to suppress an increase in a load on a reproduction process.

For example, as illustrated in the sixth row from the top of the table illustrated in FIG. 5, the slice dependency relation information may include reference source geometry slice identification information and reference destination geometry slice identification information (Method 1-1-2-2). In the present specification, the reference source geometry slice identification information is identification information of a geometry slice corresponding to the information. That is, the reference source geometry slice identification information is identification information of a geometry slice serving as a reference source (a start point of an arrow in a dotted line frame 121 in FIG. 7) in the dependency relation between the slices or slice groups described above. Further, in the present specification, the reference destination geometry slice identification information is identification information of another geometry slice which is referred to by the geometry slice corresponding to the information. That is, the reference destination geometry slice identification information is identification information of a geometry slice serving as a reference destination (an end point of an arrow in the dotted line frame 121 in FIG. 7) in the dependency relation between the slices or slice groups described above.

In this way, the decoder can obtain the reference source geometry slice identification information and the reference destination geometry slice identification information from the metadata area of the content file. Therefore, the decoder can ascertain the reference source geometry slice identification information and the reference destination geometry slice identification information without parsing the bitstream (that is, more easily).

For example, as illustrated in the seventh row from the top of the table illustrated in FIG. 5, in a case where the slice corresponding to the slice dependency relation information (that is, a slice corresponding to the reference source geometry slice identification information) is an independent geometry slice, the reference source geometry slice identification information and the reference destination geometry slice identification information described above may be the same (Method 1-1-2-2-1). That is, since the independent geometry slice can be decoded without requiring another slice, the reference destination may be set to the independent geometry slice itself. Further, the storing of the reference destination geometry slice identification information may be omitted for the independent geometry slices.

For example, as illustrated in the eighth row from the top of the table illustrated in FIG. 5, the reference source geometry slice identification information and the reference destination geometry slice identification information may be stored in the codec specific parameters of the subsample information box in the metadata area of the content file (Method 1-1-2-2-1). For example, the content file generation unit of the encoder may set subsamples for each slice and store the reference source geometry slice identification information and the reference destination geometry slice identification information in the codec specific parameters of the subsample information box in the metadata area. Further, the extraction unit of the decoder may extract any slice of the G-PCC content from the content file on the basis of the reference source geometry slice identification information and the reference destination geometry slice identification information stored in the codec specific parameters of the subsample information box in the metadata area of the subsample set for each slice.

An example of a syntax of the subsample information box is illustrated in FIG. 8. In this subsample information box, flags are set, as illustrated in the underline 131. Further, as illustrated in an underline 132, the codec specific parameters are provided. The codec specific parameters store information of subsamples determined for each encoding codec.

An example of syntax of the codec specific parameters is illustrated in FIG. 9. As indicated by a dotted line frame 133, the codec specific parameters store reference source geometry slice identification information (geom_slice_id) and reference destination geometry slice identification information (ref_geom_slice_id). The slice_identification information (slice_id) of the geometry slice corresponding to this information is set to geom_slice_id. The slice_identification information (slice_id) of another geometry slice which is referred to by the geometry slice is set to ref_geom_slice_id.

In this way, by setting subsamples for each slice and storing the reference source geometry slice identification information and the reference destination geometry slice identification information in the codec specific parameters of the subsample information box in the metadata area of the content file, it is possible to inhibit an increase in file size. Further, since the decoder only needs to confirm the codec specific parameters of the desired subsample information box, it is possible to confirm the reference relationship of the geometry slices more easily (the geometry slices of the reference source and the reference destination). That is, it is possible to suppress an increase in a load on a reproduction process.

Note that, in the case of the example of FIG. 7, since the geometry data unit and the attribute data unit immediately subsequent thereto constitute one slice, a reference relationship from the attribute slice to the geometry slice is obvious. Accordingly, in the example of FIG. 9, the reference relationship from the attribute slice to the geometry slice is omitted.

<Attribute Geometry Slice Identification Information>

Note that a reference relationship from the attribute slice to the geometry slice may be clarified. For example, as illustrated in the ninth row from the top of the table illustrated in FIG. 5, the slice dependency relation information may include attribute geometry slice identification information (Method 1-1-2-3). The attribute geometry slice identification information is identification information of a geometry slice referred to by the attribute slice. By specifying the reference relationship from the attribute slice to the geometry slice in this way, it is possible to eliminate the constraint of the positional relationship between the geometry data unit and the attribute data unit.

For example, as shown in the tenth row of the top of the table shown in FIG. 5, this attribute geometry slice_identification information may be stored in the codec specific parameters of the subsample information box in the metadata area of the content file (Method 1-1-2-3-1). For example, the content file generation unit of the encoder may set subsamples for each slice and store the attribute geometry slice identification information in the codec specific parameters of the subsample information box in the metadata area. Further, the extraction unit of the decoder may extract any slice of the G-PCC content from the content file on the basis of the attribute geometry slice identification information stored in the codec specific parameters of the subsample information box in the metadata area of the subsample set for each slice.

An example of syntax of the codec specific parameters in this case is illustrated in FIG. 10. As indicated by an underline 134, attribute geometry slice identification information (ref_attr_geom_slice_id) is stored in the codec specific parameters. The slice identification information (slice_id) of the geometry slice which is referred to by the attribute slice corresponding to the information is set to ref_attr_geom_slice_id.

In this way, by setting subsamples for each slice and storing the attribute geometry slice identification information in the codec specific parameters of the subsample information box in the metadata area of the content file, it is possible to inhibit an increase in file size. Further, since the decoder only needs to confirm the codec specific parameters of the desired subsample information box, it is possible to confirm the geometry slice referred to from the attribute more easily. That is, it is possible to suppress an increase in a load on a reproduction process.

<Non-Scalable Encoding>

The non-scalable encoding may be applied to the attribute. The non-scalable encoding is a coding scheme that is not compatible with scalable decoding. For example, in a case where non-scalable encoding is applied to an attribute, the attribute slice is set to be able to be decoded independently from other attribute slices (that is, without referring to another attribute slice). Accordingly, data (depths) overlaps between attribute data units.

A configuration example of the bitstream in a case where the non-scalable encoding is applied to the attribute in this way is illustrated in FIG. 11. A gray bitstream 141 illustrated in FIG. 11 indicates a part of the configuration of the G-PCC content (G-PCC bitstream). In the case of the bitstream 141, an attribute data unit 151 stores an attribute slice corresponding to the geometry of Depth 0 to Depth 3. An attribute data unit 152 stores an attribute slice corresponding to the geometry of Depth 0 to Depth 5. An attribute data unit 153 stores an attribute slice corresponding to the geometry of Depth 0 to Depth 6.

Accordingly, for example, the attribute corresponding to the geometry of Depth 0 to Depth 6 can be obtained by decoding the attribute data unit 153. In other words, in order to obtain the attribute corresponding to the geometry of Depth 6, the attribute data unit 153 may be decoded (decoding of the other attribute data units is unnecessary).

Similarly, by decoding the attribute data unit 152, the attribute corresponding to the geometry of Depth 0 to Depth 5 can be obtained. In other words, in order to obtain the attribute corresponding to the geometry of Depth 4 or Depth 5, the attribute data unit 152 may be decoded (decoding of the other attribute data units is unnecessary).

Similarly, by decoding the attribute data unit 151, the attribute corresponding to the geometry of Depth 0 to Depth 3 can be obtained. In other words, in order to obtain the attribute corresponding to one geometry of Depth 0 to Depth 3, the attribute data unit 151 may be decoded (decoding of the other attribute data units is unnecessary).

In such a case, for example, a plurality of geometry data units may be candidates for a reference target for a single attribute data unit, such as the attribute data unit 152 or the attribute data unit 153. Accordingly, when the non-scalable encoding is applied to the attribute, the slice_identification information of the geometry slice corresponding to the lowest layer (the maximum depth) in the depths corresponding to the attribute slice (the attribute data unit) is set in the attribute geometry slice identification information. A reference relationship between the geometry slices (a reference relationship with a higher geometry slice) is indicated by ref_geom_slice_id.

In the present specification, the attribute geometry slice identification information in a case where the non-scalable encoding is applied to the attribute in this way is also referred to as non-scalable encoding attribute geometry slice identification information.

That is, as illustrated in the eleventh row from the top of the table illustrated in FIG. 5, the slice dependency relation information may include non-scalable encoding attribute geometry slice identification information that is identification information of a geometry slice to which an attribute slice to which non-scalable encoding is applied refers (Method 1-1-2-4).

For example, as illustrated in the twelfth row from the top of the table illustrated in FIG. 5, the non-scalable encoding attribute geometry slice identification information may include identification information of a geometry slice or a geometry slice group that has the geometry having the largest depth information among the geometry slices or geometry slice groups referred to by the attribute slice corresponding to the information (Method 1-1-2-4-1). Note that, in the present specification, a geometry slice group is a plurality of geometry slices corresponding to the same depth.

In this way, even in a case where the non-scalable encoding is applied to the attribute, it is possible to eliminate a constraint on a positional relationship between the geometry data unit and the attribute data unit.

For example, as illustrated in the thirteenth row of the top of the table illustrated in FIG. 5, the non-scalable encoding attribute geometry slice identification information may be stored in the codec specific parameters of the subsample information box of the metadata area of the content file (Method 1-1-2-4-2). For example, the content file generation unit of the encoder may set subsamples for each slice and store the non-scalable encoding attribute geometry slice identification information in the codec specific parameters of the subsample information box in the metadata area of the content file. Further, the extraction unit of the decoder may extract any slice of the G-PCC content from the content file on the basis of the non-scalable encoding attribute geometry slice identification information stored in the codec specific parameters of the subsample information box in the metadata area of the content file of the subsample set for each slice.

In this way, by setting the subsamples for each slice and storing the non-scalable encoding attribute geometry slice identification information in the codec specific parameters of the subsample information box in the metadata area of the content file, an increase in file size can be inhibited. Further, the decoder only needs to confirm the codec specific parameters of the desired subsample information box. Therefore, it is possible to confirm the geometry slice referred to from the attribute more easily even in a case where the non-scalable encoding is applied to the attribute. That is, it is possible to suppress an increase in a load on a reproduction process.

Further, as illustrated in the fourteenth row from the top of the table illustrated in FIG. 5, the slice dependency relation information may include a non-scalable encoding flag (Method 1-1-2-4-3). The non-scalable encoding flag is flag information indicating whether or not the non-scalable encoding is applied to the attribute slice. By storing such information, the decoder can easily ascertain whether or not the non-scalable encoding is applied.

Further, as illustrated in the fifteenth row from the top of the table illustrated in FIG. 5, the non-scalable encoding flag may be stored in the codec specific parameters of the subsample information box in the metadata area of the content file (Method 1-1-2-4-3-1). For example, the content file generation unit of the encoder may set the subsamples for each slice and store the non-scalable encoding flag in the codec specific parameters of the subsample information box in the metadata area of the content file. Further, the extraction unit of the decoder may extract any slice of the G-PCC content from the content file on the basis of the non-scalable encoding flag stored in the codec specific parameters of the subsample information box in the metadata area of the content file of the subsample set for each slice.

An example of a syntax of the codec specific parameters in this case is illustrated in FIG. 12. As indicated in a dotted frame 161, the codec specific parameters store a non-scalable encoding flag (non_scalable_flag) and non-scalable encoding attribute geometry slice identification information (ref_attr_geom_slice_id).

In a case where the attribute slice is scalable-encoded, a value of non_scalable_flag is set to 0 (false). In a case where the attribute slice is non-scalable encoded, the value of non_scalable_flag is set to 1 (true).

In a case where the value of non_scalable_flag is 1 (true), ref_attr_geom_slice_id is set as non-scalable encoding attribute geometry slice identification information. That is, in this case, in ref_attr_geom_slice_id, identification information (slice_id) of the geometry slice or the geometry slice group including the maximum depth among the geometry slices or the geometry slice groups referred to by the attribute slice corresponding to the information is set.

In a case where the value of non_scalable_flag is 0 (false), ref_attr_geom_slice_id is set as attribute geometry slice identification information. That is, in this case, slice_identification information (slice_id) of the geometry slice referred to by the attribute slice corresponding to the information is set to ref_attr_geom_slice_id.

<Changing Payload Type>

Note that, in the codec specific parameters, as illustrated in the bottom of the table illustrated in FIG. 5, a payload type (PayloadType) of the slice dependency relation information of the independent geometry slice and the payload type of the slice dependency relation information of the dependent geometry slice may be set to different values.

FIG. 13 is a diagram illustrating an example of a syntax of the codec specific parameters in that case. In the case of this example, as indicated in a dotted frame 162, the payload type of the slice dependency relation information of the independent geometry slice is set to "2", and the payload type of the slice dependency relation information of the dependent geometry slice is set to "9". In this way, the decoder can identify the type of geometry slice on the basis of this payload type more easily.

Note that, in the example of FIG. 13, "2" and "9" have been described as examples of the value of the payload type, but these values are exemplary. The values of the payload type of the independent geometry slice and the dependent geometry slice may be different values from each other and are not limited to these examples.

<2-1-2. Geometry Slice Depth Information>

As illustrated at the top of the table illustrated in FIG. 6, the slice configuration information may include geometry slice depth information (Method 1-1-3). In the present specification, the geometry slice depth information is information regarding the depth information of the geometry included in the geometry slice or the geometry slice group corresponding to the information. The slice configuration information may include both the slice dependency relation information (Method 1-1-2) and the geometry slice depth information.

For example, in FIG. 7, a geometry data unit of "geom_slice #1" corresponds to slice #1. Slice #1 includes geometry of Depth 0 to Depth 3. Further, the geometry data unit of "geom_slice #2" corresponds to slice #2. Slice #2 includes geometry of Depth 4 and Depth 5. The geometry data unit of "geom_slice #6" corresponds to slice #6. Slice

6 includes geometry of Depth 6. The geometry data unit of "geom_slice #3" corresponds to slice #3. Slice #3 includes geometry of Depth 4 and Depth 5. The geometry data unit of "geom_slice #7" corresponds to slice #7. Slice #7 includes geometry of Depth 6.

That is, the depth information of each slice indicated in a dotted line frame 122 is the geometry slice depth information. The geometry slice depth information is stored in the metadata area of the content file. In this way, the decoder can obtain the geometry slice depth information from the metadata area of the content file. Accordingly, the decoder can ascertain the geometry slice depth information without parsing the bitstream (that is., more easily).

Note that the geometry slice may include geometry of a plurality of depths.

Therefore, as illustrated in the second row from the top of the table illustrated in FIG. 6, the geometry slice depth information may include the minimum depth information (Method 1-1-3-1). In the present specification, the minimum depth information indicates information indicating the minimum value of the depth information in the geometry slice or the geometry slice group corresponding to the information. In this way, the decoder can obtain the minimum depth information from the metadata area of the content file. Therefore, the decoder can ascertain a minimum value of the depth included in the geometry slice without parsing the bitstream (that is, more easily).

Further, as illustrated in the third row from the top of the table illustrated in FIG. 6, the geometry slice depth information may include the maximum depth information (Method 1-1-3-2). In the present specification, the maximum depth information indicates information indicating the maximum value of the depth information in the geometry slice or the geometry slice group corresponding to the information. In this way, the decoder can obtain the maximum depth information from the metadata area of the content file. Accordingly, the decoder can ascertain the maximum value of the depth included in the geometry slice without parsing the bitstream (that is, more easily).

Of course, the geometry slice depth information may include both the minimum depth information and the maximum depth information. In that case, the decoder can ascertain a range of depths included in the geometry slice without parsing the bitstream (that is, more easily).

As illustrated in the fourth row from the top of the table shown in FIG. 6, this geometry slice depth information may be stored in the codec specific parameters of the subsample information box in the metadata area of the content file (Method 1-1-3-3). For example, the content file generation unit of the encoder may set subsamples for each slice or slice group and store the geometry slice depth information in the codec specific parameters of the subsample information box in the metadata area of the content file. Further, the extraction unit of the decoder may extract any slice of the G-PCC content from the content file on the basis of the geometry slice depth information stored in the codec specific parameters of the subsample information box in the metadata area of the content file of the subsample set for each slice or slice group.

FIG. 14 illustrates an example of a syntax of the codec specific parameters in this case. The minimum depth information (min_depth) and the maximum depth information (max_depth) are set in the codec specific parameters illustrated in FIG. 14, as indicated in a dotted frame 171.

In this way, by setting subsamples for each slice or slice group and storing the geometry slice depth information in the codec specific parameters of the subsample information box in the metadata area of the content file, it is possible to inhibit an increase in file size. Further, since the decoder only needs to confirm the codec specific parameters of the desired subsample information box, it is possible to more easily confirm the depth included in the geometry slice. That is, it is possible to suppress an increase in a load on a reproduction process.

Note that, in a case where a plurality of geometry slices that has the same depth range are continuous, the geometry slices are set as one subsample which is a geometry slice group, as described above. Then, the geometry slice depth information is generated for each subsample. That is, the geometry slice depth information of each slice of the geometry slice group is collected into one piece of geometry slice depth information. Therefore, it is possible to inhibit an increase in the subsample entry as compared with a case where the geometry slice depth information is generated for each slice of the geometry slice group. Therefore, an increase in the bit cost (that is, a data amount of a bitstream) can be inhibited.

Note that, in a case where the geometry slice or the geometry slice group includes only one depth, the minimum depth information (min_depth) and the maximum depth information (max_depth) are set to the same value.

Further, as illustrated in the fifth row from the top of the table illustrated in FIG. 6, flags of the subsample information box of the codec specific parameters that stores the geometry slice depth information and flags of the subsample information box of the codec specific parameters that stores the slice dependency relation information may be set to different values (Method 1-1-3-3-1).

That is, the slice configuration information may further include slice dependency relation information indicating a dependency relation between the first and second slices in addition to the geometry slice depth information. Then, the content file generation unit of the encoder may set flags of the subsample information box that stores the geometry slice depth information to a different value from the flags of the subsample information box that stores the slice dependency relation information. Further, the flags of the subsample information box in which the geometry slice depth information is stored and the flags of the subsample information box in which the slice dependency relation information is stored may be set to different values.

For example, as illustrated in FIG. 14, whereas the flags of the subsample information box in which the slice dependency relation information is stored is set to "0", the flags of the subsample information box in which the geometry slice depth information is stored is set to "2". Of course, these values are exemplary, and the values of flags are not limited to these examples (optional).

In this way, the geometry slice depth information and the slice dependency relation information can be stored in mutually different subsample information boxes that have mutually different values of flags, and these pieces of information can be used in combination.

<2-2. Track Configuration Information>

As illustrated in the sixth row from the top of the table illustrated in FIG. 6, scalable decoding information may include track configuration information (Method 1-2). In the present specification, the track configuration information is information regarding a configuration of a track that stores the G-PCC content on a slice basis in the content file. That is, the decoder can obtain configuration information of a track included in the content file from the metadata area of the content file. Therefore, the decoder can ascertain the configuration of the track of the content file without parsing the bitstream (that is, more easily). Note that the scalable decoding information may include both the slice configuration information (method 1-1) and the track configuration information for each sample.

<2-2-1. Track Depth Information>

As illustrated in the seventh row from the top of the table illustrated in FIG. 6, the track configuration information may include track depth information (Method 1-2-1). In the present specification, the track depth information is information regarding the depth information of the geometry of all slices included in the track corresponding to the information.

Figure 15:
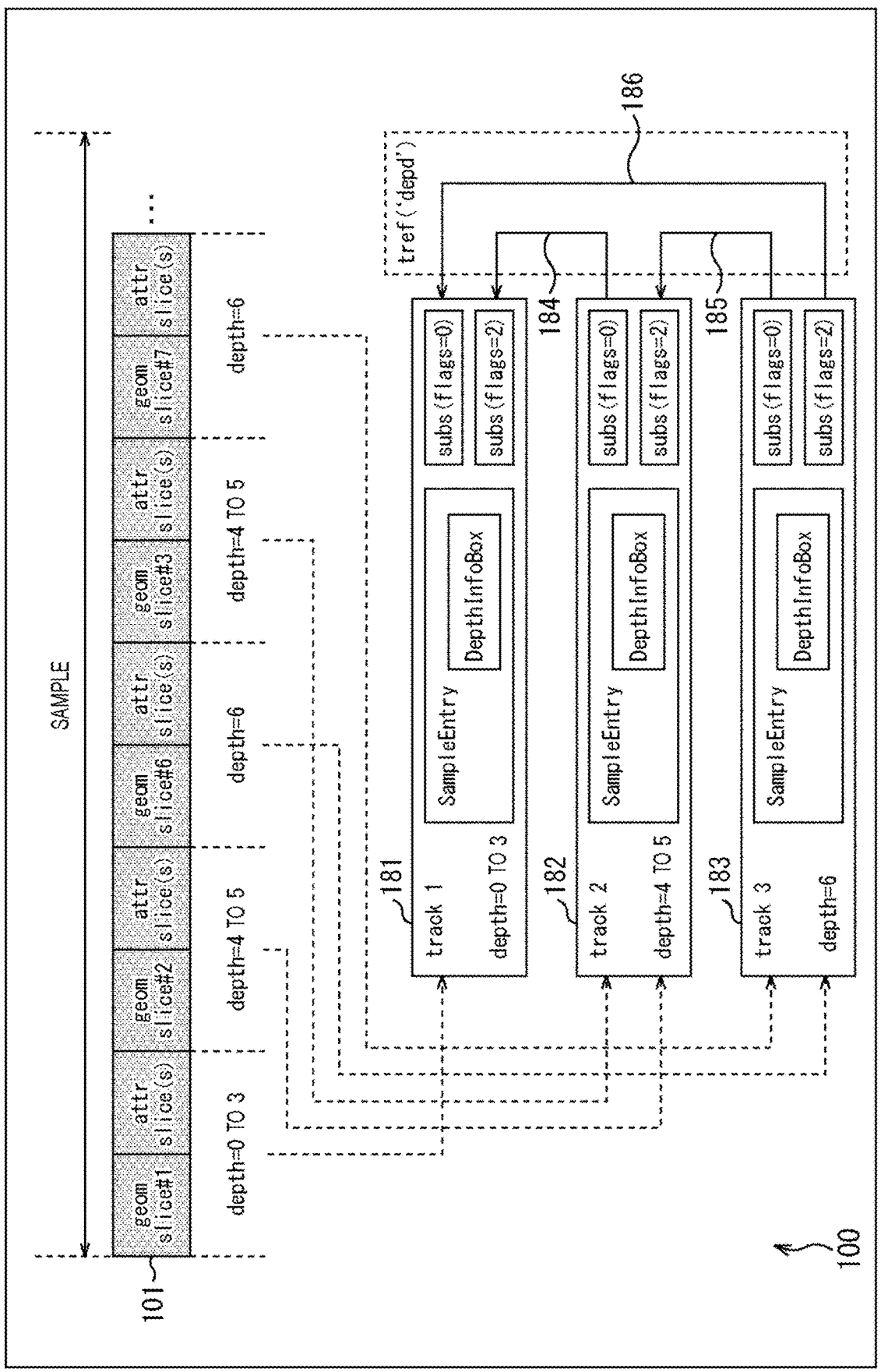
FIG. 15 is a diagram illustrating track configuration information.

FIG. 15 is a diagram illustrating an example of a storing state of a bitstream. It is assumed that the content file (ISOBMFF) has Track 1 (track 1) indicated by a rectangle 181, Track 2 (track 2) indicated by a rectangle 182, and Track 3 (track 3) indicated by a rectangle 183. It is assumed that a geometry bitstream and an attribute bitstream of Depth 0 to Depth 3 (depth=0 to 3) are stored in Track 1. It is assumed that a geometry bitstream and an attribute bitstream of Depth 4 and Depth 5 (depth=4 to 5) are stored in Track 2. It is assumed that a geometry bitstream and an attribute bitstream that has Depth 6 (depth=6) are stored in Track 3.

In this case, it is assumed that each data unit (slice) of the bitstream 101 is stored in each track, as indicated by a dotted arrow in FIG. 15. That is, the geometry and the attribute of slice #1 are stored in Track 1. The geometry and the attribute of slice #2 are stored in Track 2. The geometry and the attribute of slice #3 are stored in Track 2. The geometry and the attribute of slice #6 are stored in Track 3. The geometry and the attribute of slice #7 are stored in Track 7.

In this way, the track depth information indicates which depth data is stored in each track. The track depth information is set for each track. That is, the track depth information indicates which depth data is stored in the track corresponding to the information. As described above, data of a plurality of depths may be stored in the tracks. Further, data of a plurality of samples can be stored in the tracks. The slice configurations of the samples may not be identical. That is, the depth included in each track can be changed for each sample.

As illustrated in the eighth row from the top of the table illustrated in FIG. 6, the track depth information may include track minimum depth information indicating a minimum value of the depth information in the track corresponding to the information (Method 1-2-1-1). That is, the track minimum depth information indicates the minimum value of the depth information among all the samples included in the track corresponding to the information.

Further, as illustrated in the ninth row from the top of the table illustrated in FIG. 6, the track depth information may include track maximum depth information indicating the maximum value of the depth information in the track corresponding to the information (Method 1-2-1-2). That is, the track maximum depth information indicates the maximum value of the depth information among all samples included in the track corresponding to the information. Note that the track depth information may include both the track minimum depth information (Method 1-2-1-1) and the track maximum depth information.

Further, as illustrated in the tenth row from the top of the table illustrated in FIG. 6, the track depth information may include a matching flag (Method 1-2-1-3). In the present specification, the matching flag is flag information indicating whether or not the sample minimum depth information that is a minimum value of the depth information in each sample included in the track corresponding to the information matches the track minimum depth information, and the sample maximum depth information that is a maximum value of the depth information in each sample included in the track corresponding to the information matches the track maximum depth information. That is, the matching flag is flag information indicating whether or not the minimum value and the maximum value of the depth information are common to all the samples in the track. Note that the track depth information may include all of the matching flag, the track minimum depth information (Method 1-2-1-1), and the track maximum depth information (Method 1-2-1-2).

Further, as illustrated in the eleventh row from the top of the table illustrated in FIG. 6, the track depth information may be stored in the depth information box (DepthInfoBox) of the sample entry (SampleEntry) corresponding to each track of the metadata area (Method 1-2-1-4). For example, the content file generation unit of the encoder may store the track depth information in the depth information box of the sample entry of the metadata area. Further, the extraction unit of the decoder may extract any slice of the G-PCC content from the content file on the basis of the track depth information stored in the depth information box of the sample entry of the metadata area.

FIG. 16 is a diagram illustrating an example of a syntax of a depth information box (DepthInfoBox). As illustrated in FIG. 16, track minimum depth information (track_min_depth), track maximum depth information (track_max_depth), and a matching flag (fixed_depth) are set in the depth information box.

In a case where the matching flag is "0" (false), this flag indicates that the sample minimum depth information and the sample maximum depth information of all the samples in the track take values within a range of the track minimum depth information (track_min_depth) to the track maximum depth information (track_max_depth). That is, in this case, the minimum value or the maximum value of the depth of each sample or both may be changed for each sample.

When the matching flag is "1" (true), this flag indicates that the sample minimum depth information of each sample in the track matches the track minimum depth information (track_min_depth), and the sample maximum depth information of each sample in the track matches the track maximum depth information (track_min_depth). That is, in this case, the minimum value and the maximum value of the depth of each sample take common values in all the samples.

Note that, for example, in a case where the track includes only data of one depth as in Track 3, the value of the matching flag (fixed_depth) is set to "1", and the track minimum depth information (track_min_depth) and the track maximum depth information (track_max_depth) take the same value (track_min_depth=track_max_depth).

As described above, by storing the track depth information in the depth information box of the sample entry corresponding to each track, the decoder can more easily (without parsing the bitstream) ascertain which depth data is stored in each track on the basis of the information. That is, it is possible to suppress an increase in a load on a reproduction process.

For example, in a case where fixed_depth=1 and there is a desired LoD within the range of track_min_depth to track_max_depth, it is possible to reliably obtain the desired LoD by processing this track and the track to be referred to. That is, the track depth information can be useful information in a track selection process of a client.

Instead of the depth, the maximum and minimum LoD values obtained by processing this track and the track to be referred to (if any) may be signaled.

Further, a non-scalable encoding attribute flag (non_scalable_attribute_flag) that clearly indicates whether or not an attribute slice to which non-scalable encoding is applied is included in the track may be added. When the non-scalable encoding attribute flag (non_scalable_attribute_flag) is "1" (true), this flag indicates that the attribute slice to which the non-scalable encoding is applied is included in the track. Further, in a case where the non-scalable encoding attribute flag (non_scalable_attribute_flag) is "0" (false), this flag indicates that the attribute slice to which the non-scalable encoding is applied is not included in the track.

<2-2-2. Track Dependency Relation Information>

As illustrated in the twelfth row from the top of the table illustrated in FIG. 6, the track configuration information may include track dependency relation information (Method 1-2-2). In the present specification, the track dependency relation information is information indicating a dependency relation between tracks (for example, a dependency relation between the first and second tracks). Note that the track configuration information may include both the track depth information (Method 1-2-1) and the track dependency relation information.

For example, in FIG. 15, each track (Track 1 to Track 3) has a dependency relation between tracks as indicated by arrows 184 and 185.

For example, Track 2 is dependent on Track 1, as indicated by the arrow 184. That is, in order to decode the bitstream of Track 2 and restore the geometry or attribute of Depth 4 or Depth 5, it is also necessary to decode the bitstream of Track 1 corresponding to Depth 0 to Depth 3.

Similarly, Track 3 is directly dependent on Track 2, as indicated by the arrow 185. That is, Track 3 is indirectly dependent on Track 1, as indicated by an arrow 186. The track dependency relation information indicates such a dependency relation between tracks.

As illustrated in the thirteenth row from the top of the table illustrated in FIG. 6, the track dependency relation information may include dependent information indicating another track including a slice necessary for decoding the dependent slice included in the track corresponding to the information (Method 1-2-2-1). The dependent information is information indicating the dependent destination, that is, the track on the end point side of the above-described arrow as the track dependency relation information on the start point side of the above-described arrows (the arrows 184 to 186). By storing the dependent information in the metadata area of the content file, the decoder can more easily confirm other tracks necessary for decoding the track to be processed on the basis of the dependent information without parsing the bitstream. Consequently, an increase in a load on the reproduction process can be suppressed.

Note that, as illustrated in the fourteenth row from the top of the table illustrated in FIG. 6, the dependent information may indicate all the other tracks including the slice necessary for decoding the dependent slice included in the track corresponding to the information (Method 1-2-2-1-1). For example, in the case of FIG. 15, the dependent information of Track 3 may include both the information corresponding to the arrow 185 and the information corresponding to the arrow 186.

Further, as illustrated in the fifteenth row from the top of the table illustrated in FIG. 6, this dependent information may indicate another track including a slice referred to from the information (Method 1-2-2-1-2). That is, the dependent information may indicate only the slice directly dependent on the slice corresponding to the information. For example, in the case of FIG. 15, the dependent information of Track 3 may include only the information corresponding to the arrow 185.

As illustrated in the bottom of the table illustrated in FIG. 6, the track dependency relation information may be stored as a track reference in the metadata area.

For example, the dependent information as illustrated in FIG. 15 may be stored as a track reference. In this case, the reference_type of the track reference may be, for example, depd (reference_type='depd').

Further, only a track including a slice directly referred to in decoding of a dependent slice included in the track may be associated using the track reference.

The sample entry 4CC (Sample Entry 4CC) of the track which includes the independent slice and is decodable by the track alone may be specified as 'gpc1'. Further, a sample entry 4CC (SampleEntry 4CC) of a track that does not include an independent slice and cannot be decoded by the track alone may be specified as 'lgp1'.

Further, as illustrated in the sixteenth row from the top of the table illustrated in FIG. 6, the track dependency relation information may include independent information indicating another track including a dependent slice for which an independent slice included in a track corresponding to the information in decoding is necessary (Method 1-2-2-2).

For example, in FIG. 15, as indicated by the arrow 184, the independent slice of Track 1 is referred to when the dependent slice of Track 2 is decoded. Similarly, as indicated by the arrow 186, the independent slice of Track 1 is referred to when the dependent slice of Track 3 is decoded.

Figure 17:
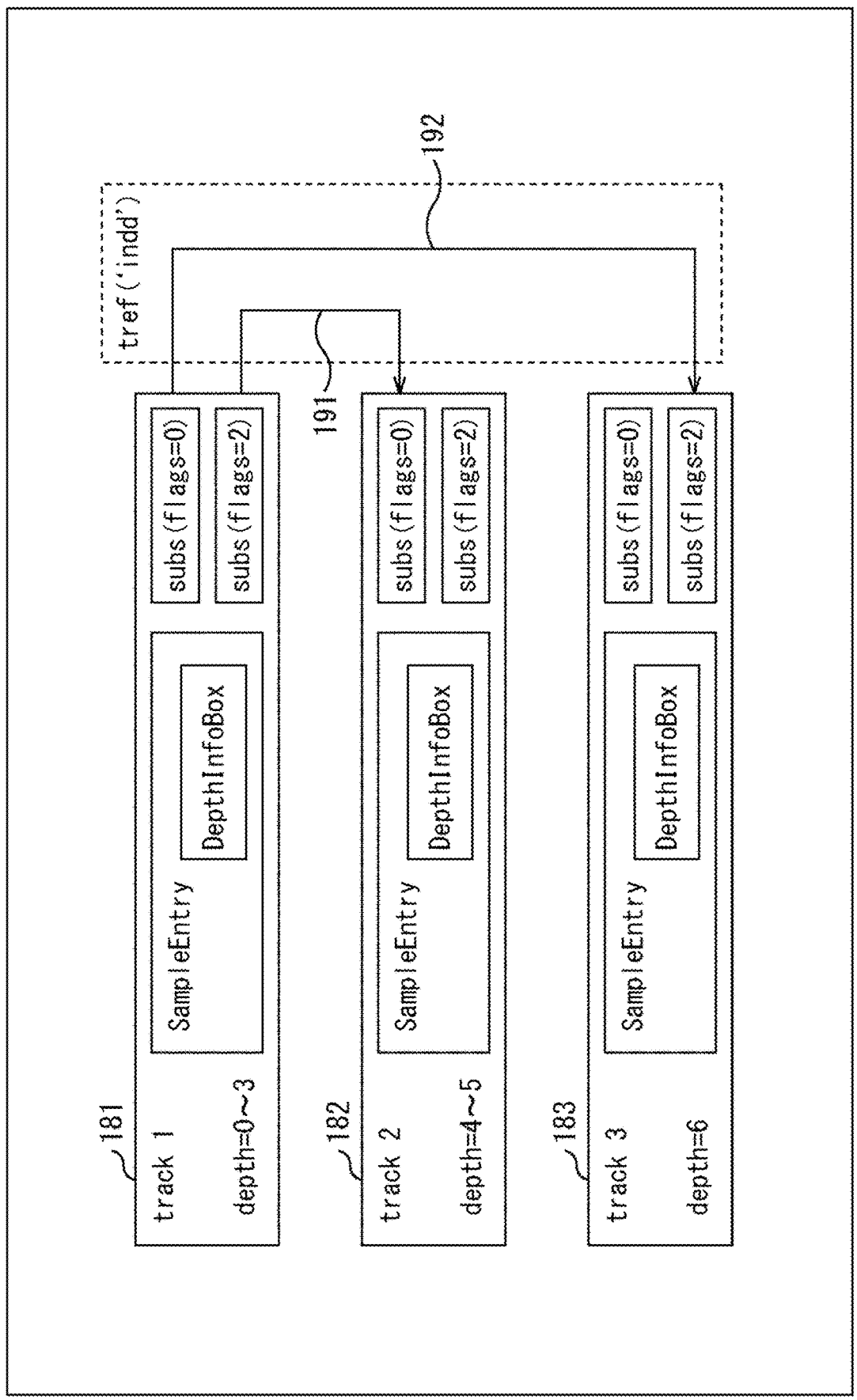
FIG. 17 is a diagram illustrating track dependency relation information.

In other words, in FIG. 17, as indicated by an arrow 191, the independent slice stored in Track 1 is used for decoding the dependent slice of Track 2. Further, as indicated by an arrow 192, the independent slice stored in Track 1 is used for decoding the dependent slice of Track 3. The independent information is information indicating such a dependency relation. In other words, the independent information is reverse lookup information of the dependent information.

Track 3 is indirectly dependent on Track 1. Therefore, the dependency relation indicated by the arrow 192 may or may not be included in the independent information. That is, as illustrated in the seventeenth row from the top of the table illustrated in FIG. 6, the independent information may indicate another track including another slice that refers to the independent slice in decoding. Further, the track dependency relation information may include both the dependent information and the independent information.

As described above, the track dependency relation information may be stored in the metadata area as a track reference. For example, independent information, as illustrated in FIG. 17, may be stored as a track reference. The reference_type of the track reference in this case may be, for example, indd (reference_type='indd'). By using this list of the track references, the order of slice arrangement at the time of reconstruction of the G-PCC bitstream from the slices stored in each track can be stored in the metadata area.

<2-3. Case of Matroska Media Container>

Figure 18:
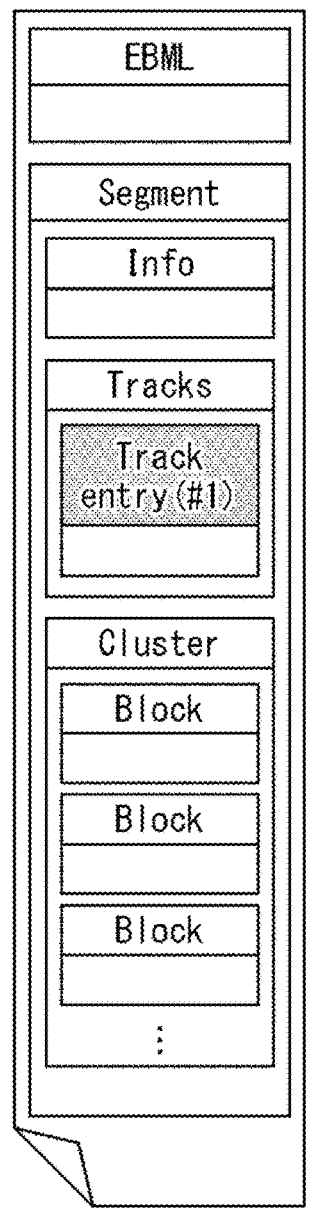
FIG. 18 is a diagram illustrating a configuration example of a Matroska media container.

Although the example in which ISOBMFF is applied as a file format has been described above, a file for storing the G-PCC bitstream is any file and may be a file other than ISOBMFF. For example, the G-PCC content may be stored in a Matroska media container. A main configuration example of the Matroska media container is illustrated in FIG. 18.

In this case, for example, the tile management information (tile identification information) may be stored as a newly defined element (element) under a track entry element (Track Entry element). Further, when the tile management information (tile identification information) is stored in timed metadata, the timed metadata may be stored in a track entry different from the track entry in which the G-PCC content is stored.

3. First Embodiment

<3-1. File Generation Device>

Figure 19:
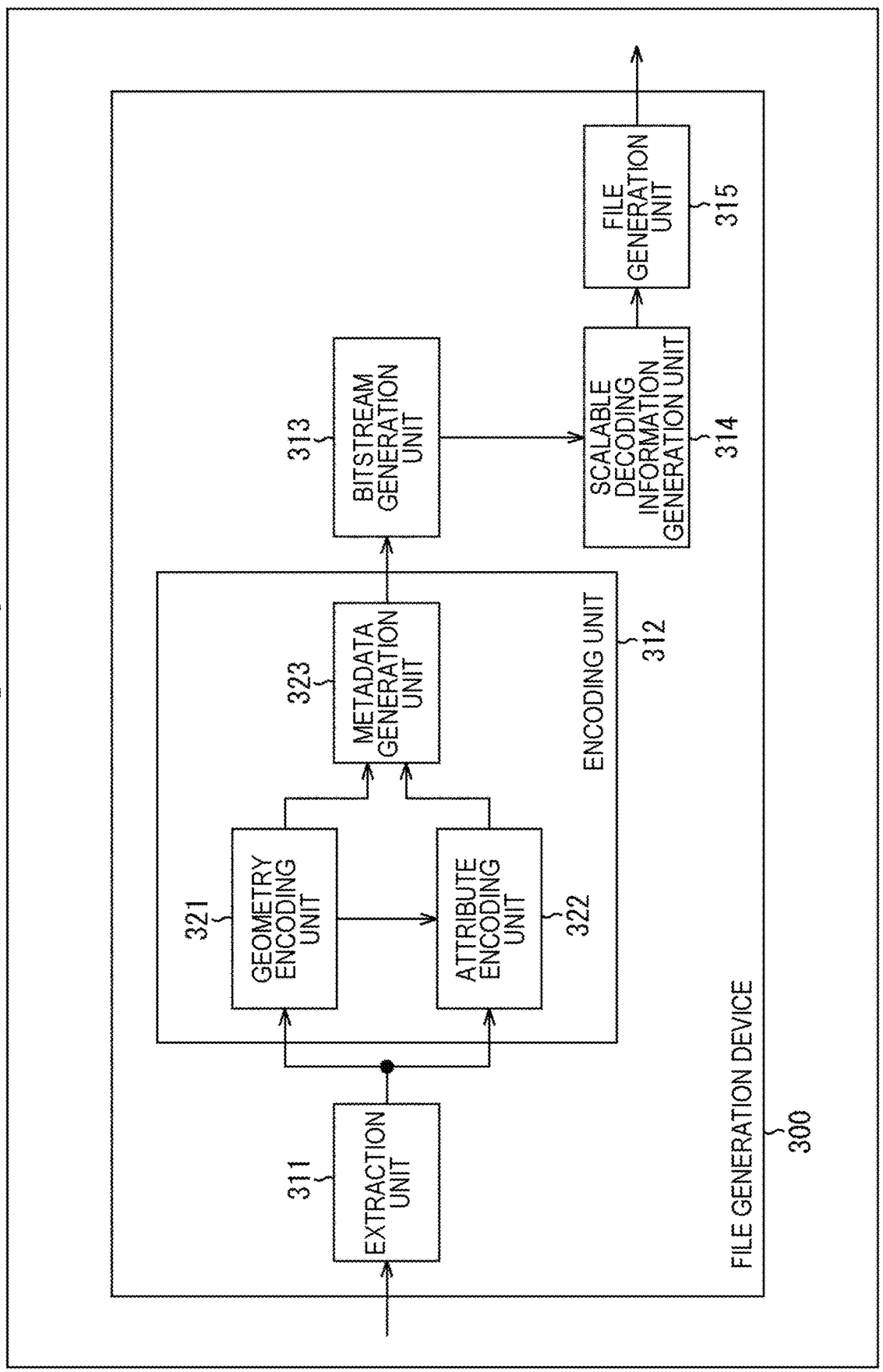
FIG. 19 is a block diagram illustrating a main configuration example of a file generation device.

An encoding side device will be described. (Each method of) the present technology described above can be applied to any device. FIG. 19 is a block diagram illustrating an example of a configuration of a file generation device which is a type of information processing device to which the present technology is applied. A file generation device 300 illustrated in FIG. 19 is a device that encodes point cloud data by applying G-PCC and stores G-PCC content (G-PCC bitstream) generated through the encoding in a content file (ISOBMFF).

At that time, the file generation device 300 applies the present technology described above in the chapter <2. Transmission of scalable decoding information by content file>. That is, the file generation device 300 generates scalable decoding information on the basis of the depth of the slice in the G-PCC content and the dependency relation between slices, generates the content file that stores the G-PCC content, and stores the generated scalable decoding information in the metadata area of the generated content file.

Note that, in FIG. 19, main processing units, data flows, and the like are illustrated, and those illustrated in FIG. 19 are not necessarily all. That is, in the file generation device 300, there may be a processing unit not illustrated as a block in FIG. 19, or there may be a process or a data flow not illustrated as an arrow or the like in FIG. 19.

As illustrated in FIG. 19, the file generation device 300 includes an extraction unit 311, an encoding unit 312, a bitstream generation unit 313, a scalable decoding information generation unit 314, and a file generation unit 315. Further, the encoding unit 312 includes a geometry encoding unit 321, an attribute encoding unit 322, and a metadata generation unit 323.

The extraction unit 311 extracts data of geometry and data of attribute from data of the point cloud input to the file generation device 300. The extraction unit 311 supplies the extracted data of the geometry to the geometry encoding unit 321 of the encoding unit 312. Further, the extraction unit 311 supplies the extracted data of the attribute to the attribute encoding unit 322 of the encoding unit 312.

The encoding unit 312 encodes the data of the point cloud. The geometry encoding unit 321 encodes the data of the geometry supplied from the extraction unit 311 to generate a geometry bitstream. The geometry encoding unit 321 supplies the generated geometry bitstream to the metadata generation unit 323. Further, the geometry encoding unit 321 also supplies the generated geometry bitstream to the attribute encoding unit 322.

The attribute encoding unit 322 encodes the data of the attribute supplied from the extraction unit 311 to generate an attribute bitstream. The attribute encoding unit 322 supplies the generated attribute bitstream to the metadata generation unit 323.

The metadata generation unit 323 generates metadata with reference to the supplied geometry bitstream and attribute bitstream. The metadata generation unit 323 supplies the generated metadata to the bitstream generation unit 313 along with the geometry bitstream and the attribute bitstream.

The bitstream generation unit 313 multiplexes the supplied geometry bitstream, attribute bitstream, and metadata to generate G-PCC content (G-PCC bitstream). The bitstream generation unit 313 supplies the generated G-PCC content to the scalable decoding information generation unit 314.

The scalable decoding information generation unit 314 acquires the G-PCC content including the first and second slices and supplied from the bitstream generation unit 313. The scalable decoding information generation unit 314 applies the present technology described above in the chapter <2. Transmission of scalable decoding information by content file> and generates the scalable decoding information regarding the scalable decoding of the G-PCC content on the basis of the depth information indicating the quality hierarchy level of the geometry included in each slice in the G-PCC content and the dependency relation between the first and second slices in the G-PCC content. The scalable decoding information generation unit 314 supplies the generated scalable decoding information to the file generation unit 315 along with the G-PCC content.

The file generation unit 315 applies the present technology described above in <2. Transmission of scalable decoding information by content file>, generates a content file that stores the G-PCC content supplied from the scalable decoding information generation unit 314, and stores the scalable decoding information in the metadata area of the generated content file. The file generation unit 315 outputs the content file generated as described above to the outside of the file generation device 300.

Note that the scalable decoding information generation unit 314 may generate scalable decoding information including slice configuration information for each sample. The file generation unit 315 may set a subsample for each slice and store the slice configuration information in the codec specific parameters of the subsample information box in the metadata area of the content file.

The scalable decoding information generation unit 314 may generate the slice configuration information including the slice dependency relation information. The file generation unit 315 may set a subsample for each slice and store the slice dependency relation information in the codec specific parameters of the subsample information box in the metadata area of the content file.

The scalable decoding information generation unit 314 may generate slice dependency relation information including the reference source geometry slice identification information and the reference destination geometry slice identification information. Then, in a case where the slice corresponding to the slice dependency relation information (that is, the slice corresponding to the reference source geometry slice identification information) is the independent geometry slice, the above-described reference source geometry slice_identification information and reference destination geometry slice identification information may be the same.

The file generation unit 315 may set a subsample for each slice and store the reference source geometry slice_identification information and the reference destination geometry slice identification information in the codec specific parameters of the subsample information box in the metadata area.

The scalable decoding information generation unit 314 may generate slice dependency relation information including attribute geometry slice identification information. The file generation unit 315 may set a subsample for each slice and store the attribute geometry slice_identification information in the codec specific parameters of the subsample information box in the metadata area.

The scalable decoding information generation unit 314 may generate slice dependency relation information including non-scalable encoding attribute geometry slice identification information that is identification information of a geometry slice referred to by an attribute slice to which the non-scalable encoding is applied.

The scalable decoding information generation unit 314 may generate the non-scalable encoding attribute geometry slice identification information including the identification information of the geometry slice or the geometry slice group that has the geometry having the largest depth information among the geometry slices or the geometry slice groups referred to by the attribute slice corresponding to the information. The file generation unit 315 may set a subsample for each slice and store the non-scalable encoding attribute geometry slice_identification information in the codec specific parameters of the subsample information box in the metadata area of the content file.

Further, the scalable decoding information generation unit 314 may generate the slice dependency relation information including the non-scalable encoding flag. Further, the file generation unit 315 may set a subsample for each slice and store the non-scalable encoding flag in the codec specific parameters of the subsample information box in the metadata area of the content file.

Note that the file generation unit 315 may set the payload type (PayloadType) of the slice dependency relation information of the independent geometry slice and the payload type of the slice dependency relation information of the dependent geometry slice to different values in the codec specific parameters.

The scalable decoding information generation unit 314 may generate the slice configuration information including the geometry slice depth information. At that time, the scalable decoding information generation unit 314 may generate the geometry slice depth information including the minimum depth information. Further, the scalable decoding information generation unit 314 may generate the geometry slice depth information including the maximum depth information. Then, the file generation unit 315 may set a subsample for each slice or slice group and store the geometry slice depth information in the codec specific parameters of the subsample information box in the metadata area of the content file.

The scalable decoding information generation unit 314 may generate slice configuration information further including slice dependency relation information indicating a dependency relation between the first and second slices in addition to the geometry slice depth information. Then, the file generation unit 315 may set flags of the subsample information box that stores the geometry slice depth information to a different value from flags of the subsample information box that stores the slice dependency relation information.

The scalable decoding information generation unit 314 may generate scalable decoding information including the track configuration information. The scalable decoding information generation unit 314 may generate track configuration information including the track depth information.

The scalable decoding information generation unit 314 may generate track depth information including the track minimum depth information indicating a minimum value of the depth information in the track corresponding to the information. Further, the scalable decoding information generation unit 314 may generate track depth information including track maximum depth information indicating a maximum value of the depth information in the track corresponding to the information. Further, the scalable decoding information generation unit 314 may generate track depth information including a matching flag. Then, the file generation unit 315 may store such track depth information in the depth information box of the sample entry of the metadata area.

The scalable decoding information generation unit 314 may generate the track configuration information including the track dependency relation information. Further, the scalable decoding information generation unit 314 may generate the track dependency relation information including the dependent information indicating another track including the slice necessary for decoding the dependent slice included in the track corresponding to the information. Further, the scalable decoding information generation unit 314 may generate dependent information indicating all the other tracks including the slice necessary for decoding the dependent slice included in the track corresponding to the information. Further, the scalable decoding information generation unit 314 may generate dependent information indicating another track including a slice referred to from the information.

The scalable decoding information generation unit 314 may generate the track dependency relation information including the independent information indicating another track including the dependent slice in which the independent slice included in the track corresponding to the information is necessary in decoding. The scalable decoding information generation unit 314 may generate independent information indicating another track including another slice that refers to the independent slice in decoding. Further, the scalable decoding information generation unit 314 may generate independent information in which the track dependency relation information includes both the dependent information and the independent information.

Then, the file generation unit 315 may store the track dependency relation information as a track reference in the metadata area.

In this way, as described above in the chapter <2. Transmission of scalable decoding information by content file>, an increase in a load on the reproduction process can be inhibited.

<Flow of File Generation Process>

An example of a flow of a file generation process executed by the file generation device 300 will be described with reference to the flowchart of FIG. 20.

When the file generation process starts, the extraction unit 311 of the file generation device 300 extracts the geometry and the attribute from the point cloud in step S301.

In step S302, the encoding unit 312 encodes the geometry and the attribute extracted in step S301 to generate a geometry bitstream and an attribute bitstream. The encoding unit 312 further generates the metadata.

In step S303, the bitstream generation unit 313 multiplexes the geometry bitstream, the attribute bitstream, and the metadata generated in step S302 to generate a G-PCC bitstream (G-PCC content).

In step S304, the scalable decoding information generation unit 314 applies the present technology described above in the chapter <2. Transmission of scalable decoding information by content file> and generates the scalable decoding information regarding the scalable decoding of the G-PCC content on the basis of the depth of the slice in the G-PCC content generated in step S303 and the dependency relation between slices in the G-PCC content.

In step S305, the file generation unit 315 generates other information and generates a content file (for example, ISOBMFF) that stores the G-PCC content generated in step S303. Then, the file generation unit 315 applies the present technology described above in the chapter <2. Transmission of scalable decoding information by content file> and stores the scalable decoding information generated in step S304 in the metadata area of the generated content file.

In step S306, the file generation unit 315 outputs the generated content file (the content file that stores the scalable decoding information) to the outside of the file generation device 300. For example, the file generation unit 315 transmits the content file to another device (for example, a reproduction device or the like) via a network or the like. Further, for example, the file generation unit 315 supplies and stores the content file in a storage medium outside of the file generation device 300. In this case, the content file is supplied to the reproduction device or the like via the storage medium.

When the process of step S306 ends, the file generation process ends.

As described above, in the file generation process, the file generation device 300 applies the present technology described in the chapter <2. Transmission of scalable decoding information by content file> and stores the scalable decoding information in the metadata area of the content file. In this way, processes (decoding and the like) of unnecessary information can be reduced, and an increase in a load on a reproduction process can be suppressed.

<3-2. Reproduction Device>

Figure 21:
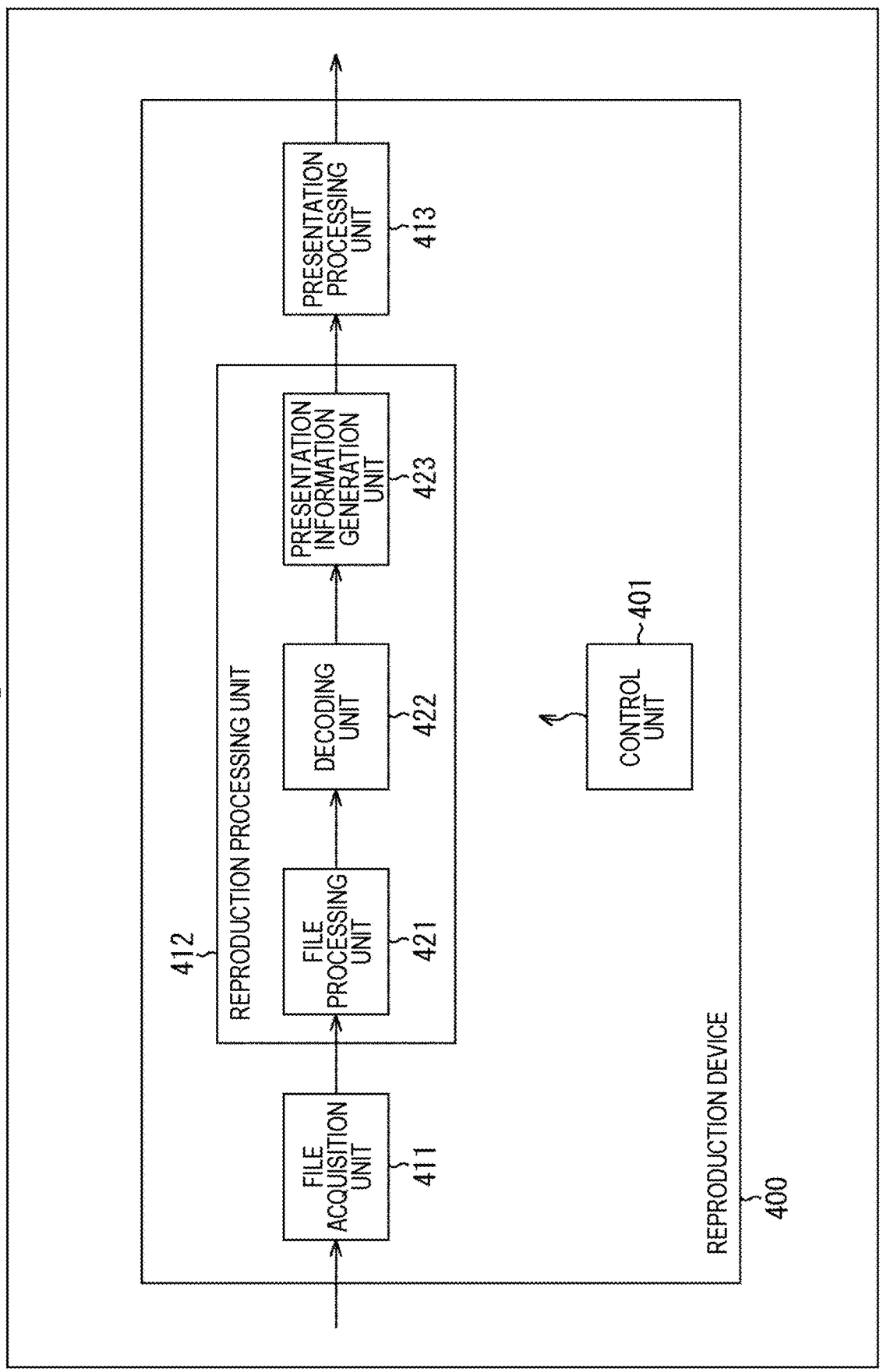
FIG. 21 is a block diagram illustrating a main configuration example of a decoding device.

FIG. 21 is a block diagram illustrating an example of a configuration of a reproduction device which is a type of information processing device to which the present technology is applied. A reproduction device 400 illustrated in FIG. 21 is a device that decodes a G-PCC file, constructs a point cloud, and renders the point cloud to generate presentation information. At that time, the reproduction device 400 applies the present technology described above in the chapter <2. Transmission of scalable decoding information by content file> to extract, decode, and reproduce a slice necessary for reproducing a desired depth in the point cloud from a content file generated by the file generation device 300.

Note that, in FIG. 21, main processing units, data flows, and the like are illustrated, and those illustrated in FIG. 21 are not necessarily all. That is, in the reproduction device 400, there may be a processing unit not illustrated as a block in FIG. 21, or there may be a process or a data flow not illustrated as an arrow or the like in FIG. 21.

As illustrated in FIG. 21, the reproduction device 400 includes a control unit 401, a file acquisition unit 411, a reproduction processing unit 412, and a presentation processing unit 413. The reproduction processing unit 412 includes a file processing unit 421, a decoding unit 422, and a presentation information generation unit 423.

The control unit 401 controls each processing unit in the reproduction device 400. The file acquisition unit 411 acquires a content file that stores a point cloud to be reproduced and supplies the content file to the reproduction processing unit 412 (the file processing unit 421 thereof). The reproduction processing unit 412 performs a process related to reproduction of a point cloud stored in the supplied content file.

The file processing unit 421 of the reproduction processing unit 412 acquires the content file supplied from the file acquisition unit 411 and extracts a bitstream from the content file. At that time, the file processing unit 421 applies the present technology described above in the chapter <2. Transmission of scalable decoding information by content file> and extracts only the bitstream of the slice necessary for reproducing at a desired depth. The file processing unit 421 supplies the extracted bitstream to the decoding unit 422.

The decoding unit 422 decodes the bitstream supplied from the file processing unit 421 to generate data of the geometry and the attribute. The decoding unit 422 supplies the generated data of the geometry and the attribute to the presentation information generation unit 423. The presentation information generation unit 423 constructs a point cloud using the supplied data of the geometry and the attribute and generates presentation information that is information for presenting (for example, displaying) the point cloud. For example, the presentation information generation unit 423 performs rendering using the point cloud and generates a display image of the point cloud viewed from a predetermined viewpoint as the presentation information. The presentation information generation unit 423 supplies the presentation information generated in this way to the presentation processing unit 413.

The presentation processing unit 413 performs a process of presenting the supplied presentation information. For example, the presentation processing unit 413 supplies the presentation information to a display device or the like outside of the reproduction device 400 to present the presentation information.

<Processing Unit>

Figure 22:
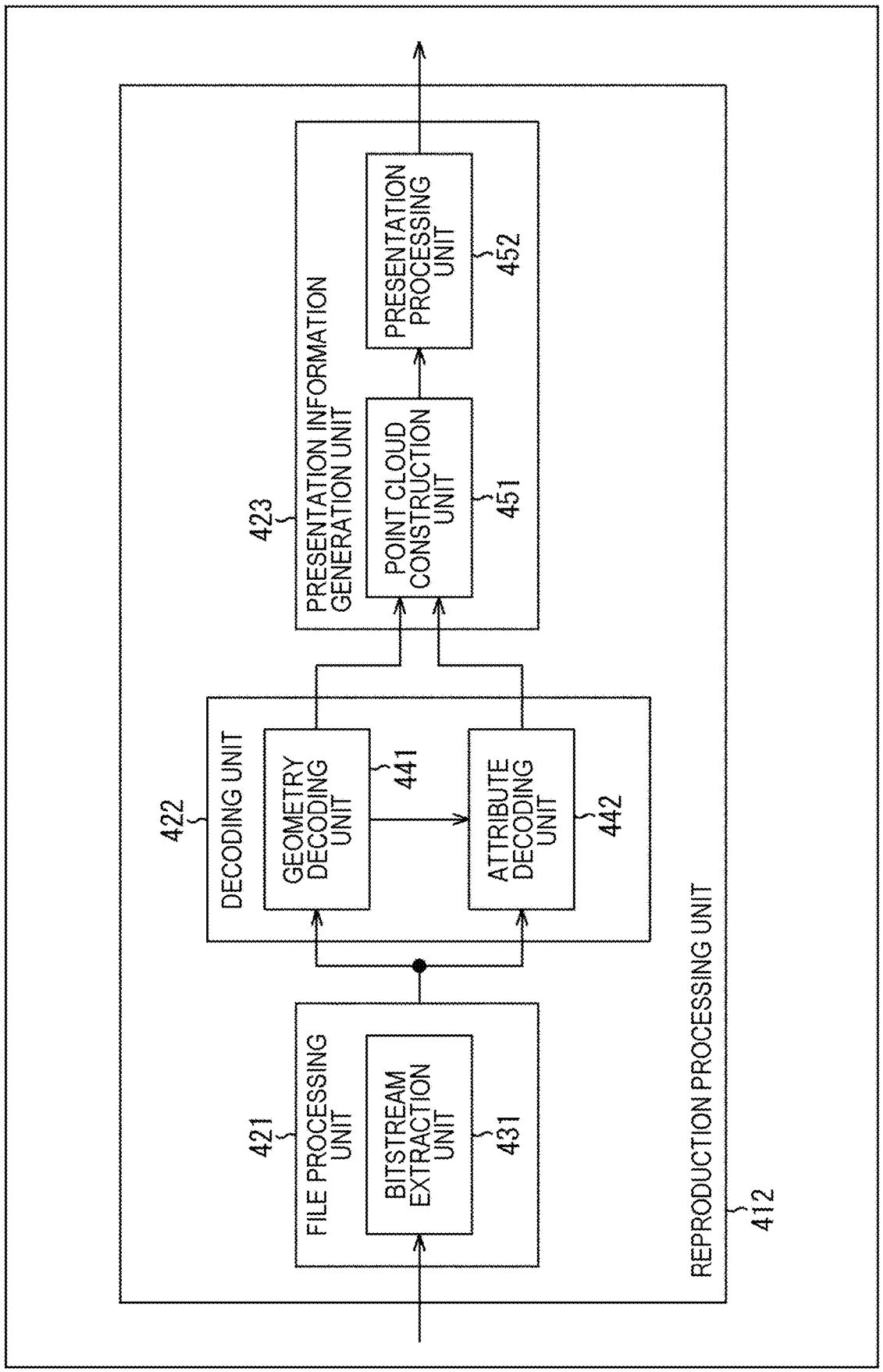
FIG. 22 is a block diagram illustrating a main configuration example of a reproduction processing unit.

FIG. 22 is a block diagram illustrating a main configuration example of the reproduction processing unit 412. As illustrated in FIG. 22, the file processing unit 421 includes a bitstream extraction unit 431. The decoding unit 422 includes a geometry decoding unit 441 and an attribute decoding unit 442. The presentation information generation unit 423 includes a point cloud construction unit 451 and a presentation processing unit 452.

The bitstream extraction unit 431 extracts a bitstream from the content file supplied from the file acquisition unit 411. At that time, the bitstream extraction unit 431 applies the present technology described above in the chapter <2. Transmission of scalable decoding information by content file> and extracts only the bitstream of the slice necessary for reproducing at a desired depth. That is, the bitstream extraction unit 431 extracts any slice of the G-PCC content from the content file on the basis of the scalable decoding information stored in the metadata area of the content file that stores the G-PCC content. Note that this scalable decoding information is information regarding scalable decoding of the G-PCC content and is information generated on the basis of the depth information indicating the quality hierarchy level of the geometry included in the slice in the G-PCC content and the dependency relation between slices (for example, between the first and second slices) in the G-PCC content.

Note that the scalable decoding information may include slice configuration information for each sample. For example, the bitstream extraction unit 431 may ascertain the configuration of the slice in each sample on the basis of the slice configuration information for each sample and extract any slice of the G-PCC content from the content file on the basis of the configuration. The bitstream extraction unit 431 may extract any slice of the G-PCC content from the content file on the basis of the slice configuration information stored in the codec specific parameters of the subsample information box in the metadata area of the content file of the subsample set for each slice.

The slice configuration information may include slice dependency relation information. For example, the bitstream extraction unit 431 may ascertain a dependency relation between the slices or the slice groups on the basis of the slice dependency relation information and extract any slice of the G-PCC content from the content file on the basis of the dependency relation. The bitstream extraction unit 431 may extract any slice of the G-PCC content from the content file on the basis of the slice dependency relation information stored in the codec specific parameters of the subsample information box in the metadata area of the content file of the subsample set for each slice.

The slice dependency relation information may include reference source geometry slice identification information and reference destination geometry slice identification information. For example, the bitstream extraction unit 431 may ascertain the dependency relation between the slices or the slice groups on the basis of the reference source geometry slice identification information and the reference destination geometry slice identification information, and extract another geometry slice necessary for decoding the desired geometry slice of the G-PCC content from the content file on the basis of the dependency relation. In a case where the slice corresponding to the slice dependency relation information (that is, the slice corresponding to the reference source geometry slice identification information) is the independent geometry slice, the above-described reference source geometry slice identification information and reference destination geometry slice identification information may be the same. The bitstream extraction unit 431 may extract any slice of the G-PCC content from the content file on the basis of the reference source geometry slice identification information and the reference destination geometry slice identification information stored in the codec specific parameters of the subsample information box in the metadata area of the subsample set for each slice.

The slice dependency relation information may include attribute geometry slice identification information. For example, the bitstream extraction unit 431 may identify a correspondent relation between an attribute slice and a geometry slice on the basis of the attribute geometry slice identification information, and extract any slice (attribute slice and geometry slice) of the G-PCC content from the content file on the basis of the identified correspondent relation. The bitstream extraction unit 431 may extract any slice of the G-PCC content from the content file on the basis of the attribute geometry slice identification information stored in the codec specific parameters of the subsample information box in the metadata area of the subsample set for each slice.

The slice dependency relation information may include non-scalable encoding attribute geometry slice identification information that is identification information of a geometry slice referred to by an attribute slice to which the non-scalable encoding is applied. For example, the bitstream extraction unit 431 may specify a correspondent relation between the attribute slice to which the non-scalable encoding is applied and the geometry slice on the basis of the non-scalable encoding attribute geometry slice identification information and may extract any slice of the G-PCC content (the attribute slice and the geometry slice to which the non-scalable encoding is applied) from the content file on the basis of the correspondent relation. The non-scalable encoding attribute geometry slice identification information may include identification information of a geometry slice or a geometry slice group including a maximum depth among the geometry slices or the geometry slice groups referred to by the attribute slice corresponding to the information. The bitstream extraction unit 431 may extract any slice of the G-PCC content from the content file on the basis of the non-scalable encoding attribute geometry slice identification information stored in the codec specific parameters of the subsample information box in the metadata area of the content file of the subsample set for each slice.

The slice dependency relation information may include a non-scalable encoding flag. For example, the bitstream extraction unit 431 may identify whether or not the non-scalable encoding is applied on the basis of the non-scalable encoding flag, identify a correspondent relation between the attribute slice and the geometry slice on the basis of the identification result, and extract any slice (the attribute slice and the geometry slice) of the G-PCC content from the content file on the basis of the correspondent relation. The bitstream extraction unit 431 may extract any slice of the G-PCC content from the content file on the basis of the non-scalable encoding flag stored in the codec specific parameters of the subsample information box in the metadata area of the content file of the subsample set for each slice.

Note that, in the codec specific parameters, the payload type (PayloadType) of the slice dependency relation information of the independent geometry slice and the payload type of the slice dependency relation information of the dependent geometry slice may have different values. For example, on the basis of this payload type, the bitstream extraction unit 431 may identify whether or not it is the slice dependency relation information of the independent geometry slice or the slice dependency relation information of the dependent geometry slice, and analyze the slice dependency relation information on the basis of the identification result.

The slice configuration information may include geometry slice depth information. For example, the bitstream extraction unit 431 may ascertain the depth of the geometry included in the geometry slice or the geometry slice group on the basis of the geometry slice depth information and may extract any slice of the G-PCC content from the content file on the basis of the information of the depth. The geometry slice depth information may include minimum depth information. The geometry slice depth information may include maximum depth information. The bitstream extraction unit 431 may extract any slice of the G-PCC content from the content file on the basis of the geometry slice depth information stored in the codec specific parameters of the subsample information box in the metadata area of the content file of the subsample set for each slice or slice group.

The slice configuration information may further include slice dependency relation information indicating a dependency relation between the slices in addition to the geometry slice depth information. Then, flags of the subsample information box that stores the geometry slice depth information and flags of the subsample information box that stores the slice dependency relation information may be set to different values. For example, on the basis of the flags, the bitstream extraction unit 431 may identify whether or not the box is a subsample information box that stores the geometry slice depth information or a subsample information box that stores the slice dependency relation information.

The scalable decoding information may include track configuration information. For example, the bitstream extraction unit 431 may ascertain the configuration of the track on the basis of the track configuration information and may extract any slice of the G-PCC content from the content file on the basis of the configuration of the track. The track configuration information may include track depth information. For example, the bitstream extraction unit 431 may ascertain the depth information of the geometry of all the slices included in the track on the basis of the track depth information, specify a track in which a desired slice is stored on the basis of the depth information, and extract a desired slice from the track. The track depth information may include the track minimum depth information indicating a minimum value of the depth information in the track corresponding to the information. The track depth information may include the track maximum depth information indicating a maximum value of the depth information in the track corresponding to the information. The track depth information may include a matching flag. For example, the bitstream extraction unit 431 may ascertain the depth information of the geometry included in the track on the basis of these pieces of information, specify the track in which the desired slice is stored on the basis of the depth information, and extract the desired slice from the track. The bitstream extraction unit 431 may extract any slice of the G-PCC content from the content file on the basis of the track depth information stored in the depth information box of the sample entry of the metadata area.

The track configuration information may include track dependency relation information. For example, the bitstream extraction unit 431 may ascertain the track dependency relation on the basis of the track dependency relation information and extract any slice of the G-PCC content from the content file on the basis of the dependency relation. The track dependency relation information may include dependent information indicating another track including a slice necessary for decoding the dependent slice included in the track corresponding to the information. For example, on the basis of the dependent information, the bitstream extraction unit 431 may specify another track including a slice necessary for decoding the dependent slice included in the track corresponding to the information. The dependent information may indicate all the other tracks including the slice necessary for decoding the dependent slice included in the track corresponding to the information. Further, the dependent information may indicate another track including the slice referred to from the information. Further, the track dependency relation information may include independent information indicating another track including a dependent slice in which the independent slice included in the track corresponding to the information is necessary in decoding. For example, on the basis of the independent information, the bitstream extraction unit 431 may specify another track including a dependent slice in which an independent slice included in a track corresponding to the information is necessary in decoding. The independent information may indicate another track including another slice that refers to the independent slice in decoding. Further, the track dependency relation information may be stored as a track reference in the metadata area.

The bitstream extraction unit 431 supplies the extracted geometry bitstream to the geometry decoding unit 441. Further, the bitstream extraction unit 431 supplies the extracted attribute bitstream to the attribute decoding unit 442.

The geometry decoding unit 441 decodes the supplied geometry bitstream to generate data of the geometry. The geometry decoding unit 441 supplies the generated data of the geometry to the point cloud construction unit 451. The attribute decoding unit 442 decodes the supplied attribute bitstream to generate the data of the attribute. The attribute decoding unit 442 supplies the generated data of the attribute to the point cloud construction unit 451.

The point cloud construction unit 451 constructs a point cloud using the supplied data of the geometry and the attribute. That is, the point cloud construction unit 451 can construct a point cloud with a desired depth. The point cloud construction unit 451 supplies data of the constructed point cloud to the presentation processing unit 452.

The presentation processing unit 452 generates presentation information using the supplied point cloud data. The presentation processing unit 452 supplies the generated presentation information to the presentation processing unit 413.

With such a configuration, the reproduction device 400 can extract, decode, construct, and present only a desired tile more easily on the basis of the tile management information (tile identification information) stored in the G-PCC file without parsing the entire bitstream. Consequently, an increase in a load on the reproduction process can be suppressed.

<Flow of Reproduction Process>

An example of a flow of a reproduction process executed by the reproduction device 400 will be described with reference to a flowchart of FIG. 23.

When the reproduction process starts, the file acquisition unit 411 of the reproduction device 400 acquires a content file to be reproduced in step S401.

In step S402, the bitstream extraction unit 431 extracts any slice from the content file acquired in step S401. At that time, the bitstream extraction unit 431 applies the present technology described above in <2. Transmission of scalable decoding information by content file> and extracts the slice on the basis of the scalable decoding information stored in the metadata area of the content file.

In step S403, the geometry decoding unit 441 of the decoding unit 422 decodes the geometry bitstream of the slice extracted in step S402 to generate the geometry of a desired depth. Further, the attribute decoding unit 442 decodes the attribute bitstream of the slice extracted in step S402 and generates an attribute corresponding to the geometry of the desired depth.

In step S404, the point cloud construction unit 451 constructs a point cloud using the geometry and the attribute generated in step S403. That is, the point cloud construction unit 451 can construct a point cloud with a desired depth.

In step S405, the presentation processing unit 452 generates presentation information by performing rendering or the like using the point cloud constructed in step S404. In step S406, the presentation processing unit 413 supplies and presents the presentation information to the outside of the reproduction device 400.

When the process of step S406 ends, the reproduction process ends.

As described above, in the reproduction process, the reproduction device 400 applies the present technology described in the chapter <2. Transmission of scalable decoding information by content file> and extracts and decodes a desired slice from a content file on the basis of the scalable decoding information stored in the metadata area of the content file. In this way, processes (decoding and the like) of unnecessary information can be reduced, and an increase in a load on a reproduction process can be suppressed.

4. Transmission of Scalable Decoding Information by Control File

The present technology can also be applied to, for example, Moving Picture Experts Group phase-Dynamic Adaptive Streaming over HTTP (MPEG-DASH). For example, MPEG-DASH may store the scalable decoding information by extending media presentation description (MPD) that is a control file storing control information regarding delivery of a bitstream. For example, as the scalable decoding information, adaptation set configuration information which is information regarding a configuration of an adaptation set describing information regarding a track of a content file may be stored in the MPD.

That is, as described at the top of the table illustrated in FIG. 24, the adaptation set configuration information which is based on the depth of each slice of the G-PCC content having the slice structure and the dependency relation between the slices stored in the control file is transmitted (Method 2).

For example, an information processing device includes: an adaptation set configuration information generation unit that generates adaptation set configuration information on the basis of depth information indicating a quality hierarchy level of geometry included in each slice in G-PCC content including the first and second slices and a dependency relation between the first and second slices in the G-PCC content; and a control file generation unit that generates a control file that controls reproduction of a content file that stores the G-PCC content, and stores the adaptation set configuration information in the control file. Then, the content file stores the G-PCC content in the track on the slice basis. Further, the adaptation set configuration information is information regarding the configuration of the adaptation set that describes information regarding the track of the content file.

For example, an information processing method includes: generating the adaptation set configuration information on the basis of the depth information indicating the quality hierarchy level of the geometry included in each slice in the G-PCC content including the first and second slices and the dependency relation between the first and second slices in the G-PCC content; generating the control file that controls the reproduction of the content file that stores the G-PCC content; and storing the adaptation set configuration information in the control file. Then, the content file stores the G-PCC content in the track on the slice basis. Further, the adaptation set configuration information is information regarding the configuration of the adaptation set that describes information regarding the track of the content file.

For example, an information processing device includes: an analysis unit that analyzes a control file that controls reproduction of a content file that stores G-PCC content including the first and second slices in a track on the slice basis and specifies an adaptation set necessary for obtaining any slice of the G-PCC content on the basis of adaptation set configuration information stored in the control file; an acquisition unit that acquires a track of the content file corresponding to the adaptation set specified by the analysis unit; and a decoding unit that decodes a slice of the G-PCC content stored in the track acquired by the acquisition unit. Then, the adaptation set configuration information is information regarding the configuration of the adaptation set that describes information regarding the track of the content file and is information generated on the basis of the depth information indicating the quality hierarchy level of the geometry included in the slice in the G-PCC content and the dependency relation between the first and second slices in the G-PCC content.

For example, an information processing method includes: analyzing a control file that controls reproduction of a content file that stores G-PCC content in a track on the slice basis; specifying an adaptation set necessary for obtaining any slice of the G-PCC content on the basis of the adaptation set configuration information stored in the control file; acquiring a track corresponding to the specified adaptation set of the content file; and decoding a slice of the G-PCC content stored in the acquired track. Then, the adaptation set configuration information is information regarding the configuration of the adaptation set that describes information regarding the track of the content file and is information generated on the basis of the depth information indicating the quality hierarchy level of the geometry included in the slice in the G-PCC content and the dependency relation between the first and second slices in the G-PCC content.

In this way, the decoder can select the track storing the slice necessary for reproducing the point cloud of the desired depth or an area on the basis of the adaptation set configuration information stored in the control file and can acquire the track. Therefore, transmission of unnecessary data can be inhibited. As a result, it is possible to inhibit an increase in a load on the transmission path and the communication process. Further, since the decoder can inhibit an increase in the amount of data to be processed, it is possible to inhibit an increase in the load on the reproduction process. Accordingly, it is possible to inhibit an increase in delay related to data transmission and the reproduction process.

As described above in the chapter of <2. Transmission of Scalable Decoding Information by Content File>, particularly in the case of a large-scale point cloud, by applying the present technology, it is possible to further inhibit an increase in a load on data transmission and the reproduction process, and to obtain a larger effect.

<4-1. Adaptation Set Depth Information>

As illustrated in the second row from the top of the table illustrated in FIG. 24, the adaptation set configuration information may include the adaptation set depth information (Method 2-1). The adaptation set depth information is information regarding the depth information of the geometry of all the slices included in the track corresponding to the adaptation set corresponding to the information. The adaptation set depth information is information similar to the track depth information described in <2-2-1. Track depth information>. That is, the adaptation set depth information is obtained by applying the track depth information to the control file (MPD).

The decoder can easily ascertain which slice at which depth corresponds to which adaptation set (that is, a track) (without parsing the bitstream) on the basis of the adaptation set depth information stored in the MPD. Therefore, the decoder can more easily select the track to be acquired (without parsing the bitstream).

Note that, in the case of the MPD, a supplemental property or an essential property (Essential Property) may be newly defined, schemeIdUri="urn: mpeg: mpegI: gpcc: 2020: depth" may be set, and the adaptation set depth information may be stored therein.

As illustrated in the third row from the top of the table illustrated in FIG. 24, the adaptation set depth information may include the adaptation set minimum depth information (Method 2-1-1). The adaptation set minimum depth information is information indicating the minimum value of the depth information in the track corresponding to the adaptation set corresponding to the information.

FIG. 25 is a diagram illustrating an example of a parameter to be added to the MPD as the adaptation set depth information. @minDepth illustrated in FIG. 25 is the adaptation set minimum depth information and is information similar to track_min_depth (track minimum depth information) of the track depth information described in <2-2-1.

Track depth information>. That is, @minDepth is obtained by applying track_min_depth to the control file (MPD).

As illustrated in the fourth row from the top of the table illustrated in FIG. 24, the adaptation set depth information may include the adaptation set maximum depth information (Method 2-1-2). The adaptation set maximum depth information is information indicating the maximum value of the depth information in the track corresponding to the adaptation set corresponding to the information.

@maxDepth illustrated in FIG. 25 is the adaptation set maximum depth information, and is information similar to track_max_depth (track maximum depth information) of the track depth information described in <2-2-1. Track depth information>. That is, @maxDepth is obtained by applying track_max_depth to the control file (MPD).

As illustrated in the fifth row from the top of the table illustrated in FIG. 24, the adaptation set depth information may include a matching flag (Method 2-1-3). The matching flag is flag information (flag information indicating whether or not minimum depth and maximum depth are common to all the samples) indicating whether or not the sample minimum depth information of each sample included in the track corresponding to the adaptation set corresponding to the information matches the adaptation set minimum depth information, and the sample maximum depth information of each sample included in the track matches the adaptation set maximum depth information. Note that the sample minimum depth information indicates the minimum value of the depth information in the sample. The sample maximum depth information indicates the maximum value of the depth information in the sample.

@fixedDepth illustrated in FIG. 25 is the matching flag of the adaptation set. In a case where @fixedDepth is "0" (false), it indicates that the sample minimum depth information and the sample maximum depth information of all the samples in the track corresponding to the adaptation set take values within a range from the adaptation set minimum depth information (@minDepth) to the adaptation set maximum depth information (@maxDepth). That is, in this case, the minimum value or the maximum value of the depth of each sample or both may be changed for each sample.

On the other hand, in a case where @fixedDepth is "1" (true), it indicates that the sample minimum depth information of each sample in the track matches the track minimum depth information (track_min_depth), and the sample maximum depth information of each sample in the track matches the track maximum depth information (track_min_depth). That is, in this case, the minimum value and the maximum value of the depth of each sample take common values in all the samples.

For example, in a case where the track includes only data of one depth, the value of the matching flag (@fixedDepth) is set to "1", and the adaptation set minimum depth information (@minDepth) and the adaptation set maximum depth information (@maxDepth) take the same value (@minDepth=@maxDepth).

In the case of the MPD, these parameters (@fixedDepth, @minDepth, @maxDepth) of the adaptation set depth information may be set in the above-described supplemental property or essential property (Essential Property).

As described above, by storing the information as the adaptation set depth information in the control file (MPD), the decoder can more easily ascertain which depth data is stored in each track (without parsing the bitstream) on the basis of the information. Therefore, the decoder can more easily select the track to be acquired (without parsing the bitstream).

<4-2. Representation Dependency Relation Information>

As illustrated in the sixth row from the top of the table illustrated in FIG. 24, the adaptation set configuration information may include the representation dependency relation information (Method 2-2). The representation dependency relation information is information indicating a dependency relation (for example, a dependency relation between the first representation and the second representation.) between the representations. In the MPD, tracks are managed by the representations of adaptation set. Then, the representation dependency relation information is information similar to the track dependency relation information described in <2-2-2. Track dependency relation information>. That is, the representation dependency relation information is obtained by applying the track dependency relation information to the control file (MPD).

The decoder can ascertain the dependency relation between tracks more easily (without parsing the bitstream) on the basis of the representation dependency relation information stored in the MPD. Therefore, the decoder can more easily select the track to be acquired (without parsing the bitstream).

As illustrated in the seventh row from the top of the table illustrated in FIG. 24, the representation dependency relation information may include dependent information indicating another representation necessary for decoding the representation corresponding to the information (Method 2-2-1).

The dependent information is information to be associated from a representation not including an independent slice (depth=0) to all representations including a slice necessary for decoding the representation.

By storing such dependent information in the control file (MPD), the decoder can confirm other representations (that is, tracks) necessary for decoding the representation (that is, the track) to be processed more easily without parsing the bitstream on the basis of the dependent information. Consequently, an increase in a load on the reproduction process can be suppressed.

Note that, as illustrated in the eighth row from the top of the table illustrated in FIG. 24, the dependent information may indicate all the other representations necessary for decoding the representation corresponding to the information (Method 2-2-1-1).

Further, as illustrated in the ninth row from the top of the table illustrated in FIG. 24, the dependent information may indicate another representation to be referred from the representation corresponding to the information (Method 2-2-1-2). That is, the dependent information may indicate a representation directly referred to by the representation of the reference source.

Further, as illustrated in the tenth row from the top of the table illustrated in FIG. 24, the representation dependency relation information may include independent information indicating another representation for which a representation corresponding to the information is necessary in decoding (Method 2-2-2). That is, the independent information is information associated from the representation including the independent slice (depth=0) to the representation including the dependent slice decoded with reference to the slice. In other words, the independent information is reverse lookup information of the dependent information.

As illustrated in the eleventh row from the top of the table illustrated in FIG. 24, the independent information may indicate all the other representations in which a representation corresponding to the information is necessary in decoding (Method 2-2-2-1).

Further, as illustrated in the bottom of the table illustrated in FIG. 24, the representation dependency relation information may be stored in the control file (MPD) as two parameters of representation association identification information (Representation@associationId) and an association type (associationType) (Method 2-2-3). That is, the association between the dependent information and the independent information may be performed using two parameters of the representation association identification information (Representation @associationId) and the association type (associationType).

In the case of the dependent information, the association type may be set in "depd" (associationType="depd"). Further, in the case of the independent information, the association type may be set in "indd" (associationType="indd"). Note that Flag Information (@nonScalableAttributeFlag) that clearly indicates whether or not the adaptation set includes the attribute slice to which the non-scalable encoding is applied may be stored in the control file (MPD).

<4-3. Description Example>

A description example of the MPD is illustrated in FIG. 26. In the MPD 520 illustrated in FIG. 26, in a row with an underline 521, an essential property (Essential Property) is defined for the adaptation set (AdaptationSet id="1") of which identification information is "1" and schemeIdUri="urn: mpeg: mpegI: gpcc: 2020: depth" is set. Then, adaptation set depth information such as @fixedDepth, @minDepth, and @maxDepth is set.

Further, in the MPD 520 illustrated in FIG. 26, in a row with an underline 522, an essential property (Essential Property) is defined for the adaptation set (AdaptationSet id="2") of which identification information is "2" and schemeIdUri="urn: mpeg: mpegI: gpcc: 2020: depth" is set. Then, adaptation set depth information such as @fixedDepth, @minDepth, and @maxDepth is set. Further, in the next row, representation association identification information (Representation@associationId) and representation dependency relation information such as an association type (associationType) are set. Since the representation dependency relation information is dependent information, the association type (associationType) is set to "depd".

Further, in the MPD 520 illustrated in FIG. 26, in a row with an underline 523, an essential property (Essential Property) is defined for the adaptation set (AdaptationSet id="3") of which identification information is "3" and schemeIdUri="urn: mpeg: mpegI: gpcc: 2020: depth" is set. Then, adaptation set depth information such as @fixedDepth, @minDepth, and @maxDepth is set. Further, in the next row, representation association identification information (Representation@associationId) and representation dependency relation information such as an association type (associationType) are set. Since the representation dependency relation information is dependent information, the association type (associationType) is set to "depd".

As described above, since the adaptation set depth information and the representation dependency relation information are stored in the MPD, the decoder can confirm the representation (that is, the track) including the desired slice more easily on the basis of the information without parsing the bitstream. Consequently, an increase in a load on the reproduction process can be suppressed.

Note that one or both of the present technology described in (<4. Transmission of scalable decoding information by control file>) of this chapter, that is, storing the scalable decoding information (adaptation set configuration information) in the MPD and the present technology described in <2. Transmission of scalable decoding information by content file> of this chapter, that is, storing the scalable decoding information (at least slice configuration information for each sample) in the metadata area of the content file may be applied.

5. Second Embodiment

<5-1. File Generation Device>

Figure 27:
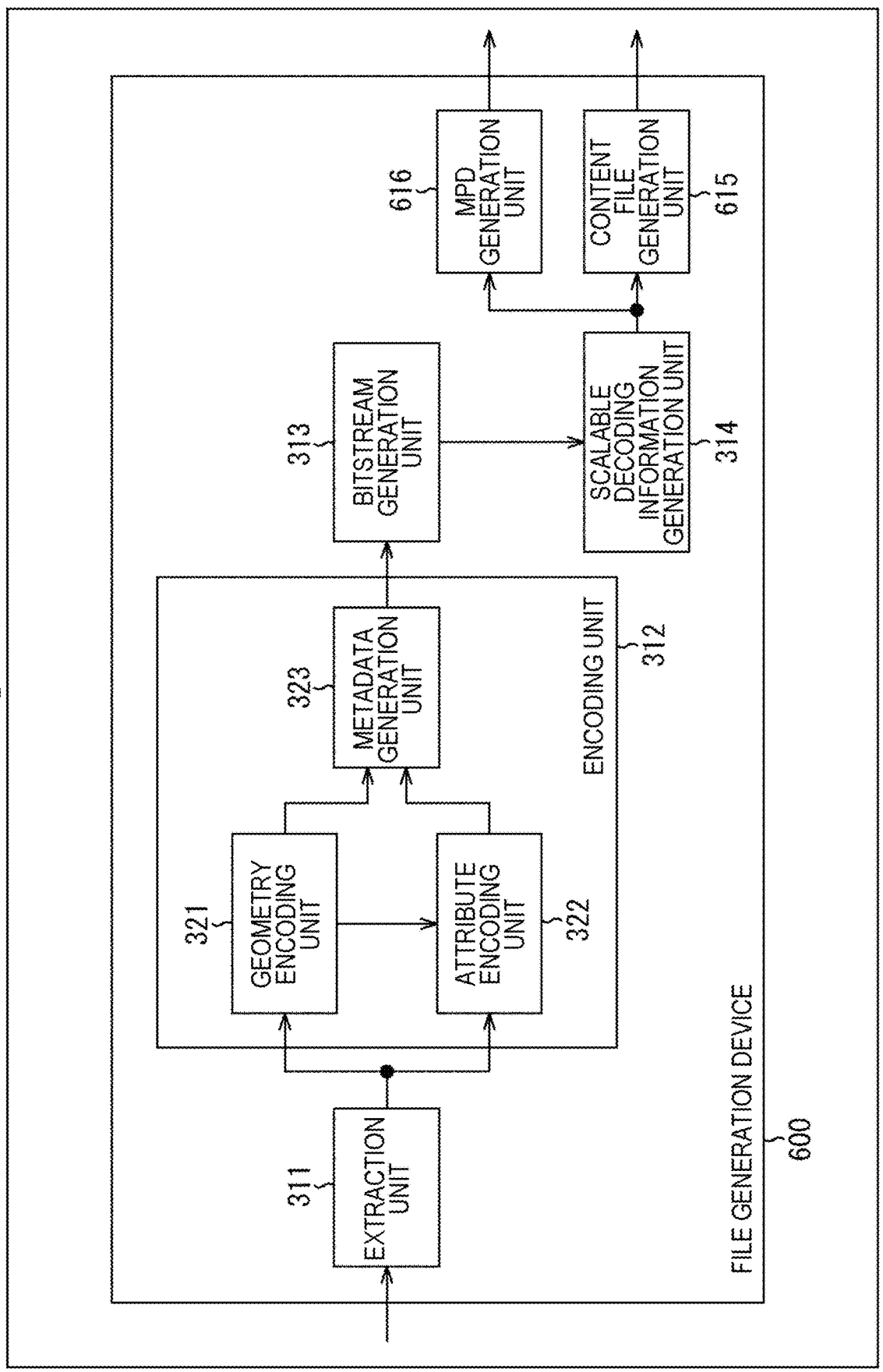
FIG. 27 is a block diagram illustrating a main configuration example of a file generation device.

(Each method of) the present technology described above can be applied to any device. FIG. 27 is a block diagram illustrating an example of a configuration of a file generation device which is a type of information processing device to which the present technology is applied. As in the file generation device 300, the file generation device 600 illustrated in FIG. 27 is a device that encodes point cloud data by applying G-PCC, and stores G-PCC content (G-PCC bitstream) generated by the encoding in a content file (ISOBMFF). However, the file generation device 600 further generates an MPD corresponding to the content file.

At that time, the file generation device 600 can apply the present technology described above in the chapter <2. Transmission of scalable decoding information by content file> or <4. Transmission of scalable decoding information by control file>. That is, the file generation device 600 can generate the scalable decoding information on the basis of the depth of the slice in the G-PCC content and the dependency relation between slices, generate the content file that stores the G-PCC content, and store at least the slice configuration information for each sample in the generated scalable decoding information in the metadata area of the generated content file. Further, the file generation device 600 can store the adaptation set configuration information among the generated scalable decoding information in the MPD.

Note that, in FIG. 27, main processing units, data flows, and the like are illustrated, and those illustrated in FIG. 27 are not necessarily all. That is, in the file generation device 600, there may be a processing unit not illustrated as a block in FIG. 27, or there may be a process or a data flow not illustrated as an arrow or the like in FIG. 27.

As illustrated in FIG. 27, the file generation device 600 has a configuration basically similar to that of the file generation device 300 (FIG. 19). However, the file generation device 600 includes a content file generation unit 615 and an MPD generation unit 616 instead of the file generation unit 315.

Also in this case, the scalable decoding information generation unit 314 applies the present technology described above in <2. Transmission of scalable decoding information by content file> to generate scalable decoding information (at least slice configuration information for each sample). That is, the scalable decoding information generation unit 314 generates the scalable decoding information (at least the slice configuration information for each sample) on the basis of the depth information indicating the quality hierarchy level of the geometry included in each slice in the G-PCC content including the first and second slices and the dependency relation between the first and second slices in the G-PCC content. Further, in this case, the scalable decoding information generation unit 314 applies the present technology described above in the chapter <4. Transmission of scalable decoding information by control file>, and generates adaptation set configuration information as scalable decoding information instead of track configuration information. That is, the scalable decoding information generation unit 314 generates, as the adaptation set configuration information generation unit, the adaptation set configuration information on the basis of the depth information indicating the quality hierarchy level of the geometry included in each slice in the G-PCC content including the first and second slices and the dependency relation between the first and second slices in the G-PCC content.

The scalable decoding information generation unit 314 supplies the generated scalable decoding information to the content file generation unit 615 along with the G-PCC content. Further, the scalable decoding information generation unit 314 also supplies the generated scalable decoding information to the MPD generation unit 616 along with the G-PCC content.

The content file generation unit 615 applies the present technology described above in <2. Transmission of scalable decoding information by content file>, generates a content file that stores the supplied G-PCC content in a track on the slice basis, and stores the scalable decoding information (at least slice configuration information for each sample) in a metadata area of the generated content file. The content file generation unit 615 outputs the content file generated as described above to the outside of the file generation device 300.

The MPD generation unit 616 generates an MPD as a control file generation unit, and stores information regarding the supplied G-PCC content in the MPD. Further, the MPD generation unit 616 applies the present technology described above in the chapter <4. Transmission of scalable decoding information by control file> and stores the supplied scalable decoding information (adaptation set configuration information) in the MPD. The MPD generation unit 616 outputs the MPD generated as described above to the outside of the file generation device 300 (for example, a content file distribution server or the like).

The adaptation set configuration information may include the adaptation set depth information. That is, the scalable decoding information generation unit 314 may generate the adaptation set configuration information including the adaptation set depth information and the MPD generation unit 616 may store the adaptation set configuration information in the adaptation set of the MPD. Further, the adaptation set depth information may include the adaptation set minimum depth information. Further, the adaptation set depth information may include the adaptation set maximum depth information. Furthermore, the adaptation set depth information may include a matching flag. That is, the scalable decoding information generation unit 314 may generate the adaptation set depth information including this information, and the MPD generation unit 616 may store the adaptation set depth information in the adaptation set of the MPD. For example, the MPD generation unit 616 may newly define a supplemental property or an essential property and store the adaptation set depth information therein.

Further, the adaptation set configuration information may include representation dependency relation information. That is, the scalable decoding information generation unit 314 may generate the adaptation set configuration information including the representation dependency relation information and the MPD generation unit 616 may store the adaptation set configuration information in the adaptation set of the MPD. Further, the representation dependency relation information may include dependent information indicating another representation necessary for decoding the representation corresponding to the information. Furthermore, the dependent information may indicate all the other representations necessary for decoding the representation corresponding to the information. Furthermore, the dependent information may indicate another representation referred to from the representation corresponding to the information. That is, the scalable decoding information generation unit 314 may generate the representation dependency relation information including such dependent information and the MPD generation unit 616 may store the representation dependency relation information in the Adaptation Set of the MPD.

Further, the representation dependency relation information may include independent information indicating another representation for which a representation corresponding to the information is necessary in decoding. Then, the independent information may indicate all the other representations that require a representation corresponding to the information in decoding. That is, the scalable decoding information generation unit 314 may generate the representation dependency relation information including such independent information and the MPD generation unit 616 may store the representation dependency relation information in the Adaptation Set of the MPD.

The representation dependency relation information may be stored in the control file (MPD) as two parameters of representation association identification information (Representation@associationId) and an association type (associationType).

In this way, it is possible to inhibit an increase in the load on the reproduction process as described above in the chapter <2. Transmission of scalable decoding information by content file> and <4. Transmission of scalable decoding information by control file>.

<Flow of File Generation Process>

Figure 28:
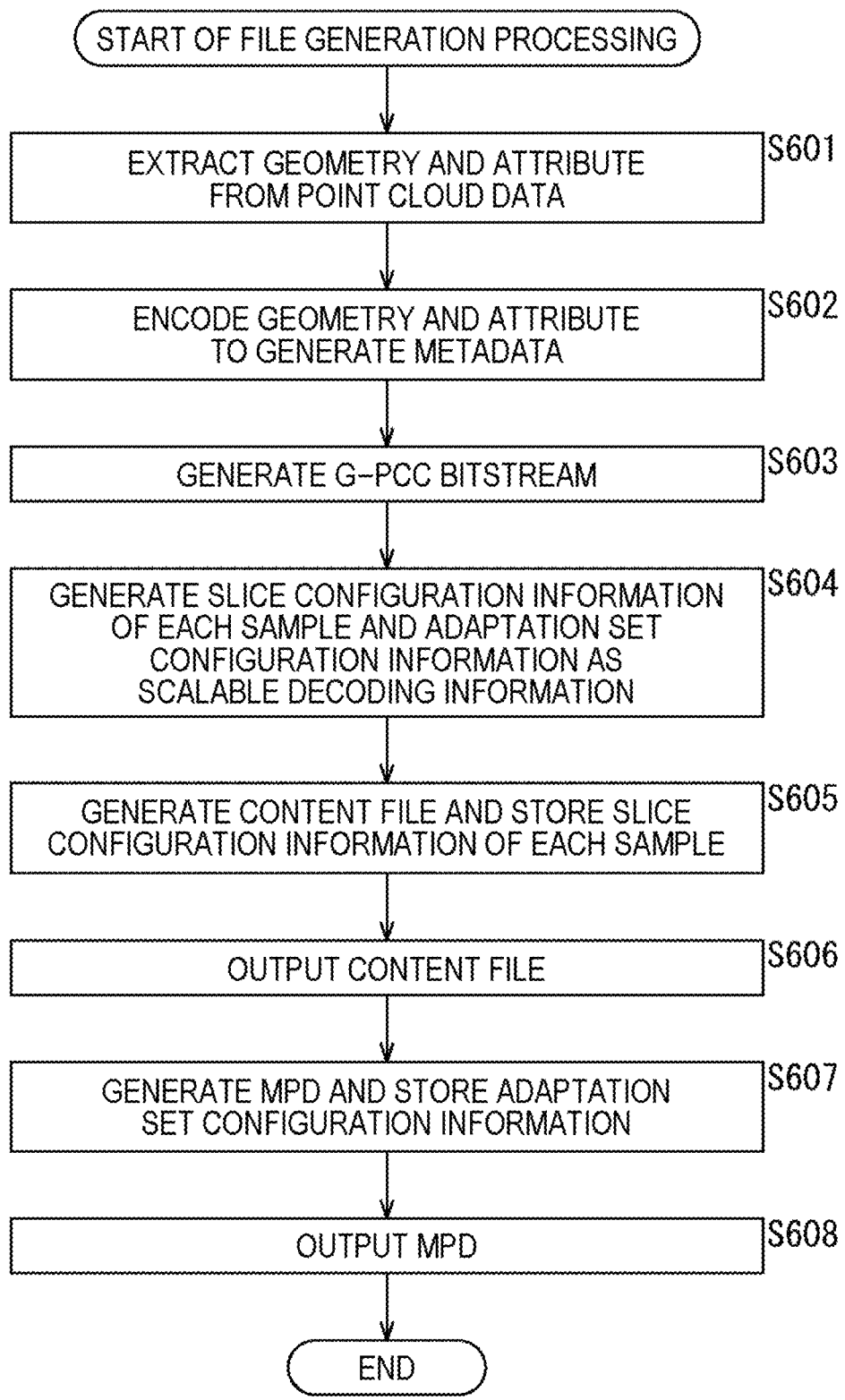
FIG. 28 is a flowchart illustrating an example of a flow of a file generation process.

An example of a flow of the file generation process executed by the file generation device 600 will be described with reference to the flowchart of FIG. 28.

Figure 20:
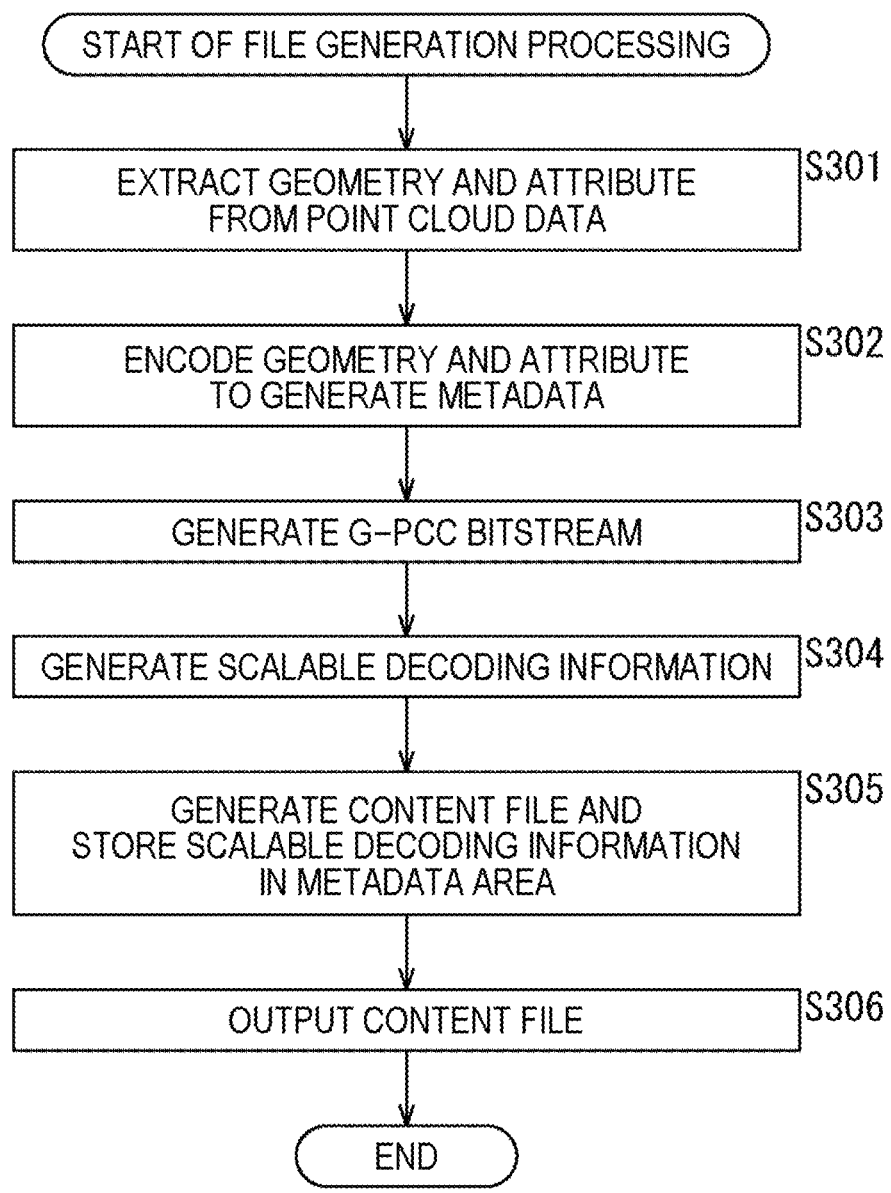
FIG. 20 is a flowchart illustrating an example of a flow of a file generation process.

When the file generation process starts, each process of steps S601 to S603 is executed similarly to each process of steps S301 to S303 in the flowchart of the file generation process of FIG. 20.

In step S604, the scalable decoding information generation unit 314 applies the present technology described in the chapter <2. Transmission of scalable decoding information by content file> to generate the slice configuration information for each sample as the scalable decoding information. Further, the scalable decoding information generation unit 314 applies the present technology described in the chapter <4. Transmission of scalable decoding information by control file> to generate the adaptation set configuration information as scalable decoding information.

In step S605, the content file generation unit 615 applies the present technology described in the chapter <2. Transmission of scalable decoding information by content file>. That is, the content file generation unit 615 generates the content file and stores the G-PCC content in the track of the content file on the slice basis. Then, the content file generation unit 615 stores the slice configuration information for each sample in the metadata area of the content file.

In step S606, the content file generation unit 615 outputs the generated content file (the content file that stores the scalable decoding information) to the outside of the file generation device 600. For example, the content file generation unit 615 transmits the content file to another device (for example, a reproduction device or the like) via a network or the like. Further, for example, the content file generation unit 615 supplies the content file to a storage medium outside of the file generation device 600 and stores the content file. In this case, the content file is supplied to the reproduction device or the like via the storage medium.

In step S607, the MPD generation unit 616 applies the present technology described in the chapter <4. Transmission of scalable decoding information by control file>. That is, the MPD generation unit 616 generates the MPD corresponding to the content file generated in step S605 and stores the adaptation set configuration information generated in step S604 in the MPD.

In step S608, the MPD generation unit 616 outputs the MPD to the outside of the file generation device 600. For example, the MPD is provided to a content file distribution server or the like.

When the process of step S608 ends, the file generation process ends.

In this way, in the file generation process, the file generation device 600 applies the present technology described in the chapter <2. Transmission of scalable decoding information by content file> or <4. Transmission of scalable decoding information by control file> and stores the scalable decoding information in the metadata area or MPD of the content file. In this way, the transmission and the process (decoding or the like) of unnecessary information can be reduced, and it is possible to inhibit an increase in the load on data transmission and the reproduction process.

<5-2. Reproduction Device>

Figure 29:
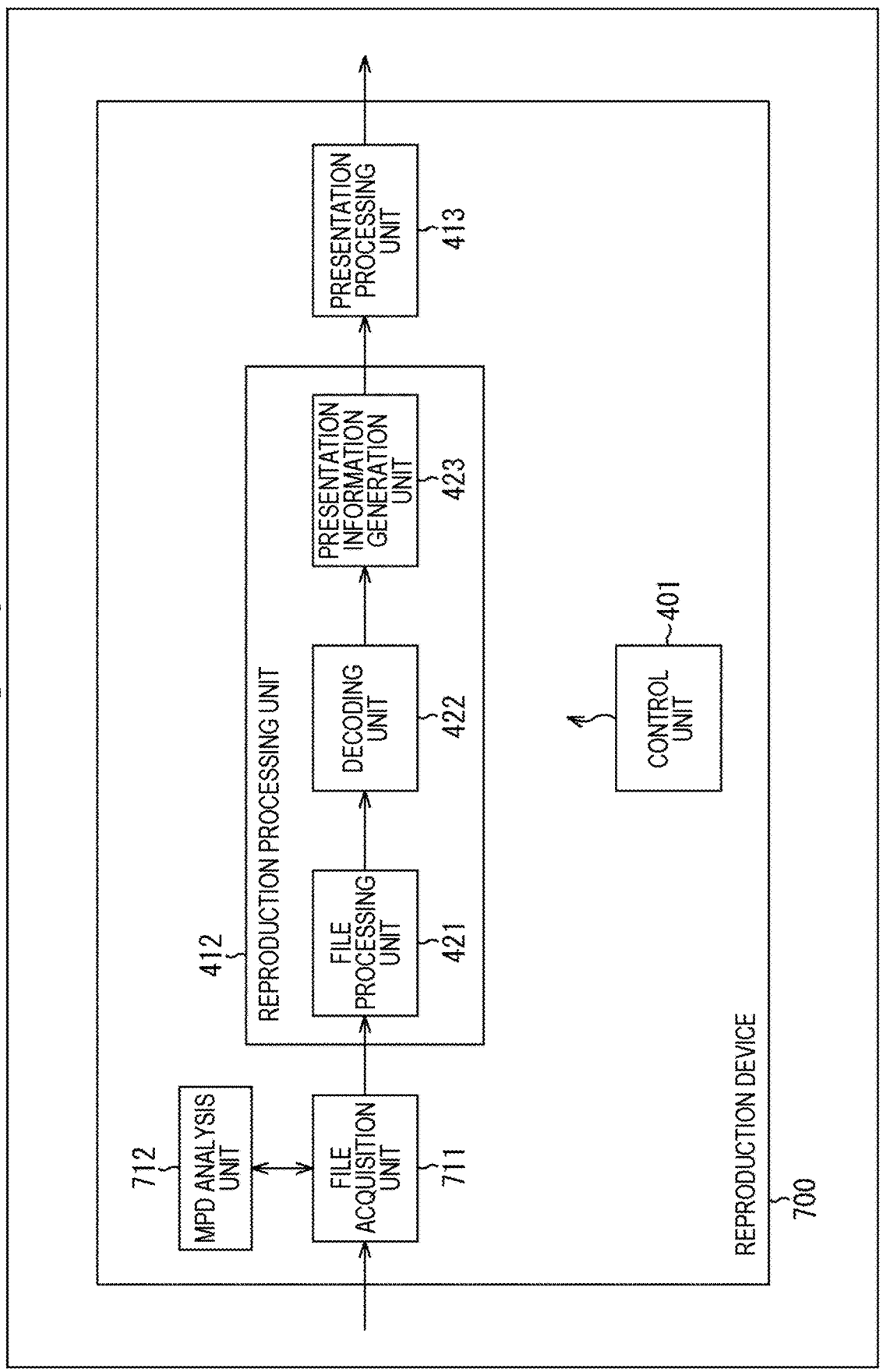
FIG. 29 is a block diagram illustrating a main configuration example of a decoding device.

FIG. 29 is a block diagram illustrating an example of a configuration of a reproduction device which is a type of information processing device to which the present technology is applied. As in the reproduction device 400, a reproduction device 700 illustrated in FIG. 29 is a device that decodes a content file, constructs a point cloud, and renders the point cloud to generate presentation information. At that time, the reproduction device 700 can apply the present technology described above in the chapter <2. Transmission of scalable decoding information by content file> or <4. Transmission of scalable decoding information by control file>.

Note that, in FIG. 29, main processing units, data flows, and the like are illustrated, and those illustrated in FIG. 29 are not necessarily all. That is, in the reproduction device 700, there may be a processing unit not illustrated as a block in FIG. 29, or there may be a process or a data flow not illustrated as an arrow or the like in FIG. 29.

As illustrated in FIG. 29, the reproduction device 700 basically has the same configuration as the reproduction device 400 (see FIG. 21). However, the reproduction device 700 includes a file acquisition unit 711 and an MPD analysis unit 712 instead of the file acquisition unit 411.

The file acquisition unit 711 acquires an MPD corresponding to a desired content file (a content file to be reproduced) and supplies the MPD to the MPD analysis unit 712. Further, the file acquisition unit 711 requests and acquires the track requested from the MPD analysis unit 712 among the tracks of the content file from the supply source of the content file to be reproduced. The file acquisition unit 711 supplies the acquired track (a bitstream stored in the track) to the reproduction processing unit 412 (file processing unit 421).

When the MPD is acquired from the file acquisition unit 711, the MPD analysis unit 712 analyzes the MPD and selects a desired track. At that time, the MPD analysis unit 712 can apply the present technology described above in the chapter <4. Transmission of scalable decoding information by control file>. That is, the MPD analysis unit 712 specifies an adaptation set (that is, a track) necessary for obtaining any slice of the G-PCC content on the basis of the adaptation set configuration information stored in the adaptation set of the MPD. The MPD analysis unit 712 requests the file acquisition unit 711 to acquire the track corresponding to the specified adaptation set.

The adaptation set configuration information may include the adaptation set depth information. For example, the MPD analysis unit 712 may ascertain the depth information of the geometry of all the slices included in the track on the basis of the adaptation set depth information stored in the adaptation set of the MPD, and specify the adaptation set (that is, the track) necessary for obtaining any slice on the basis of the depth information. Further, the adaptation set depth information may include the adaptation set minimum depth information. Further, the adaptation set depth information may include the adaptation set maximum depth information. Furthermore, the adaptation set depth information may include a matching flag. For example, the MPD analysis unit 712 may ascertain the depth information of the geometry of all the slices included in the track on the basis of the information stored in the adaptation set of the MPD, and specify the adaptation set (that is, the track) necessary for obtaining any slice on the basis of the depth information.

Further, the adaptation set configuration information may include representation dependency relation information. For example, the MPD analysis unit 712 may ascertain the dependency relation between the representations (that is, the tracks) on the basis of the representation dependency relation information stored in the adaptation set of the MPD and specify the representation (that is, the track) necessary for obtaining any slice on the basis of the dependency relation. The representation dependency relation information may include dependent information indicating another representation necessary for decoding the representation corresponding to the information. Furthermore, the dependent information may indicate all the other representations necessary for decoding the representation corresponding to the information. Furthermore, the dependent information may indicate another representation referred to from the representation corresponding to the information. For example, the MPD analysis unit 712 may specify another representation (that is, another track) necessary for decoding the representation corresponding to the information on the basis of the dependent information stored in the adaptation set of the MPD.

Further, the representation dependency relation information may include independent information indicating another representation for which a representation corresponding to the information is necessary in decoding. Then, the independent information may indicate all the other representations that require a representation corresponding to the information in decoding. For example, the MPD analysis unit 712 may specify another representation (that is, another track) in which the representation corresponding to the information is necessary in decoding on the basis of the dependent information stored in the adaptation set of the MPD.

The representation dependency relation information may be stored in the control file (MPD) as two parameters of representation association identification information (Representation@associationId) and an association type (associationType). That is, the MPD analysis unit 712 may, ascertain the dependency relation between the representations (that is, the tracks) on the basis of these parameters with reference to these parameters stored in the adaptation set of the MPD and specify the representation (that is, the track) necessary for obtaining any slice on the basis of the dependency relation.

In this way, it is possible to inhibit an increase in the load on the reproduction process as described above in the chapter <2. Transmission of scalable decoding information by content file> and <4. Transmission of scalable decoding information by control file>.

The decoding unit 422 applies the present technology described above in the chapter <4. Transmission of scalable decoding information by control file> and decodes the slice of the G-PCC content stored in the track supplied from the file acquisition unit 711.

<Flow of Reproduction Process>

Figure 30:
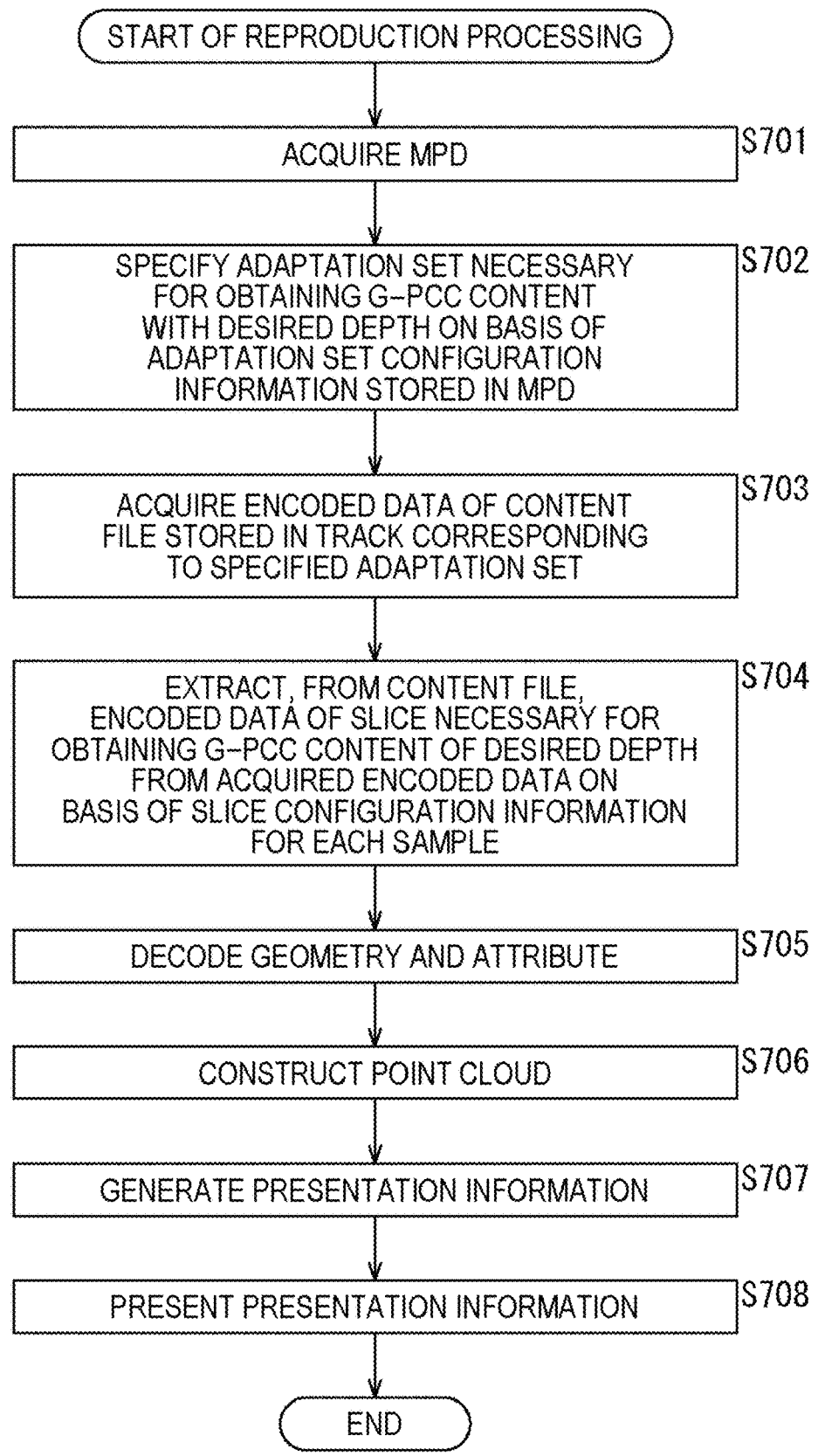
FIG. 30 is a flowchart illustrating an example of a flow of a reproduction process.

An example of a flow of the reproduction process executed by the reproduction device 700 will be described with reference to the flowchart of FIG. 30.

When the reproduction process starts, the file acquisition unit 711 of the reproduction device 700 acquires the MPD corresponding to the content file to be reproduced in step S701.

In step S702, the MPD analysis unit 712 specifies the adaptation set necessary for obtaining the G-PCC content with a desired depth on the basis of the adaptation set configuration information stored in the MPD.

In step S703, the file acquisition unit 711 acquires the encoded data of the content file to be reproduced stored in the track corresponding to the adaptation set specified in step S702.

In step S704, the file processing unit 421 acquires, from the content file, encoded data of the slice necessary for obtaining G-PCC content with the desired depth from the acquired encoded data on the basis of the slice configuration information for each sample.

Figure 23:
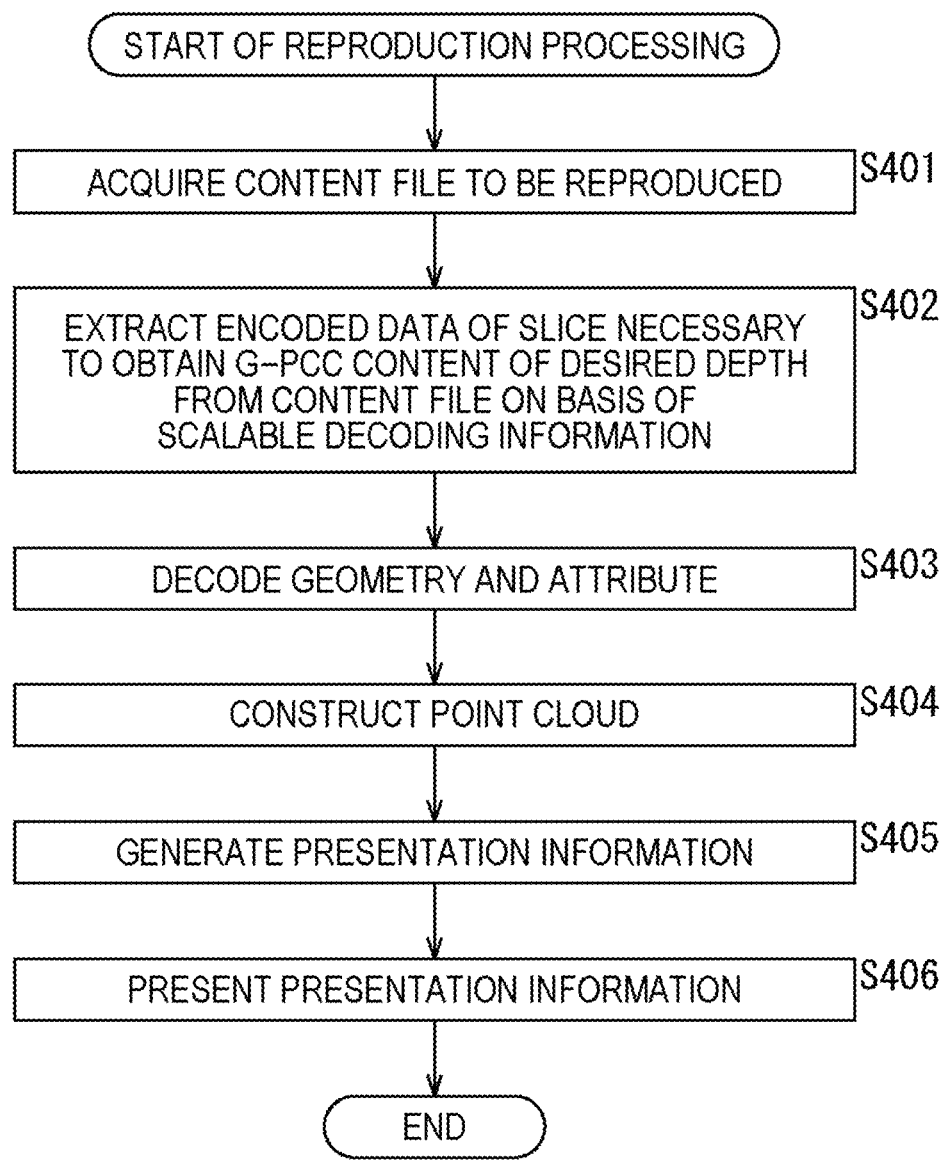
FIG. 23 is a flowchart illustrating an example of a flow of a reproduction process.

The processes of steps S705 to S708 are executed as in the processes of steps S403 to S406 of the reproduction process of FIG. 23. When the process of step S708 ends, the reproduction process ends.

As described above, in the reproduction process, the reproduction device 700 applies the present technology described in the chapter <2. Transmission of scalable decoding information by content file> or <4. Transmission of scalable decoding information by control file> and acquires and decodes a desired track of the content file on the basis of the adaptation set configuration information stored in the MPD or the slice configuration information for each sample stored in the metadata area of the content file. In this way, processes of unnecessary information (data transmission, decoding, and the like) can be reduced, and it is possible to inhibit an increase in a load on the reproduction process.

6. Supplements

<Computer>

The above-described series of processes can be executed by hardware or software. In a case where the series of processes is executed by software, a program of the software is installed in a computer. Here, the computer is, for example, a computer incorporated in dedicated hardware, a general-purpose personal computer capable of executing various functions by installing various programs, or the like.

Figure 31:
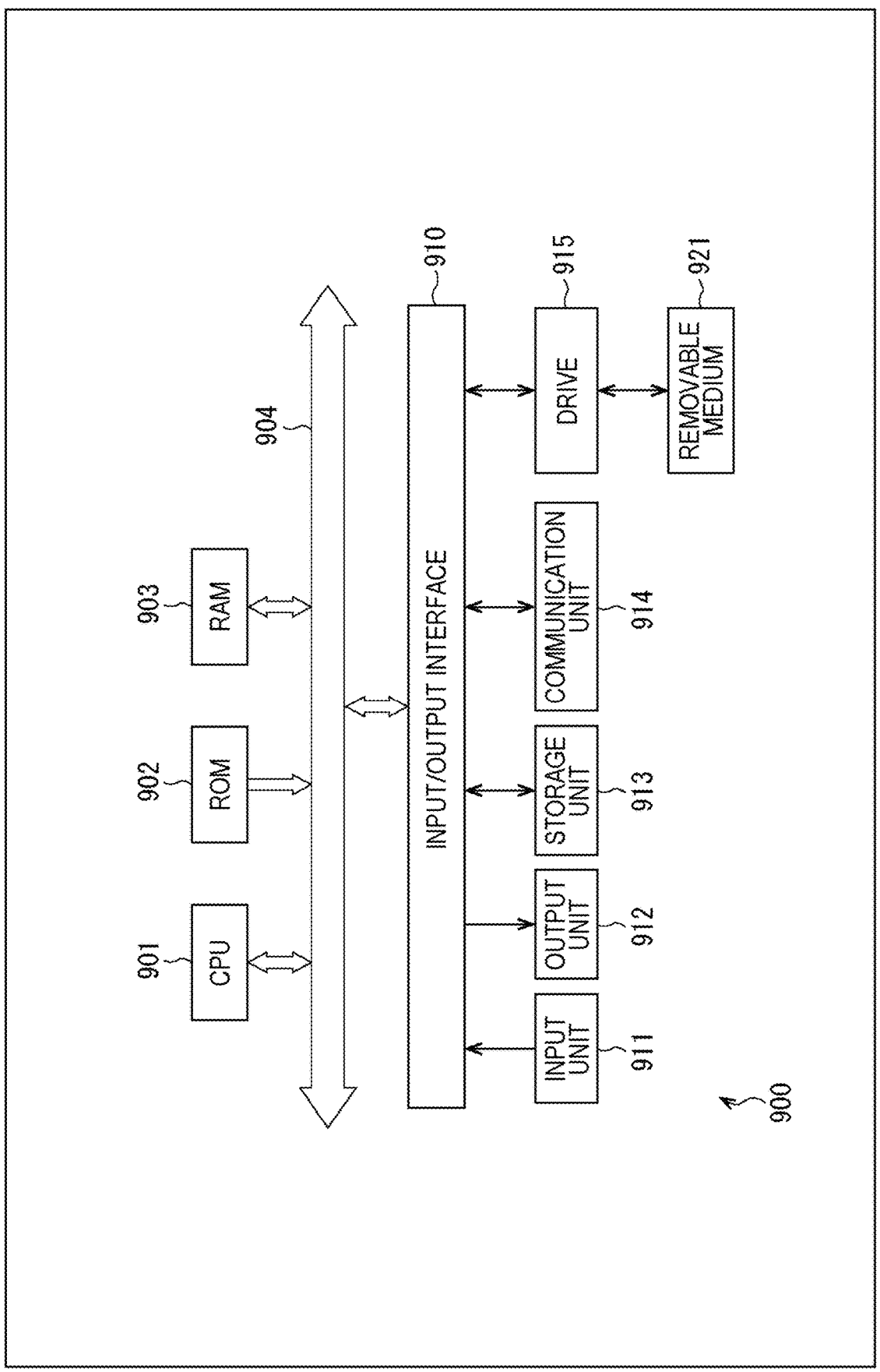
FIG. 31 is a block diagram illustrating a main configuration example of a computer.

FIG. 31 is a block diagram illustrating a configuration example of a computer that executes the above-described series of processes in accordance with a program.

In the computer 900 illustrated in FIG. 31, a central processing unit (CPU) 901, a read-only memory (ROM) 902, and a random access memory (RAM) 903 are connected to each other by a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable medium 921 such as a magnetic disk, an optical disc, a magneto-optical disc, or a semiconductor memory.

In the computer configured as described above, for example, the CPU 901 performs the above-described series of processes by loading a program stored in the storage unit 913 on the RAM 903 via the input/output interface 910 and the bus 904 and executing the program. The RAM 903 also appropriately stores data and the like necessary for the CPU 901 to execute various processes.

The program executed by the computer can be applied by being recorded on the removable medium 921 as a package medium or the like, for example. In this case, the program can be installed in the storage unit 913 via the input/output interface 910 by attaching the removable medium 921 to the drive 915.

Further, this program can also be provided via a wired or wireless transmission medium such as a local area network, the Internet, or digital satellite broadcasting. In this case, the program can be received by the communication unit 914 and can be installed in the storage unit 913.

In addition, this program can be installed in advance in the ROM 902 or the storage unit 913.

<Target to which the Present Technology is Applicable>

As described above, the case where the G-PCC content having the slice structure is stored in the ISOBMFF has been described as an example, but a case to which the present technology can be applied is not limited to this example. The present technology can be applied to any technology as long as it is not incompatible with the present technology described above. For example, although the point cloud data has been described as an encoding target in an example, 3D data of any standard can be set as an encoding target. Further, although the G-PCC has been described as an example of the encoding or decoding method, any encoding or decoding method can be applied as long as it is a method capable of generating encoded data that has a slice structure (a method corresponding to scalable decoding). Further, ISOBMFF has been described as an example of the file format with which the G-PCC content is stored, but any file format can be applied as long as scalable decoding information can be stored. Further, as long as there is no incompatibility with the present technology, some of the processes and specifications described above may be omitted or may be combined with a technology not described above.

Further, the present technology can be applied to any configuration. For example, the present technology can be applied to various electronic devices.

Further, for example, the present technology can also be implemented as a partial configuration of a device, such as a processor which is a system large scale integration (LSI) or the like, a module using a plurality of processors or the like, a unit using a plurality of modules or the like, or a set in which other functions are further added to a unit.

Further, for example, the present technology can also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that, in the present specification, a system means a set of a plurality of components (devices, modules (components), or the like), and it does not matter whether or not all the components are in the same housing. Therefore, a plurality of devices housed in separate housings and connected via a network and one device in which a plurality of modules is housed in one housing are all systems.

<Field and Application to which Present Technology is Applicable>

The system, the device, the processing unit, and the like to which the present technology is applied can be used in any field such as traffic, medical care, crime prevention, agriculture, a livestock industry, mining, beauty, a factory, a home appliance, weather, and natural monitoring. Further, the application thereof is also arbitrary.

For example, the present technology can be applied to a system or a device provided for providing content for appreciation or the like. Further, for example, the present technology can also be applied to systems and devices provided for traffic, such as traffic condition supervision and automatic driving control. Furthermore, for example, the present technology can also be applied to a system or a device provided for security. Further, for example, the present technology can be applied to a system or a device provided for automatic control of a machine or the like. Furthermore, for example, the present technology can also be applied to systems and devices used for agriculture and livestock industry. Further, the present technology can also be applied to a system and a device that monitor natural states such as volcanoes, forests, and oceans, wildlife, and the like. Furthermore, for example, the present technology can also be applied to systems and devices provided for sports.

Others

Note that, in the present specification, a "flag" is information with which a plurality of states is identified and includes not only information used for identifying two states of true (1) and false (0) but also information with which three or more states can be identified. Therefore, a value that can be taken by the "flag" may be, for example, a binary of 1 and 0, or a ternary or more. That is, the number of bits included in this "flag" is any number and may be one bit or a plurality of bits. Further, since identification information (including the flag) is assumed to include not only identification information in a bitstream but also difference information of the identification information with respect to certain reference information in the bitstream, the "flag" and the "identification information" include not only the information but also the difference information with respect to the reference information in the present specification.

Further, various types of information (metadata and the like) regarding the encoded data (the bitstream) may be transmitted or recorded in any form as long as the information is associated with the encoded data. Here, the term "association" means, for example, that one piece of data can be used (linked) when the other piece of data is processed. That is, data associated with each other may be collected as one piece of data or may be individual data. For example, the second data associated with the first data may be transmitted on a transmission path different from the transmission path of the first data. Further, for example, second data associated with first data may be recorded on a recording medium different from the first data (or another recording area of the same recording medium). Note that this "association" may be part of data instead of the entire data. For example, 3D data and metadata corresponding to the 3D data may be associated with each other on any basis such as a plurality of samples, one sample, or a part in a sample.

Note that, in the present specification, terms such as "combining", "multiplexing", "adding", "integrating", "including", "storing", "pushing", "fitting", "interposing", and the like mean to put a plurality of objects into one, and mean one method of the above-described "association".

Further, embodiments of the present technology are not limited to the above-described embodiments, and various modifications can be made without departing from the gist of the present technology.

For example, a configuration described as one device (or a processing unit) may be divided and configured as a plurality of devices (or processing units). Conversely, the configurations described above as a plurality of devices (or processing units) may be collectively configured as one device (or a processing unit). Further, a configuration other than the above-described configuration may be added to the configuration of each device (or each processing unit). Furthermore, as long as the configuration and the operation of the entire system are substantially the same, a part of the configuration of a certain device (or a processing unit) may be included in the configuration of another device (or another processing unit).

Further, for example, the above-described program may be executed in any device. In that case, it is sufficient that the device has a necessary function (a functional block or the like) and can obtain necessary information.

Further, for example, each step of one flowchart may be executed by one device or may be shared and executed by a plurality of devices. Furthermore, in a case where a plurality of processes is included in one step, the plurality of processes may be executed by one device or may be shared and executed by the plurality of devices. In other words, a plurality of processes included in one step can also be executed as processes of a plurality of steps. Conversely, the process described as a plurality of steps can be collectively executed as one step.

Further, a program that is executed by the computer may have the following features. For example, the process of steps describing the program may be executed chronologically in an order described in the present specification. Further, a process of steps describing the program may be executed in parallel. Furthermore, the process of steps describing the program may be individually executed at necessary timing such as when called. That is, as long as there is no contradiction, the process of each step may be executed in an order different from the above-described order. Further, a process of steps describing this program may be executed in parallel with a process of another program. Furthermore, a process of steps describing this program may be executed in combination with a process of another program.

Further, for example, a plurality of technologies related to the present technology can be implemented independently as a single technology as long as there is no contradiction. Of course, a plurality of any present technologies can be implemented in combination. For example, some or all of the present technologies described in the embodiments can be implemented in combination with some or all of the present technologies described in other embodiments. Further, some or all of the above-described present technologies can be implemented in combination with other technologies not described above.

Note that the present technology can also have the following configurations.

(1) An information processing device including:
- a scalable decoding information generation unit configured to generate scalable decoding information regarding scalable decoding of geometry-based point cloud compression (G-PCC) content on the basis of depth information indicating a quality hierarchy level of geometry included in each slice in the G-PCC content including first and second slices and a dependency relation between the first and second slices in the G-PCC content; and
- a content file generation unit configured to generate a content file that stores the G-PCC content and store the scalable decoding information in a metadata area of the content file.

(2) The information processing device according to (1), in which the scalable decoding information includes slice configuration information regarding a configuration of the slice for each sample.

(3) The information processing device according to (2), in which the content file generation unit sets a subsample for each slice and stores the slice configuration information in a codec specific parameter of a subsample information box of the metadata area.

(4) The information processing device according to (2) or (3), in which the slice configuration information includes slice dependency relation information indicating the dependency relation between the first and second slices.

(5) The information processing device according to (4), in which the content file generation unit sets a subsample for each slice and stores the slice dependency relation information in the codec specific parameter of the subsample information box of the metadata area.

(6) The information processing device according to (4) or (5),
in which the slice dependency relation information includes reference source geometry slice identification information and reference destination geometry slice identification information,
the reference source geometry slice identification information is identification information of a geometry slice serving as a reference source in the dependency relation between the first and second slices, and
the reference destination geometry slice identification information is identification information of a geometry slice serving as a reference destination in the dependency relation between the first and second slices.

(7) The information processing device according to (6), in which, when the geometry slices corresponding to the reference source geometry slice identification information are independent decodable independent geometry slices, the reference source geometry slice identification information and the reference destination geometry slice identification information are the same.

(8) The information processing device according to (6) or (7), in which the content file generation unit sets a subsample for each of the slices and stores the reference source geometry slice identification information and the reference destination geometry slice identification information in a codec specific parameter of a subsample information box of the metadata area.

(9) The information processing device according to any one of (4) to (8), in which the slice dependency relation information includes attribute geometry slice identification information which is identification information of a geometry slice referred to by the attribute slice.

(10) The information processing device according to (9), in which the content file generation unit sets a subsample for each slice and stores the attribute geometry slice identification information in the codec specific parameter of the subsample information box of the metadata area.

(11) The information processing device according to any one of (4) to (8), in which the slice dependency relation information includes non-scalable encoding attribute geometry slice identification information which is identification information of a geometry slice referred to by an attribute slice to which non-scalable encoding is applied.

(12) The information processing device according to (11), in which the non-scalable encoding attribute geometry slice identification information includes identification information of the geometry slice including the geometry with maximum depth information among the geometry slices referred to by the attribute slice.

(13) The information processing device according to (11) or (12), in which the content file generation unit sets a subsample for each slice and stores the non-scalable encoding attribute geometry slice identification information in the codec specific parameter of the subsample information box of the metadata area.

(14) The information processing device according to any one of (11) to (13), in which the non-scalable encoding attribute geometry slice identification information includes a non-scalable encoding flag indicating whether or not non-scalable encoding is applied to the attribute slice.

(15) The information processing device according to (14), in which the content file generation unit sets a subsample for each of the slices, and stores the non-scalable encoding flag in the codec specific parameter of the subsample information box of the metadata area.

(16) The information processing device according to any one of (10) to (15), in which a payload type of the slice dependency relation information of independently decodable independent geometry slices is different from a payload type of the slice dependency relation information of dependent geometry slices that refer to the other geometry slices in decoding.

(17) The information processing device according to any one of (2) to (16), in which the slice configuration information includes geometry slice depth information regarding the depth information of the geometry included in the geometry slice.

(18) The information processing device according to (17), in which the geometry slice depth information includes minimum depth information indicating a minimum value of the depth information in the geometry slice.

(19) The information processing device according to (17) or (18), in which the geometry slice depth information includes maximum depth information indicating a maximum value of the depth information in the geometry slice.

(20) The information processing device according to any one of (17) to (19), in which the content file generation unit sets a subsample for each slice and stores the geometry slice depth information in the codec specific parameter of the subsample information box of the metadata area.

(21) The information processing device according to (20), in which the slice configuration information further includes slice dependency relation information indicating the dependency relation between the first and second slices, and the content file generation unit sets flags of the subsample information box in which the geometry slice depth information is stored to a different value from flags of the subsample information box in which the slice dependency relation information is stored.

(22) The information processing device according to any one of (1) to (21), in which the scalable decoding information includes track configuration information regarding a configuration of a track that stores the G-PCC content on a slice basis in the content file.

(23) The information processing device according to (22), in which the track configuration information includes track depth information regarding the depth information of the geometries of all the slices included in the track corresponding to the track configuration information.

(24) The information processing device according to (23), in which the track depth information includes track minimum depth information indicating a minimum value of the depth information in the track.

(25) The information processing device according to (23) or (24), the track depth information includes track maximum depth information indicating a maximum value of the depth information in the track.

(26) The information processing device according to any one of (23) to (25), in which the track depth information includes a matching flag indicating whether or not a minimum value of the depth information in each sample included in the track matches a minimum value of the depth information in the track and a maximum value of the depth information in each sample included in the track matches a maximum value of the depth information in the track.

(27) The information processing device according to any one of (23) to (26), in which the content file generation unit stores the track depth information in a depth information box of a sample entry of the metadata area.

(28) The information processing device according to any one of (22) to (27), in which the track configuration information includes track dependency relation information indicating a dependency relation between first and second tracks.

(29) The information processing device according to (28), in which the track dependency relation information includes dependent information indicating another track including the slice necessary for decoding the dependent slice included in the track.

(30) The information processing device according to (29), in which the dependent information indicates all the other tracks including the slice necessary for decoding the dependent slice.

(31) The information processing device according to (29), in which the dependent information indicates the other track including the slice referred to from the dependent slice.

(32) The information processing device according to any one of (28) to (31), in which the track dependency relation information includes independent information indicating another track including another slice in which an independent slice included in the track is necessary in decoding.

(33) The information processing device according to (32), in which the independent information indicates the other track including the other slice that refers to the independent slice in decoding.

(34) The information processing device according to any one of (28) to (33), in which the content file generation unit stores the track dependency relation information as a track reference in the metadata area.

(35) An information processing method including:

generating scalable decoding information regarding scalable decoding of geometry-based point cloud compression (G-PCC) content on the basis of depth information indicating a quality hierarchy level of geometry included in each slice in the G-PCC content including first and second slices and a dependency relation between the first and second slices in the G-PCC content; and generating a content file that stores the G-PCC content and storing the scalable decoding information in a metadata area of the content file.

(51) An information processing device including:

an extraction unit configured to extract an arbitrary slice of geometry-based point cloud compression (G-PCC) content from a content file on the basis of scalable decoding information stored in a metadata area of the content file that stores the G-PCC content including first and second slices; and a decoding unit configured to decode the slice of the G-PCC content extracted by the extraction unit, in which the scalable decoding information is information regarding scalable decoding of the G-PCC content and is information generated on the basis of depth information indicating a quality hierarchy level of geometry included in the slice in the G-PCC content and a dependency relation between the first and second slices in the G-PCC content.

(52) The information processing device according to (51), in which the scalable decoding information includes slice configuration information regarding a configuration of the slice for each sample.

(53) The information processing device according to (52), in which the extraction unit extracts an arbitrary slice of the G-PCC content from the content file on the basis of the slice configuration information stored in a codec specific parameter of a subsample information box of the metadata area of the subsample set for each slice.

(54) The information processing device according to (52) or (53), in which the slice configuration information includes slice dependency relation information indicating the dependency relation between the first and second slices.

(55) The information processing device according to (54), in which the extraction unit extracts an arbitrary slice of the G-PCC content from the content file on the basis of the slice dependency relation information stored in the codec specific parameter of the subsample information box of the metadata area of the subsample set for each slice.

(56) The information processing device according to (54) or (55), in which the slice dependency relation information includes reference source geometry slice identification information and reference destination geometry slice identification information, and the reference source geometry slice identification information is identification information of a geometry slice serving as a reference source in the dependency relation between the first and second slices, and the reference destination geometry slice identification information is identification information of a geometry slice serving as a reference destination in the dependency relation between the first and second slices.

(57) The information processing device according to (56), in which, when the geometry slices corresponding to the reference source geometry slice identification information are independent decodable independent geometry slices, the reference source geometry slice identification information and the reference destination geometry slice identification information are the same.

(58) The information processing device according to (56) or (57), in which the extraction unit extracts an arbitrary slice of the G-PCC content from the content file on the basis of the reference source geometry slice identification information and the reference destination geometry slice identification information stored in the codec specific parameter of the subsample information box of the metadata area of the subsample set for each slice.

(59) The information processing device according to any one of (54) to (58), in which the slice dependency relation information includes attribute geometry slice identification information which is identification information of a geometry slice referred to by the attribute slice.

(60) The information processing device according to (59), in which the extraction unit extracts an arbitrary slice of the G-PCC content from the content file on the basis of the attribute geometry slice identification information stored in the codec specific parameter of the subsample information box of the metadata area of the subsample set for each slice.

(61) The information processing device according to any one of (54) to (58), in which the slice dependency relation information includes non-scalable encoding attribute geometry slice identification information which is identification information of a geometry slice referred to by an attribute slice to which non-scalable encoding is applied.

(62) The information processing device according to (61), in which the non-scalable encoding attribute geometry slice identification information includes identification information of the geometry slice including the geometry with maximum depth information among the geometry slices referred to by the attribute slice.

(63) The information processing device according to (61) or (62), in which the extraction unit extracts an arbitrary slice of the G-PCC content from the content file on the basis of the non-scalable encoding attribute geometry slice identification information stored in the codec specific parameter of the subsample information box of the metadata area of the subsample set for each slice.

(64) The information processing device according to any one of (61) to (63), in which the non-scalable encoding attribute geometry slice identification information includes a non-scalable encoding flag indicating whether or not non-scalable encoding is applied to the attribute slice.

(65) The information processing device according to (64), in which the extraction unit extracts an arbitrary slice of the G-PCC content from the content file on the basis of the non-scalable encoding flag stored in a codec specific parameter of a subsample information box of the metadata area of the subsample set for each slice.

(66) The information processing device according to any one of (60) to (65), in which a payload type of the slice dependency relation information of independently decodable independent geometry slices is different from a payload type of the slice dependency relation information of dependent geometry slices that refer to the other geometry slices in decoding.

(67) The information processing device according to any one of (52) to (66), in which the slice configuration information includes geometry slice depth information regarding the depth information of the geometry included in the geometry slice.

(68) The information processing device according to (67), in which the geometry slice depth information includes minimum depth information indicating a minimum value of the depth information in the geometry slice.

(69) The information processing device according to (67) or (68), the geometry slice depth information includes maximum depth information indicating a maximum value of the depth information in the geometry slice.

(70) The information processing device according to any one of (67) to (69), in which the extraction unit extracts an arbitrary slice of the G-PCC content from the content file on the basis of the geometry slice depth information stored in the codec specific parameter of the subsample information box of the metadata area of the subsample set for each slice.

(71) The information processing device according to (70), in which the slice configuration information further includes slice dependency relation information indicating the dependency relation between the first and second slices, and flags of the subsample information box that stores the geometry slice depth information and flags of the subsample information box that stores the slice dependency relation information are set to different values.

(72) The information processing device according to any one of (51) to (71), in which the scalable decoding information includes track configuration information regarding a configuration of a track that stores the G-PCC content on a slice basis in the content file.

(73) The information processing device according to (72), in which the track configuration information includes track depth information regarding the depth information of the geometries of all the slices included in the track corresponding to the track configuration information.

(74) The information processing device according to (73), in which the track depth information includes track minimum depth information indicating a minimum value of the depth information in the track.

(75) The information processing device according to (73) or (74), in which the track depth information includes track maximum depth information indicating a maximum value of the depth information in the track.

(76) The information processing device according to any one of (73) to (75), in which the track depth information includes a matching flag indicating whether or not a minimum value of the depth information in each sample included in the track matches a minimum value of the depth information in the track and a maximum value of the depth information in each sample included in the track matches a maximum value of the depth information in the track.

(77) The information processing device according to any one of (73) to (76), in which the extraction unit extracts an arbitrary slice of the G-PCC content from the content file on the basis of the track depth information stored in a depth information box of a sample entry of the metadata area.

(78) The information processing device according to any one of (72) to (77), in which the track configuration information includes track dependency relation information indicating a dependency relation between first and second tracks.

(79) The information processing device according to (78), in which the track dependency relation information includes dependent information indicating another track including the slice necessary for decoding the dependent slice included in the track.

(80) The information processing device according to (79), in which the dependent information indicates all the another track including the slice necessary for decoding the dependent slice.

(81) The information processing device according to (79), in which the dependent information indicates the other tracks including the slice referred to from the dependent slice.

(82) The information processing device according to any one of (78) to (81), in which the track dependency relation information includes independent information indicating another track including another slice in which an independent slice included in the track is necessary in decoding.

(83) The information processing device according to (82), in which the independent information indicates the another track including the other slice that refers to the independent slice in decoding.

(84) The information processing device according to any one of (78) to (83), in which the extraction unit extracts an arbitrary slice of the G-PCC content from the content file on the basis of the track dependency relation information stored as a track reference in the metadata area.

(85) An information processing method including:
extracting an arbitrary slice of geometry-based point cloud compression (G-PCC) content from a content file on the basis of scalable decoding information stored in a metadata area of the content file that stores the G-PCC content including first and second slices; and
decoding the slice of the extracted G-PCC content,
in which the scalable decoding information is information regarding scalable decoding of the G-PCC content and is information generated on the basis of depth information indicating a quality hierarchy level of geometry included in the slice in the G-PCC content and a dependency relation between the first and second slices in the G-PCC content.

(101) An information processing device including:
an adaptation set configuration information generation unit configured to generate adaptation set configuration information on the basis of depth information indicating a quality hierarchy level of geometry included in each slice in geometry-based point cloud compression (G-PCC) content including first and second slices and a dependency relation between the first and second slices in the G-PCC content; and
a control file generation unit configured to generate a control file that controls reproduction of a content file that stores the G-PCC content and store the adaptation set configuration information in the control file,
in which the content file stores the G-PCC content in a track on a slice basis, and
the adaptation set configuration information is information regarding a configuration of an adaptation set that describes information regarding the track of the content file.

(102) The information processing device according to (101), in which the adaptation set configuration information includes adaptation set depth information regarding the depth information of the geometry of all slices included in the track corresponding to the adaptation set.

(103) The information processing device according to (102), in which the adaptation set depth information includes adaptation set minimum depth information indicating a minimum value of the depth information in the track.

(104) The information processing device according to (102) or (103), in which the adaptation set depth information includes adaptation set maximum depth information indicating a maximum value of the depth information in the track.

(105) The information processing device according to any one of (102) to (104),
in which the adaptation set depth information includes a matching flag indicating whether or not the sample minimum depth information of each sample included in the track matches the adaptation set minimum depth information and the sample maximum depth information of each sample included in the track matches the adaptation set maximum depth information,
the sample minimum depth information indicates a minimum value of the depth information in the sample,
the sample maximum depth information indicates a maximum value of the depth information in the sample,
the adaptation set minimum depth information indicates a minimum value of the depth information in the track, and
the adaptation set maximum depth information indicates a maximum value of the depth information in the track.

(106) The information processing device according to (101), in which the adaptation set configuration information includes representation dependency relation information indicating a dependency relation between first and second representations.

(107) The information processing device according to (106), in which the representation dependency relation information includes dependent information indicating another representation necessary for decoding the representation corresponding to the representation dependency relation information.

(108) The information processing device according to (107), in which the dependent information indicates all other representations necessary for decoding the representation corresponding to the dependent information.

(109) The information processing device according to (107), in which the dependent information indicates the another representation referred to from the representation corresponding to the dependent information.

(110) The information processing device according to any one of (106) to (109), in which the representation dependency relation information includes independent information indicating another representation in which a representation corresponding to the representation dependency relation information is necessary in decoding.

(111) The information processing device according to (110), in which the independent information indicates all other representations in which the representation corresponding to the independent information is necessary in decoding.

(112) The information processing device according to any one of (106) to (111), in which the control file generation unit stores the representation dependency relation information in the control file as a representation association ID and an association type.

(113) An information processing method including:

generating adaptation set configuration information on the basis of depth information indicating a quality hierarchy level of geometry included in each slice in geometry-based point cloud compression (G-PCC) content including first and second slices, and a dependency relation between the first and second slices in the G-PCC content; and generating a control file that controls reproduction of a content file that stores the G-PCC content and storing the adaptation set configuration information in the control file, in which the content file stores the G-PCC content in a track on a slice basis, and the adaptation set configuration information is information regarding a configuration of an adaptation set that describes information regarding the track of the content file.

(151) An information processing device including:

an analysis unit configured to analyze a control file that controls reproduction of a content file that stores geometry-based point cloud compression (G-PCC) content including first and second slices in a track on a slice basis and to specify an adaptation set necessary for obtaining an arbitrary slice of the G-PCC content on the basis of adaptation set configuration information stored in the control file;

an acquisition unit configured to acquire the track of the content file corresponding to the adaptation set specified by the analysis unit; and a decoding unit configured to decode the slice of the G-PCC content stored in the track acquired by the acquisition unit.

in which the adaptation set configuration information is information regarding a configuration of the adaptation set that describes information regarding the track of the content file and is information generated on the basis of depth information indicating a quality hierarchy level of geometry included in the slice in the G-PCC content and a dependency relation between the first and second slices in the G-PCC content.

(152) The information processing device according to (151), in which the adaptation set configuration information includes adaptation set depth information regarding the depth information of the geometry of all slices included in the track corresponding to the adaptation set.

(153) The information processing device according to (152), in which the adaptation set depth information includes adaptation set minimum depth information indicating a minimum value of the depth information in the track.

(154) The information processing device according to (152) or (153), in which the adaptation set depth information includes adaptation set maximum depth information indicating a maximum value of the depth information in the track.

(155) The information processing device according to any one of (152) to (154), in which the adaptation set depth information includes a matching flag indicating whether or not the sample minimum depth information of each sample included in the track matches the adaptation set minimum depth information and the sample maximum depth information of each sample included in the track matches the adaptation set maximum depth information, the sample minimum depth information indicates a minimum value of the depth information in the sample, the sample maximum depth information indicates a maximum value of the depth information in the sample, the adaptation set minimum depth information indicates a minimum value of the depth information in the track, and the adaptation set maximum depth information indicates a maximum value of the depth information in the track.

(156) The information processing device according to any one of (151) to (155), in which the adaptation set configuration information includes representation dependency relation information indicating a dependency relation between first and second representations.

(157) The information processing device according to (156), in which the representation dependency relation information includes dependent information indicating another representation necessary for decoding the representation corresponding to the representation dependency relation information.

(158) The information processing device according to (157), in which the dependent information indicates all the other representations necessary for decoding the representation corresponding to the dependent information.

(159) The information processing device according to (157), in which the dependent information indicates the other representations referred to from the representation corresponding to the dependent information.

(160) The information processing device according to any one of (156) to (159), in which the representation dependency relation information includes independent information indicating another representation in which a representation corresponding to the representation dependency relation information is necessary in decoding.

(161) The information processing device according to (160), in which the independent information indicates all the other representations in which the representation corresponding to the independent information is necessary in decoding.

(162) The information processing device according to any one of (156) to (161), in which the analysis unit specifies the adaptation set on the basis of the representation dependency relation information stored as a representation association ID and an association type in the control file.

(163) An information processing method including:

analyzing a control file that controls reproduction of a content file that stores geometry-based point cloud compression (G-PCC) content including first and second slices in a track on a slice basis and specifying an adaptation set necessary for obtaining any slice of the G-PCC content on the basis of adaptation set configuration information stored in the control file;

acquiring the track of the content file corresponding to the identified adaptation set; and decoding the slice of the G-PCC content stored in the acquired track, in which the adaptation set configuration information is information regarding a configuration of the adaptation set that describes information regarding the track of the content file and is information generated on the basis of depth information indicating a quality hierarchy level of geometry included in the slice in the G-PCC content and a dependency relation between the first and second slices in the G-PCC content.

REFERENCE SIGNS LIST

300 File generation unit
311 Extraction unit
312 Encoding unit
313 Bitstream generation unit
314 Scalable decoding information generation unit
315 File generation unit
321 Geometry encoding unit
322 Attribute encoding unit
323 Metadata generation unit
400 Reproduction device
401 Control unit
411 File acquisition unit
412 Reproduction processing unit
413 Presentation processing unit
421 File processing unit
422 Decoding unit
423 Presentation information generation unit
431 Bitstream extraction unit
441 Geometry decoding unit
442 Attribute decoding unit
451 Point cloud construction unit
452 Presentation processing unit
600 File generation unit
615 Content file generation unit
616 MPD generation unit
700 Reproduction device
711 File acquisition unit
712 MPD analysis unit

The invention claimed is:

1. An information processing device comprising:
circuitry configured to
generate scalable decoding information regarding scalable decoding of geometry-based point cloud compression (G-PCC) content on a basis of depth information indicating a quality hierarchy level of each slice in the G-PCC content including first and second slices and a dependency relation between the first and second slices in the G-PCC content, wherein the scalable decoding information includes track configuration information regarding a configuration of a track that stores the G-PCC content on a slice basis in the content file, wherein the track configuration information includes
track depth information regarding the depth information of the geometry of all the slices included in the track corresponding to the track configuration information, and
generate a content file that stores the G-PCC content and to store the scalable decoding information in a metadata area of the content file,
wherein the track depth information includes track minimum depth information indicating a minimum value of the depth information in the track and track maximum depth information indicating a maximum value of the depth information in the track.

2. The information processing device according to claim 1, wherein the scalable decoding information includes slice configuration information regarding a configuration of the slice for each sample.

3. The information processing device according to claim 2, wherein the circuitry is configured to set a subsample for each slice and stores the slice configuration information in a codec specific parameter of a subsample information box of the metadata area.

4. An information processing device comprising:
circuitry configured to
generate scalable decoding information regarding scalable decoding of geometry-based point cloud compression (G-PCC) content on a basis of depth information indicating a quality hierarchy level of each slice in the G-PCC content including first and second slices and a dependency relation between the first and second slices in the G-PCC content, wherein the scalable decoding information includes track configuration information regarding a configuration of a track that stores the G-PCC content on a slice basis in the content file, wherein the track configuration information includes
track depth information regarding the depth information of the geometry of all the slices included in the track corresponding to the track configuration information, and
generate a content file that stores the G-PCC content and to store the scalable decoding information in a metadata area of the content file,
wherein the circuitry is configured to store the track depth information in a depth information box of a sample entry of the metadata area.

5. An information processing device comprising:
circuitry configured to
generate scalable decoding information regarding scalable decoding of geometry-based point cloud compression (G-PCC) content on a basis of depth information indicating a quality hierarchy level of each slice in the G-PCC content including first and second slices and a dependency relation between the first and second slices in the G-PCC content, wherein the scalable decoding information includes track configuration information regarding a configuration of a track that stores the G-PCC content on a slice basis in the content file, wherein the track configuration information includes
track dependency relation information indicating a dependency relation between first and second tracks; and
generate a content file that stores the G-PCC content and to store the scalable decoding information in a metadata area of the content file,
wherein the track dependency relation information includes dependent information indicating another track including the slice necessary for decoding a dependent slice included in the track.

6. An information processing device comprising:
circuitry configured to
generate scalable decoding information regarding scalable decoding of geometry-based point cloud compression (G-PCC) content on a basis of depth information indicating a quality hierarchy level of each slice in the G-PCC content including first and second slices and a dependency relation between the first and second slices in the G-PCC content, wherein the scalable decoding information includes track configuration information regarding a configuration of a track that stores the G-PCC content on a slice basis in the content file, wherein the track configuration information includes track dependency relation information indicating a dependency relation between first and second tracks; and generate a content file that stores the G-PCC content and to store the scalable decoding information in a metadata area of the content file, wherein the track dependency relation information includes independent information indicating another track including another slice in which an independent slice included in the track is necessary in decoding.

7. An information processing device comprising:
circuitry configured to
generate scalable decoding information regarding scalable decoding of geometry-based point cloud compression (G-PCC) content on a basis of depth information indicating a quality hierarchy level of each slice in the G-PCC content including first and second slices and a dependency relation between the first and second slices in the G-PCC content, wherein the scalable decoding information includes track configuration information regarding a configuration of a track that stores the G-PCC content on a slice basis in the content file, wherein the track configuration information includes track dependency relation information indicating a dependency relation between first and second tracks; and generate a content file that stores the G-PCC content and to store the scalable decoding information in a metadata area of the content file, wherein the circuitry is configured to store the track dependency relation information in the metadata area as a track reference.

8. An information processing device comprising:
circuitry configured to
extract an arbitrary slice of geometry-based point cloud compression (G-PCC) content from a content file on a basis of scalable decoding information stored in a metadata area of the content file that stores the G-PCC content including first and second slices; and decode the slice of the G-PCC content extracted by the extraction unit, wherein the scalable decoding information is information regarding scalable decoding of the G-PCC content and is information generated on a basis of depth information indicating a quality hierarchy level of the slice in the G-PCC content and a dependency relation between the first and second slices in the G-PCC content, wherein the scalable decoding information includes track configuration information regarding a configuration of a track that stores the G-PCC content on a slice basis in the content file, wherein the track configuration information includes track depth information regarding the depth information of the geometry of all the slices included in the track corresponding to the track configuration information, wherein the track depth information includes track minimum depth information indicating a minimum value of the depth information in the track and track maximum depth information indicating a maximum value of the depth information in the track.

9. The information processing device according to claim 8, wherein the scalable decoding information includes slice configuration information regarding a configuration of the slice for each sample.

10. An information processing method comprising:
extracting an arbitrary slice of geometry-based point cloud compression (G-PCC) content from a content file on a basis of scalable decoding information stored in a metadata area of the content file that stores the G-PCC content including first and second slices; and decoding the extracted slice of the G-PCC content, wherein the scalable decoding information is information regarding scalable decoding of the G-PCC content and is information generated on a basis of depth information indicating a quality hierarchy level of the slice in the G-PCC content and a dependency relation between the first and second slices in the G-PCC content, wherein the scalable decoding information includes track configuration information regarding a configuration of a track that stores the G-PCC content on a slice basis in the content file, wherein the track configuration information includes track depth information regarding the depth information of the geometry of all the slices included in the track corresponding to the track configuration information, wherein the track depth information includes track minimum depth information indicating a minimum value of the depth information in the track and track maximum depth information indicating a maximum value of the depth information in the track.

11. An information processing device comprising:
circuitry configured to
extract an arbitrary slice of geometry-based point cloud compression (G-PCC) content from a content file on a basis of scalable decoding information stored in a metadata area of the content file that stores the G-PCC content including first and second slices; and decode the slice of the G-PCC content extracted by the extraction unit, wherein the scalable decoding information is information regarding scalable decoding of the G-PCC content and is information generated on a basis of depth information indicating a quality hierarchy level of the slice in the G-PCC content and a dependency relation between the first and second slices in the G-PCC content, wherein the scalable decoding information includes at least one of slice dependency relation information indicating the dependency relation between the first and second slices, wherein the slice dependency relation information includes reference source geometry slice identification information and reference destination geometry slice identification information, the reference source geometry slice identification information is identification information of a geometry slice serving as a reference source in the dependency relation between the first and second slices, and the reference destination geometry slice identification information is identification information of a geometry slice serving as a reference destination in the dependency relation between the first and second slices; and geometry slice depth information regarding the depth information of the geometry included in a geometry slice, and wherein the geometry slice depth information includes minimum depth information indicating a minimum value of the depth information in the geometry slice and maximum depth information indicating a maximum value of the depth information in the geometry slice.

12. An information processing method comprising:
    extracting an arbitrary slice of geometry-based point cloud compression (G-PCC) content from a content file on a basis of scalable decoding information stored in a metadata area of the content file that stores the G-PCC content including first and second slices; and
    decoding the extracted slice of the G-PCC content,
    wherein the scalable decoding information is information regarding scalable decoding of the G-PCC content and is information generated on a basis of depth information indicating a quality hierarchy level of the slice in the G-PCC content and a dependency relation between the first and second slices in the G-PCC content, wherein the scalable decoding information includes at least one of
        slice dependency relation information indicating the dependency relation between the first and second slices, wherein the slice dependency relation information includes reference source geometry slice identification information and reference destination geometry slice identification information, the reference source geometry slice identification information is identification information of a geometry slice serving as a reference source in the dependency relation between the first and second slices, and the reference destination geometry slice identification information is identification information of a geometry slice serving as a reference destination in the dependency relation between the first and second slices; and
        geometry slice depth information regarding the depth information of the geometry included in a geometry slice, and wherein the geometry slice depth information includes minimum depth information indicating a minimum value of the depth information in the geometry slice and maximum depth information indicating a maximum value of the depth information in the geometry slice.

* * * * *